United States Patent [19]
Ramsey

[11] Patent Number: 5,699,550
[45] Date of Patent: Dec. 16, 1997

[54] COMPUTER SYSTEM CACHE PERFORMANCE ON WRITE ALLOCATION CYCLES BY IMMEDIATELY SETTING THE MODIFIED BIT TRUE

[75] Inventor: Jens K. Ramsey, Houston, Tex.

[73] Assignee: Compaq Computer Corporation, Houston, Tex.

[21] Appl. No.: 323,260

[22] Filed: Oct. 14, 1994

[51] Int. Cl.$^6$ .................................................. G06F 12/08
[52] U.S. Cl. ............................................ 395/471; 395/470
[58] Field of Search .................................... 395/468, 471, 395/470

[56] References Cited

U.S. PATENT DOCUMENTS

| | | | |
|---|---|---|---|
| 5,060,136 | 10/1991 | Furney et al. | 395/455 |
| 5,155,824 | 10/1992 | Edenfield et al. | 395/470 |
| 5,307,477 | 4/1994 | Taylor et al. | 395/403 |
| 5,488,709 | 1/1996 | Chan | 395/445 |

OTHER PUBLICATIONS

Handy, "The Cache Memory Book", 1993, p. 62–64, 69–72, 262.
Pentium™ Processor User's Manual, vol. 2:82496 Cache Controller and 82491 Cache SRAM Data Book, ©Intel Corporation 1993, pp. 2–1 to 2–4;3–1; 3–5 to 3–7; 3–10 to 3–11; 5–1 to 5–10; 5–90 to 5–91; 6–14 to 6–15.

*Primary Examiner*—Eddie P. Chan
*Assistant Examiner*—Kevin L. Ellis
*Attorney, Agent, or Firm*—Pravel, Hewitt, Kimball & Krieger

[57] ABSTRACT

In a microcomputer system implementing a cache memory subsystem, the cache performance on write allocation cycles is improved. When the processor writes to a line of the cache memory that results in a cache tag miss, after the processor write operation is suspended, the data is allocated from main memory into the cache memory. During this main memory read, however, instead of setting the state of the line of memory to unmodified, its state is set to modified. On the subsequent processor read operation, a cycle is saved because the modified bit does not have to be changed from unmodified to modified.

8 Claims, 40 Drawing Sheets

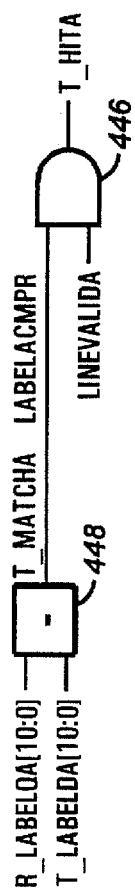
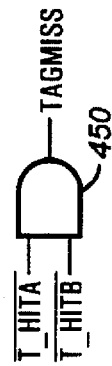
FIG. 5D
FIG. 5E
FIG. 5F
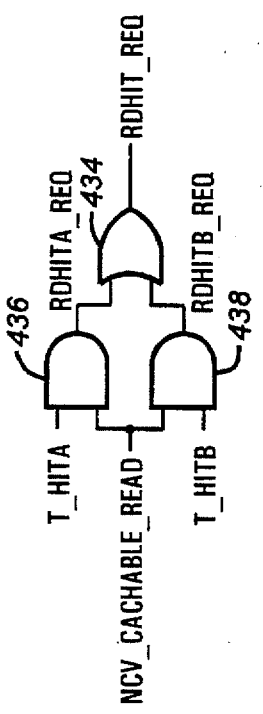
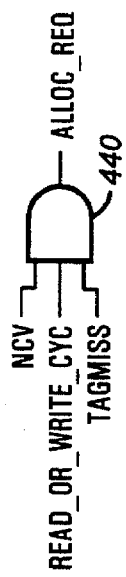
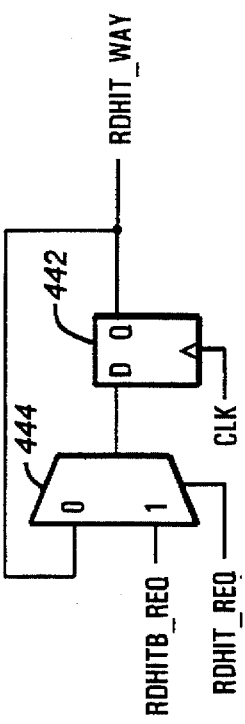
FIG. 5A
FIG. 5B
FIG. 5C

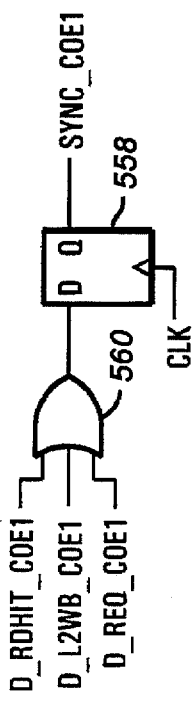
FIG. 6D
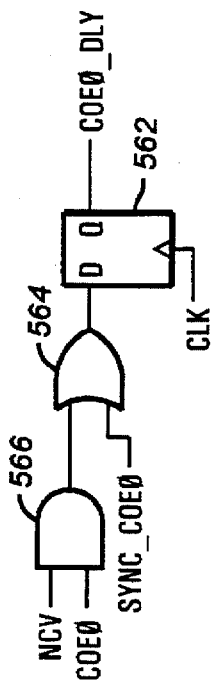
FIG. 6E
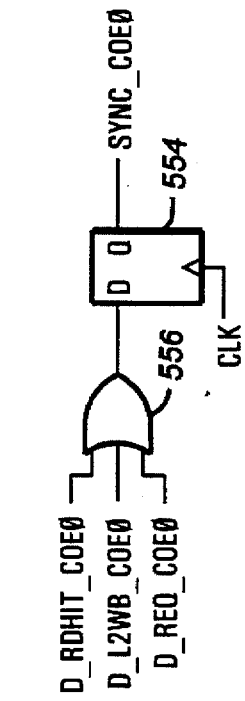
FIG. 6F
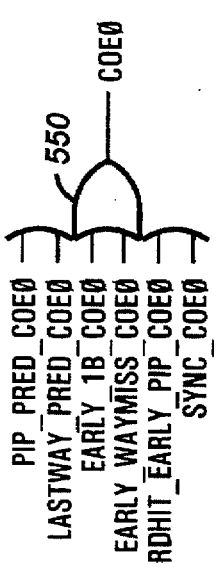
FIG. 6A
FIG. 6B
FIG. 6C
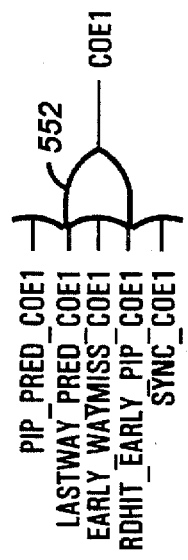

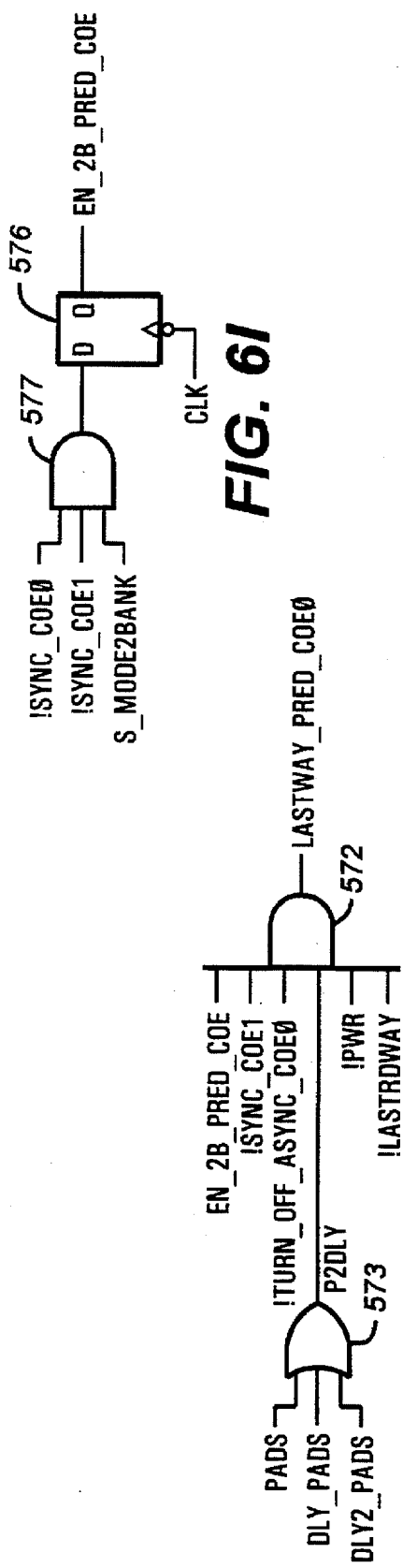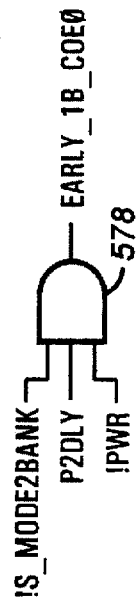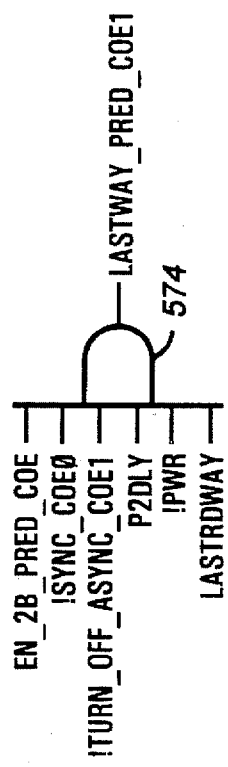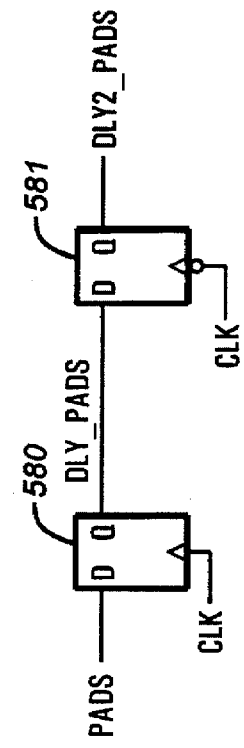

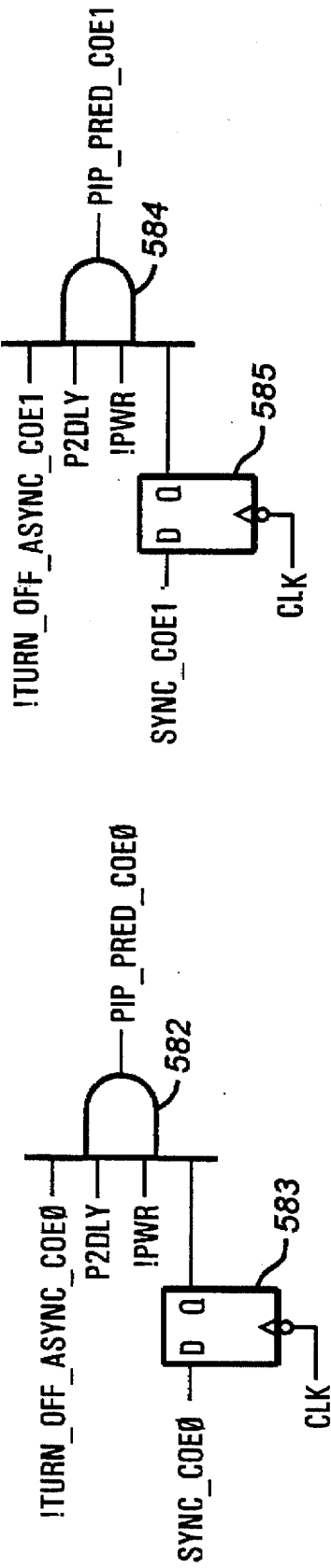
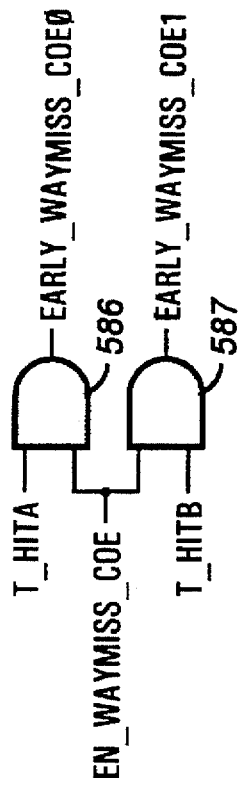
FIG. 7A
FIG. 7B
FIG. 7C

D_L2WB_CADS=G
D_L2WB_CADV=B+C+D
D_L2WB_COE0=(B+C+D+E)●!(L2WB_WAY●2BANK_2WAY)
D_L2WB_COE1=(B+C+D+E)●(L2WB_WAY●2BANK_2WAY)
D_L2_SBWAY=G●L2WB_WAY
L2WB_ACK=B●!CURWB_ACKED
L2WB_DONE=E●!MORE_LINES

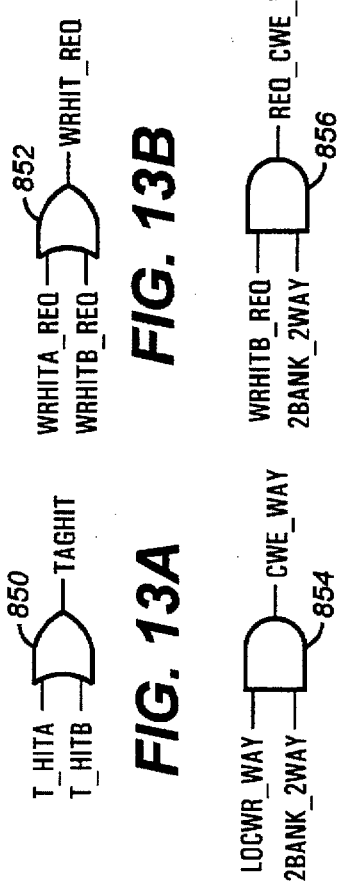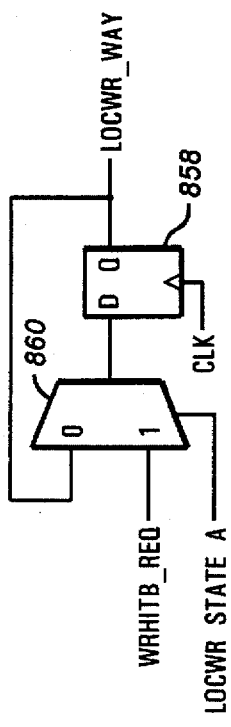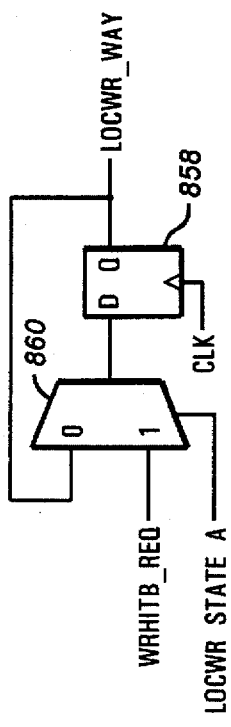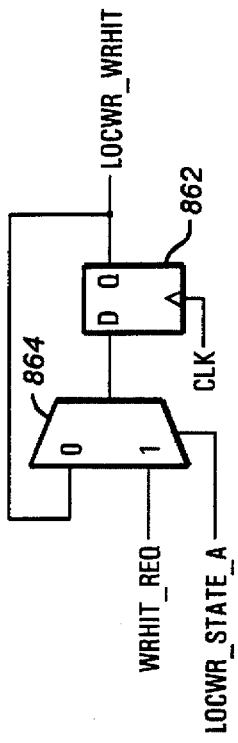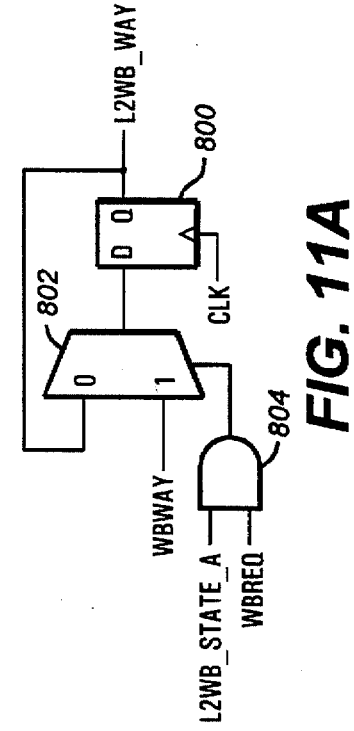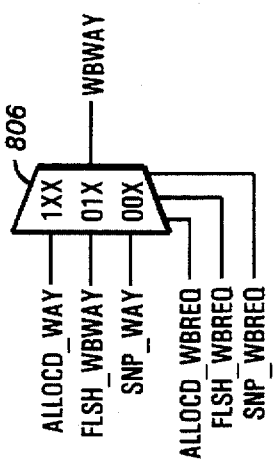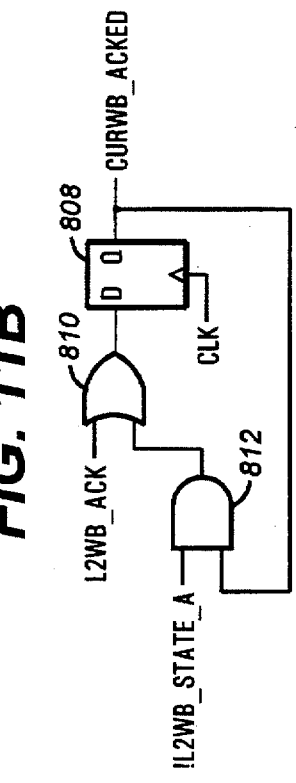

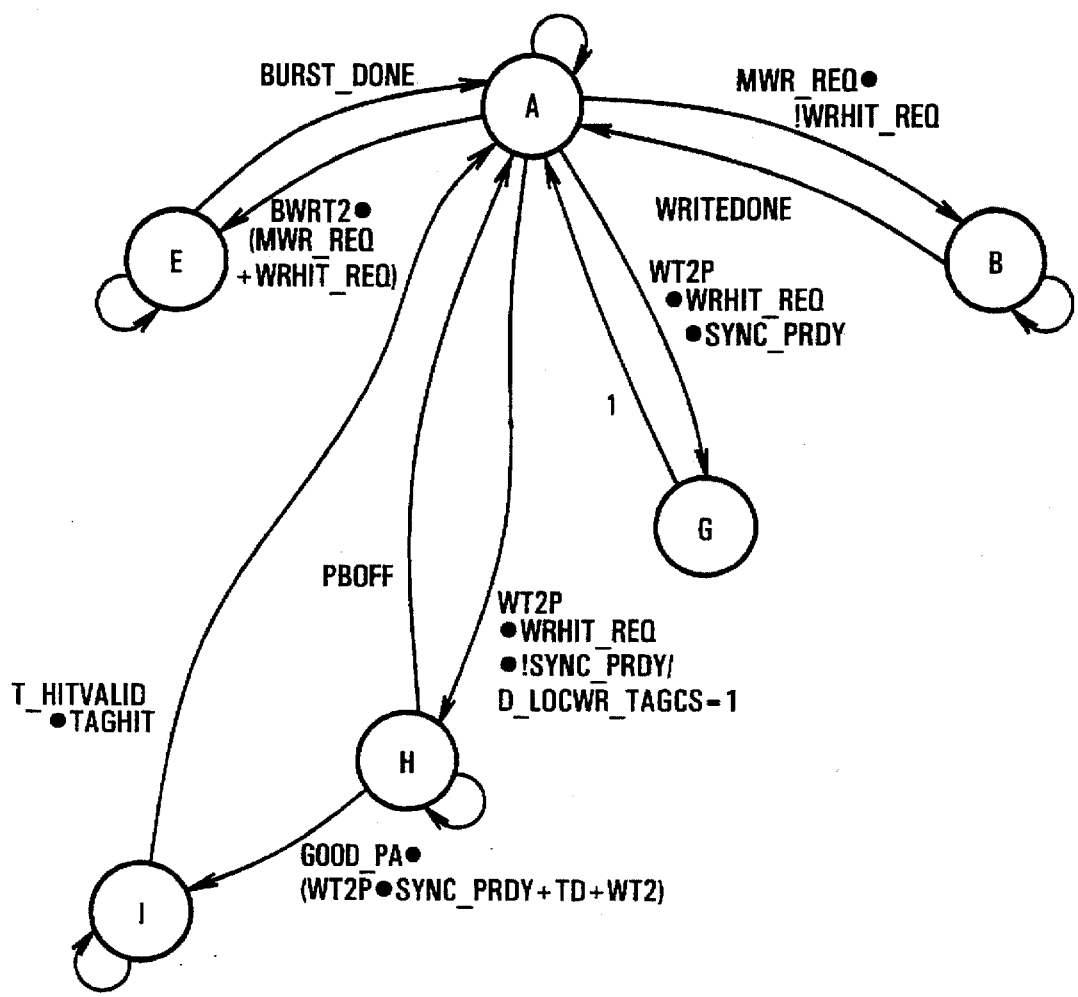

D_LOCWR_BLK_CCS0-G•LOCWR_WAY+H•(NEXTSTATE≡I)•LOCWR_WAY
D_LOCWR_BLK_CCS1- G•!LOCWR_WAY+ H•(NEXTSTATE≡I)•!LOCWR_WAY
D_LOCWR_SBWAY-G•LOCWR_WAY+H•(NEXTSTATE≡I)•LOCWR_WAY
D_LOCWR_PRDY=B•POSTED+E•!BURST_DONE•BURST2+G+I•NEXTSTATE-A
D_LOCWR_PBRDY=B•POSTED+E•!BURST_DONE+G+I•NEXTSTATE-A
D_LOCWR_CADV-E•!BURST_DONE•LOCWR_WRHIT
D_LOCWR_CADS-G+H•(NEXTSTATE-I)
D_LOCWR_CWE0-(E•! BURST_DONE•LOCWR_HIT+G+I•(NEXTSTATE-A))•!CWE_WAY
D_LOCWR_CWE1-(E•! BURST_DONE•LOCWR_HIT+G+I•(NEXTSTATE-A))•CWE_WAY
D_LOCWR_TAGCS-H
LOCWR_PTAGREQ-H•(NEXTSTATE-I)

FIG. 12

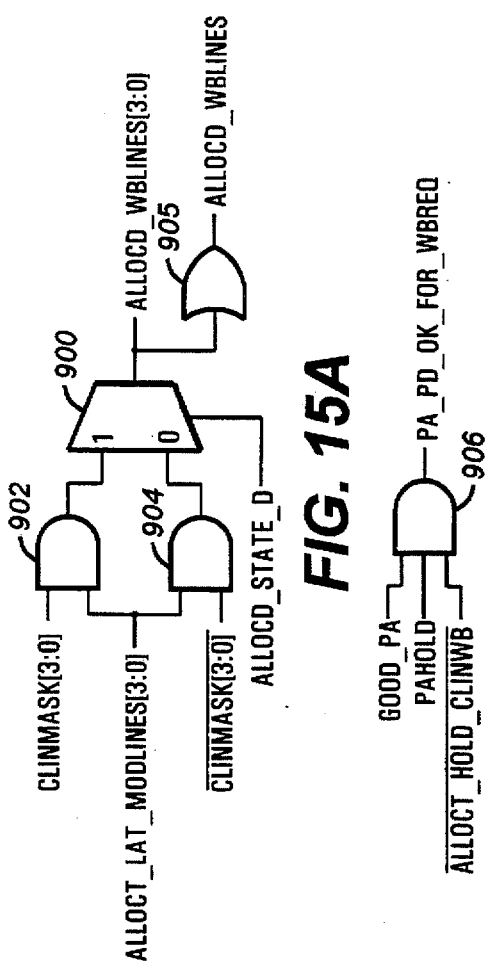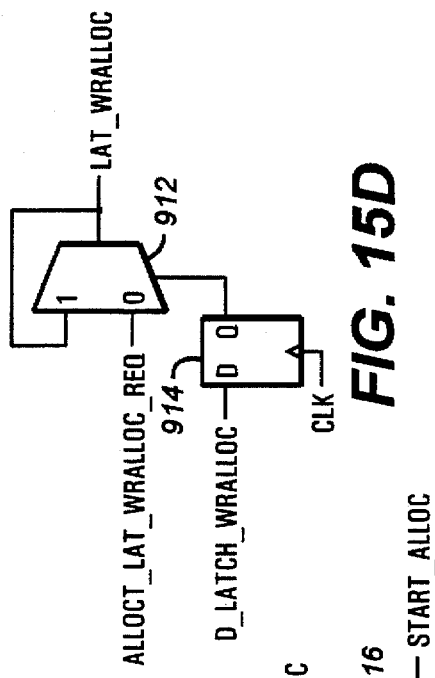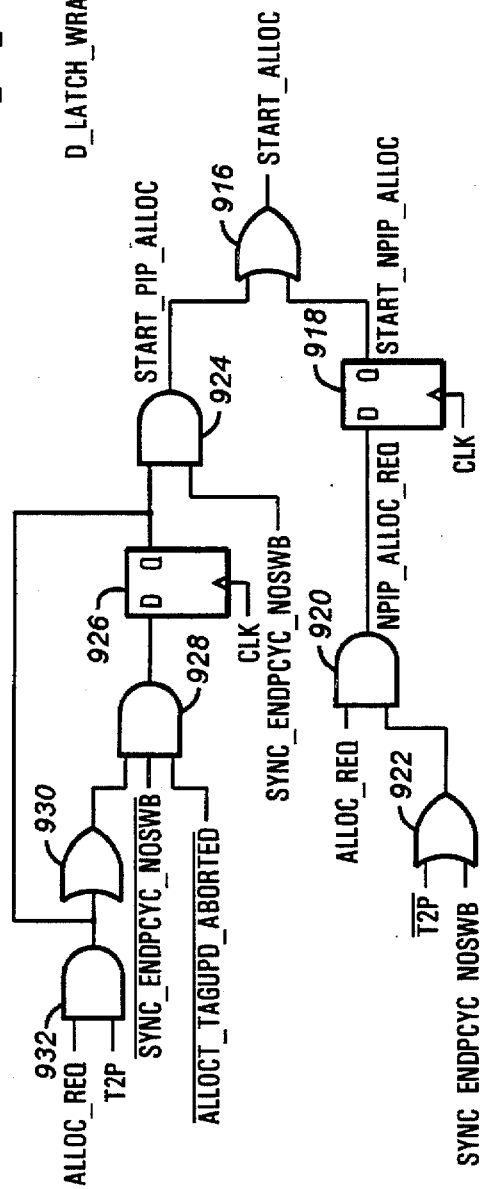

FIG. 20A
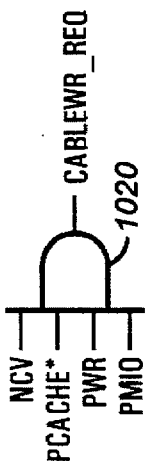
FIG. 20B
FIG. 20C
FIG. 20D
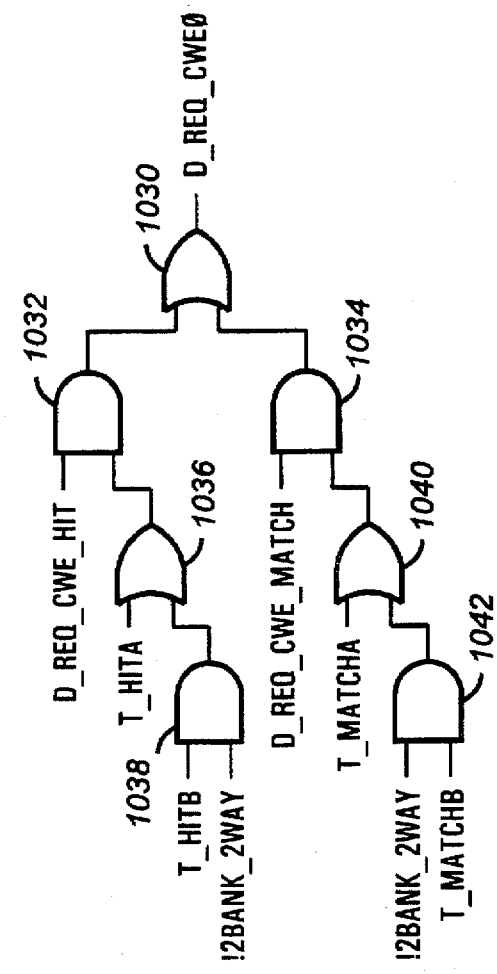
FIG. 20E
FIG. 20F
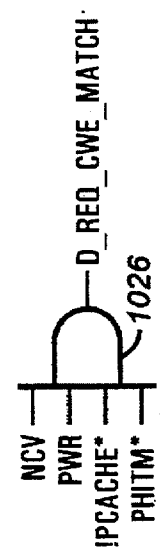

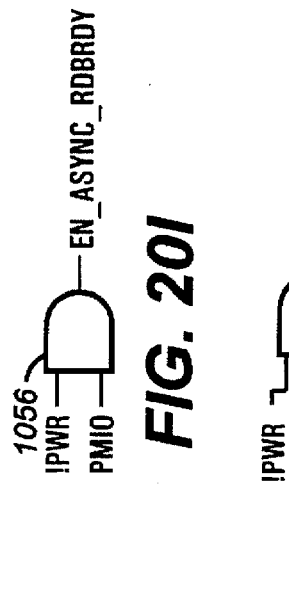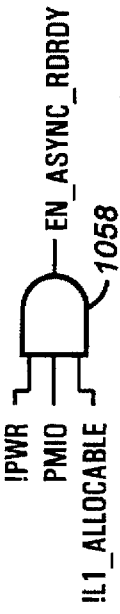
FIG. 20I
FIG. 20J
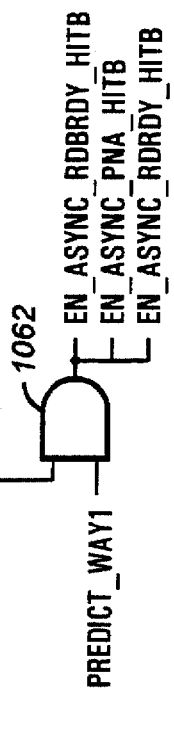
FIG. 20K
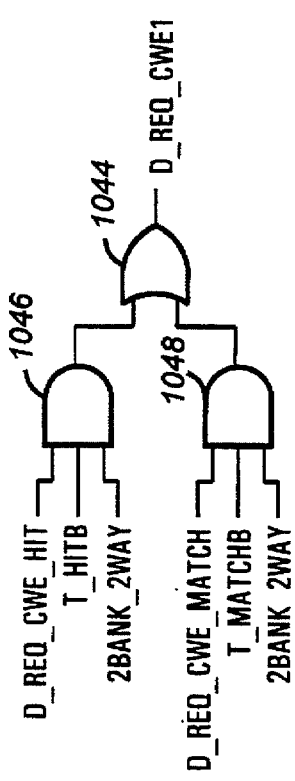
FIG. 20G
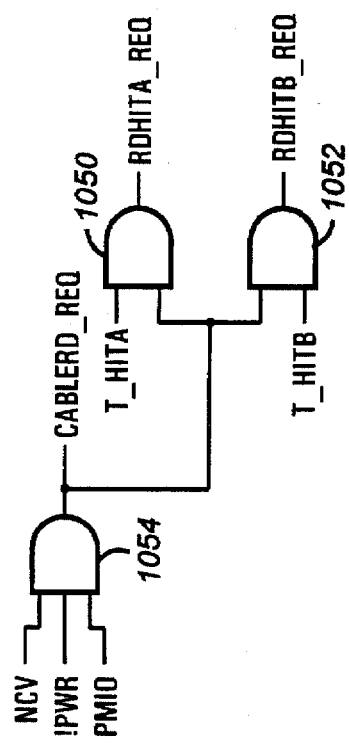
FIG. 20H

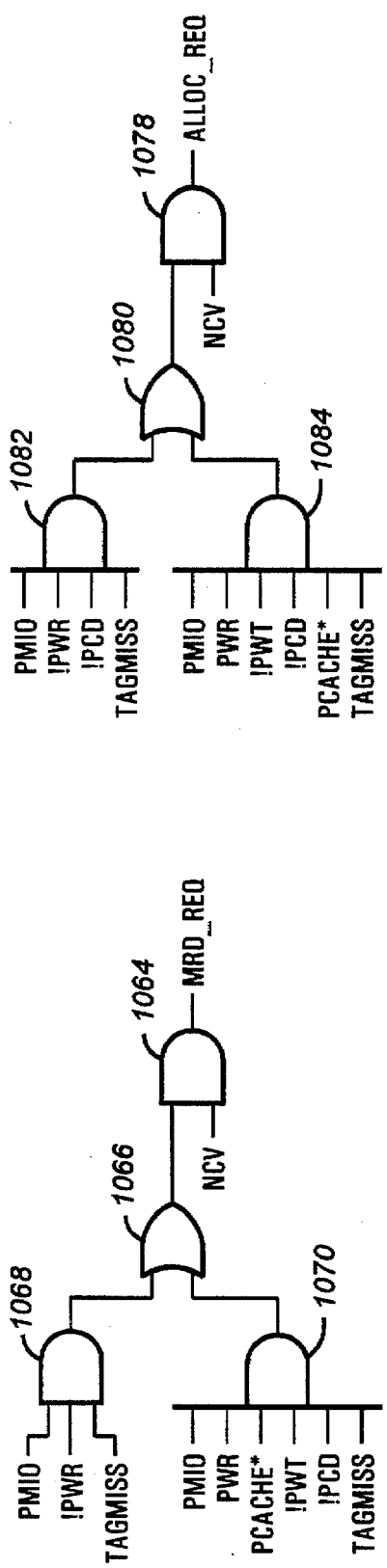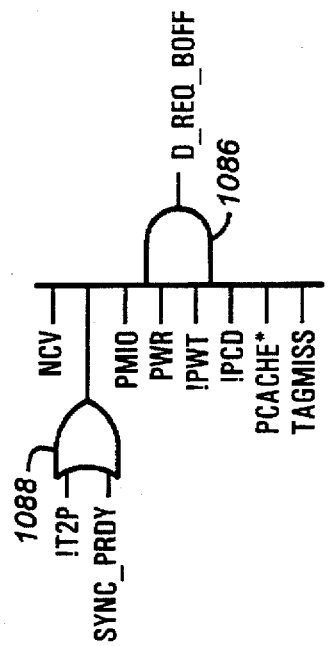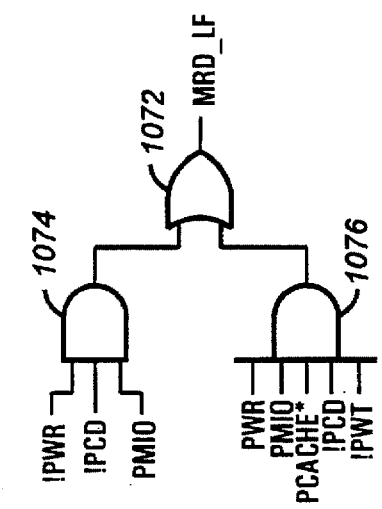
FIG. 21A  FIG. 21B  FIG. 21C  FIG. 21D

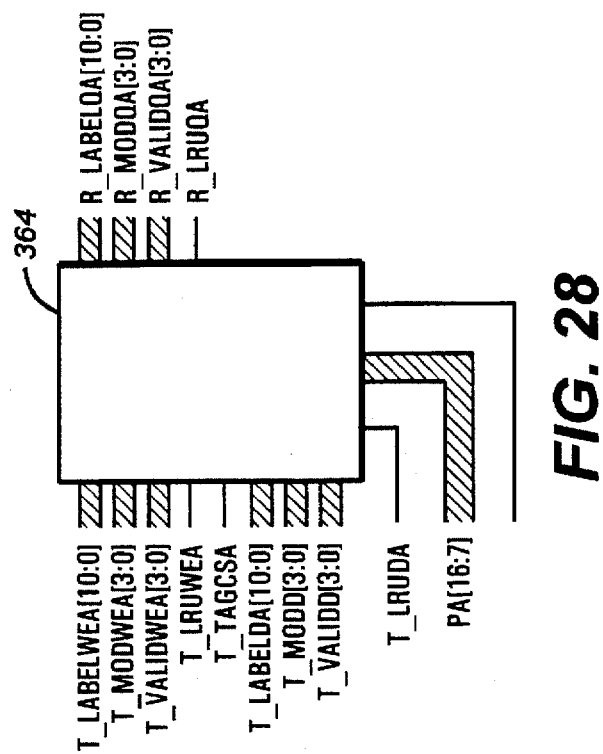
FIG. 28
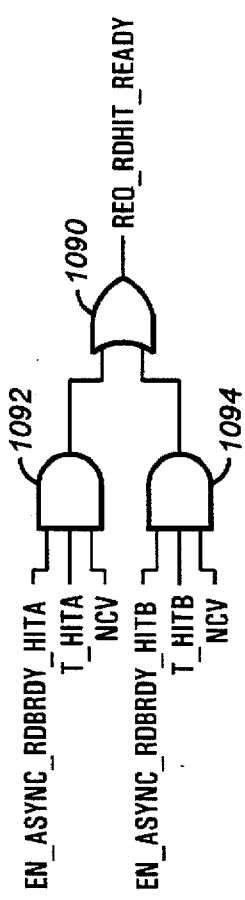
FIG. 22A
FIG. 22B

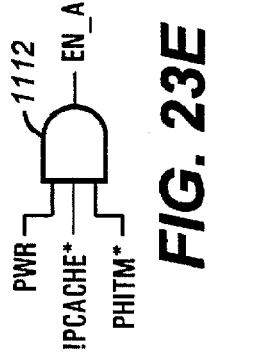
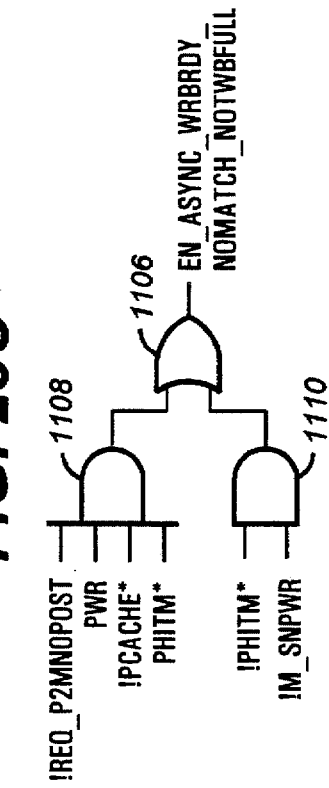
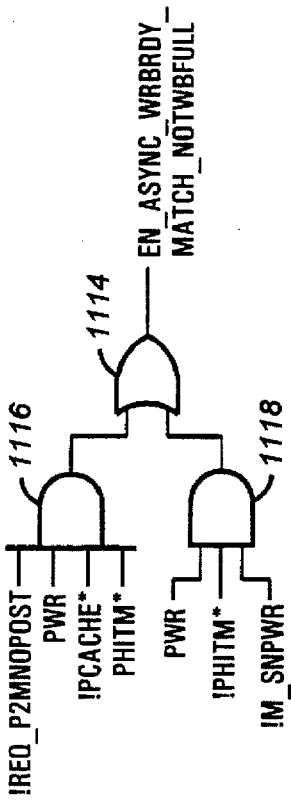
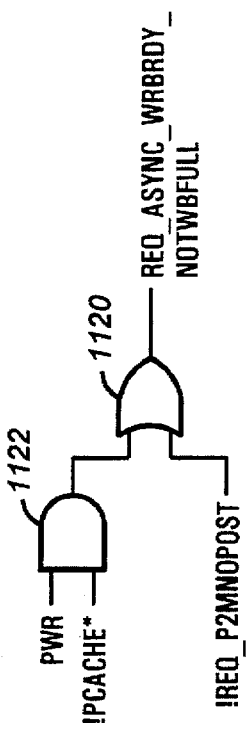

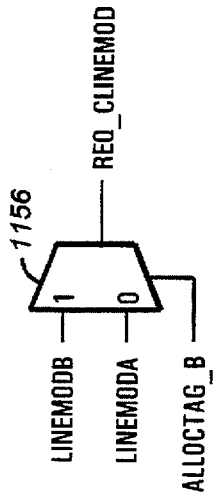
FIG. 24D
FIG. 24E
FIG. 24F
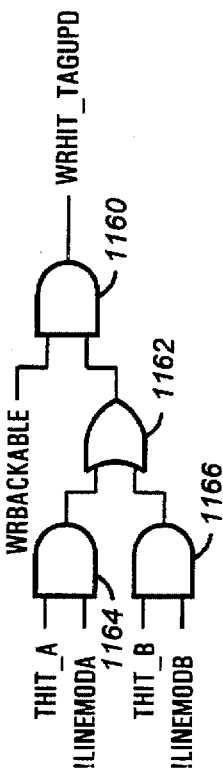
FIG. 24G
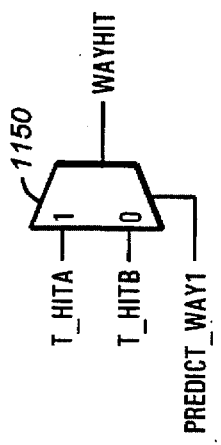
FIG. 24A
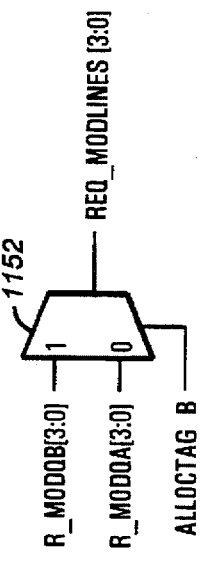
FIG. 24B
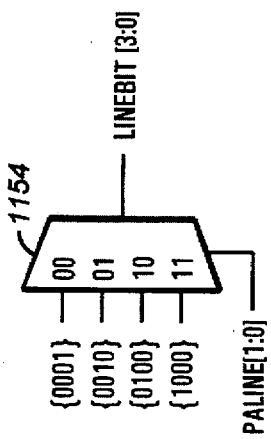
FIG. 24C

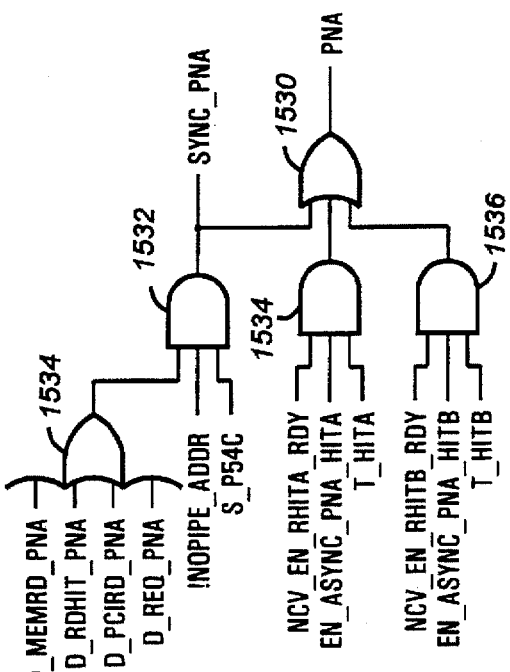
FIG. 25E
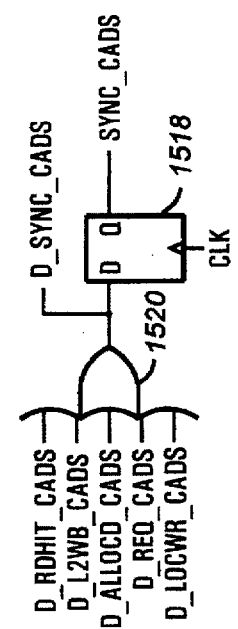
FIG. 25F
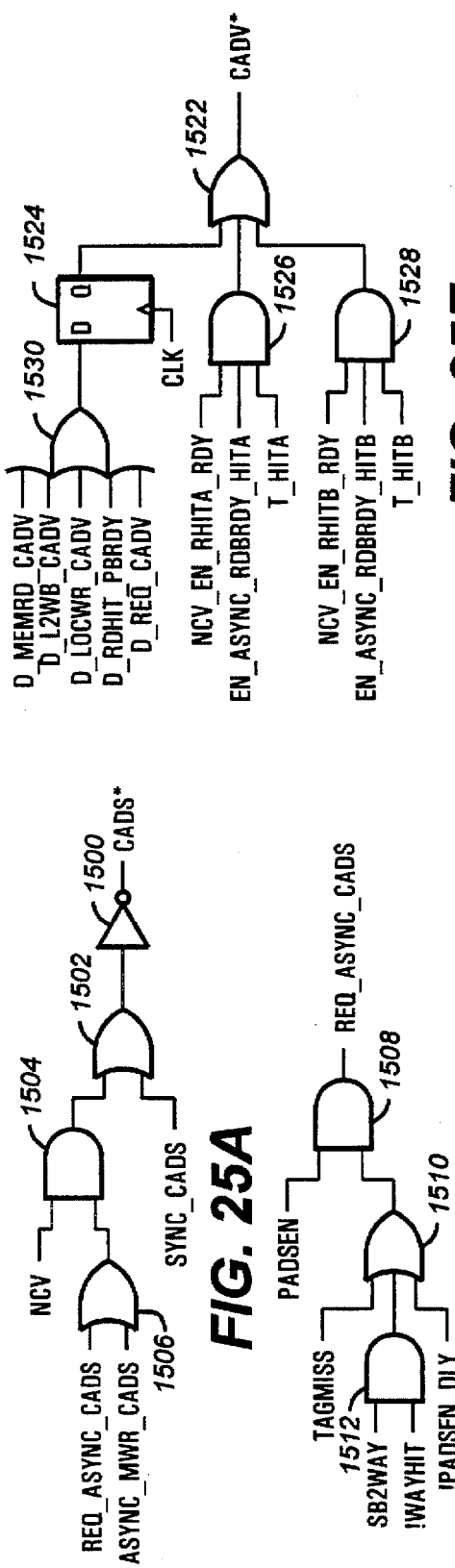
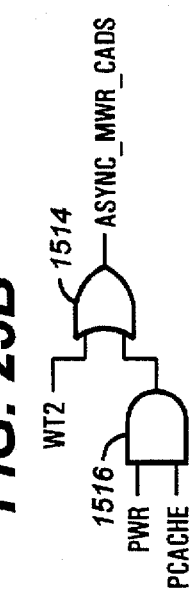
FIG. 25A
FIG. 25B
FIG. 25C
FIG. 25D

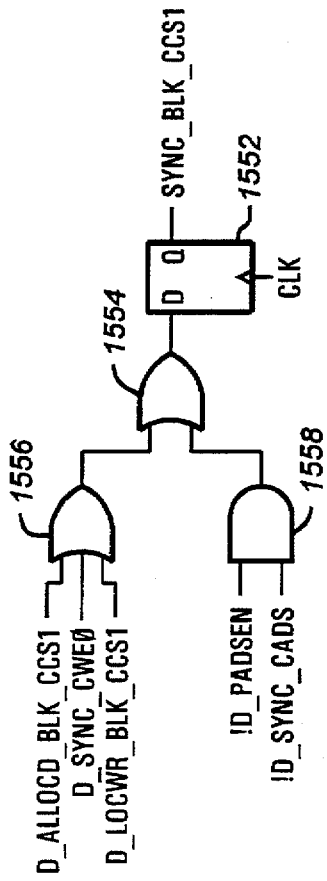
FIG. 26D
FIG. 26E
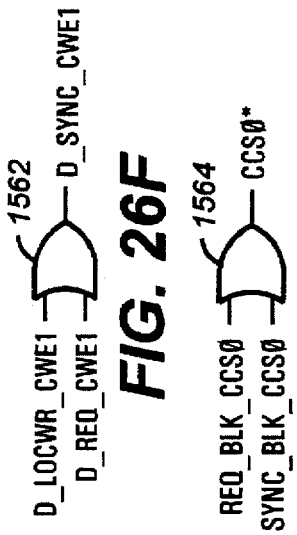
FIG. 26F
FIG. 26G
FIG. 26H
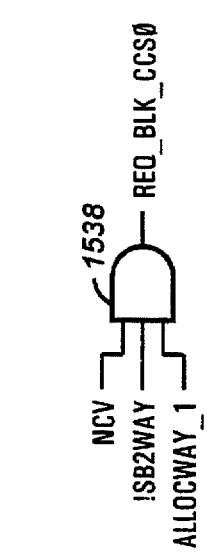
FIG. 26A
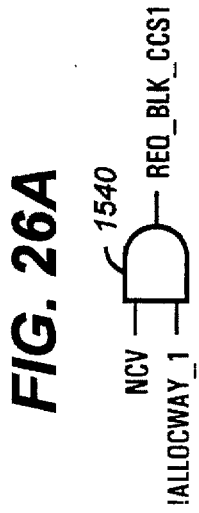
FIG. 26B
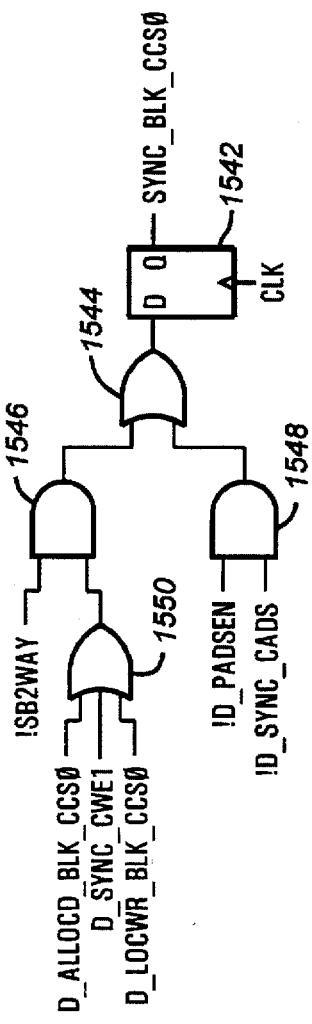
FIG. 26C
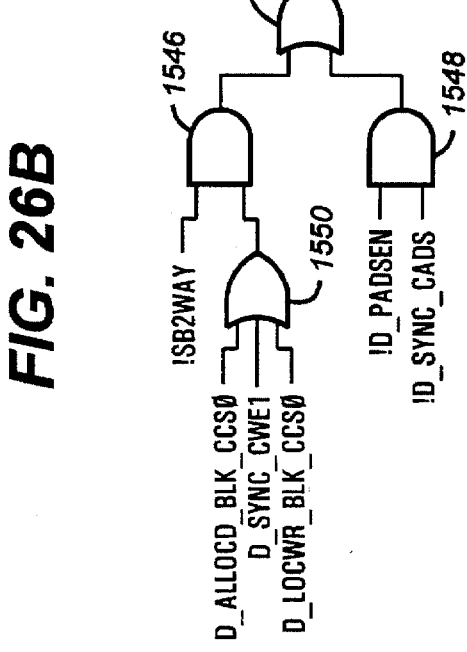

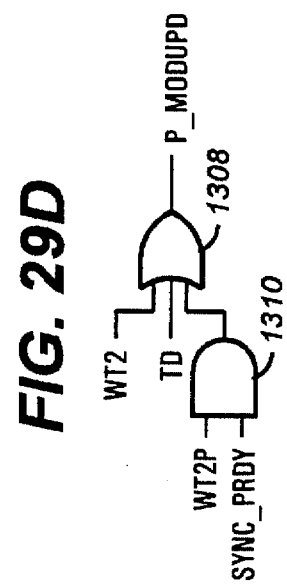
FIG. 29D
FIG. 29E
FIG. 29F
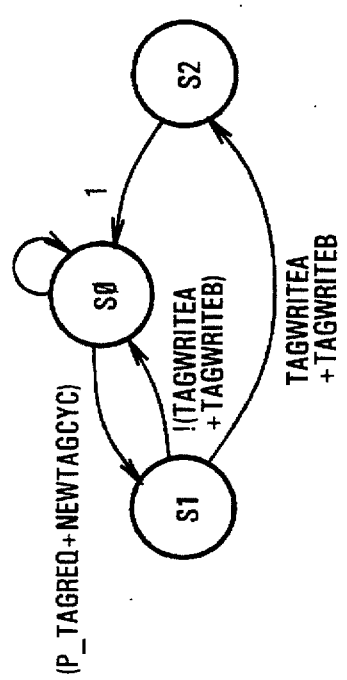
FIG. 29A
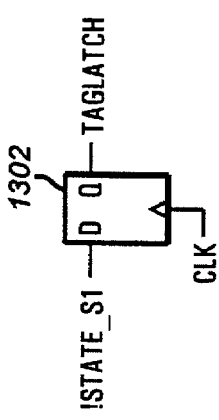
FIG. 29B
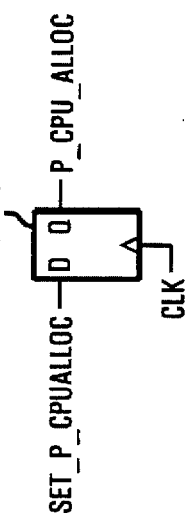
FIG. 29C

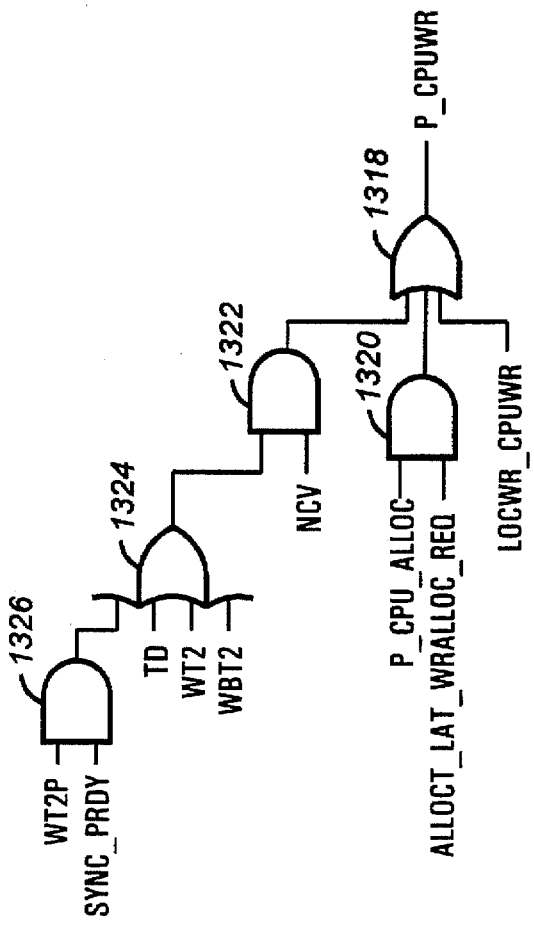
FIG. 29J
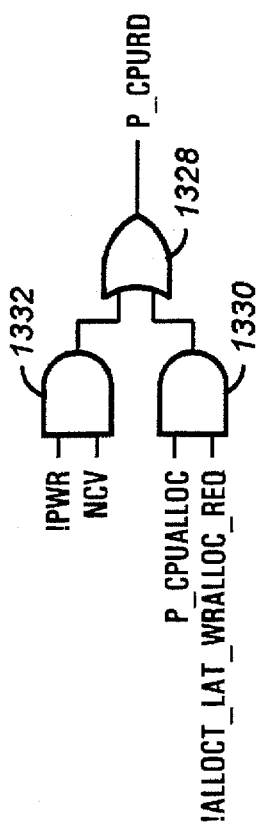
FIG. 29K
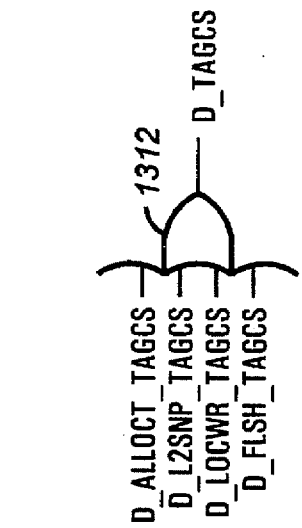
FIG. 29G
FIG. 29H
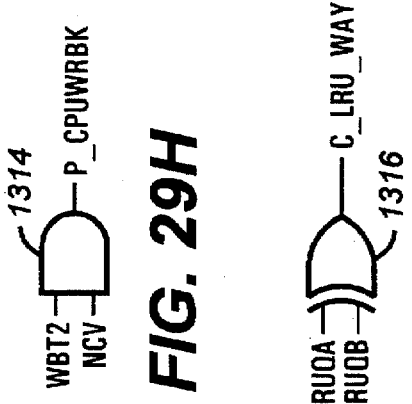
FIG. 29I

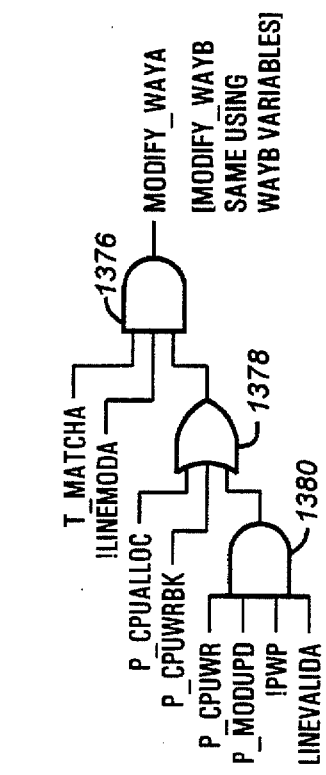
FIG. 30A
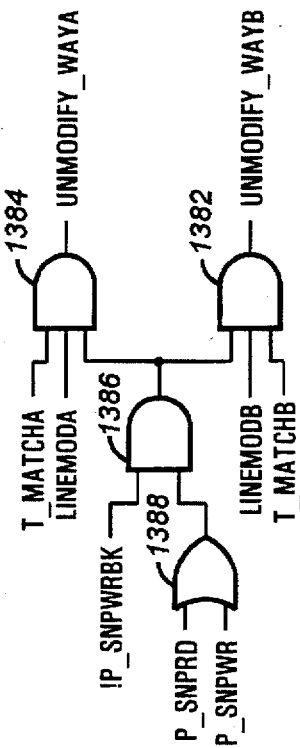
FIG. 30D
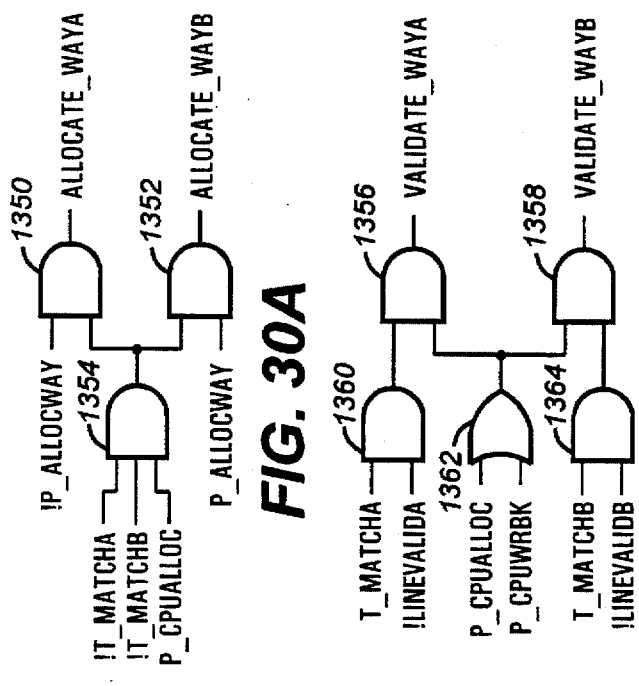
FIG. 30B
FIG. 30C
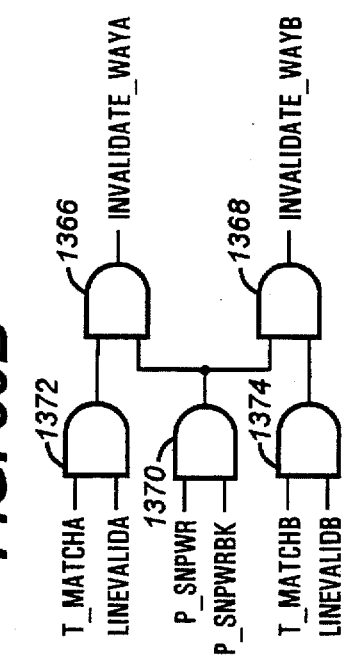
FIG. 30E

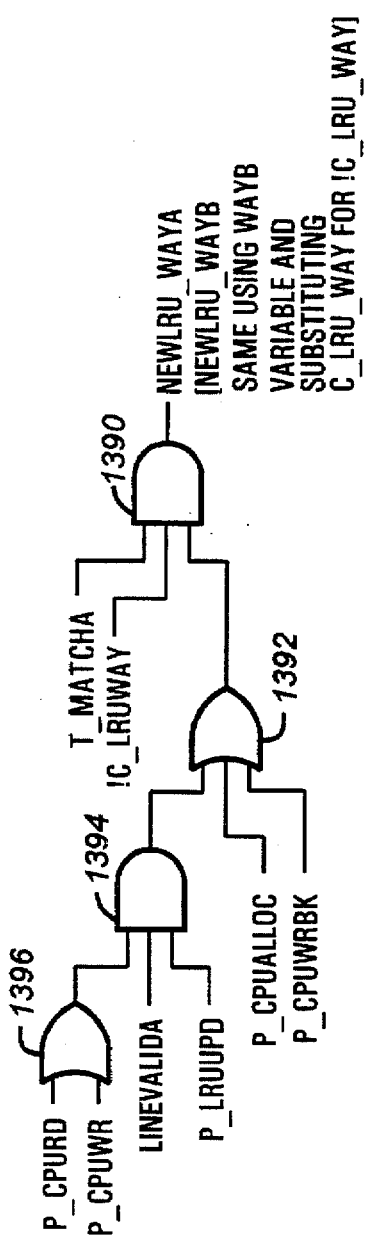
FIG. 30F
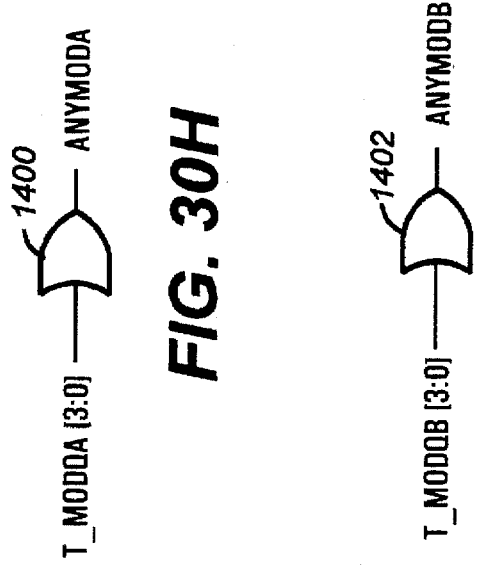
FIG. 30G
FIG. 30H
FIG. 30I

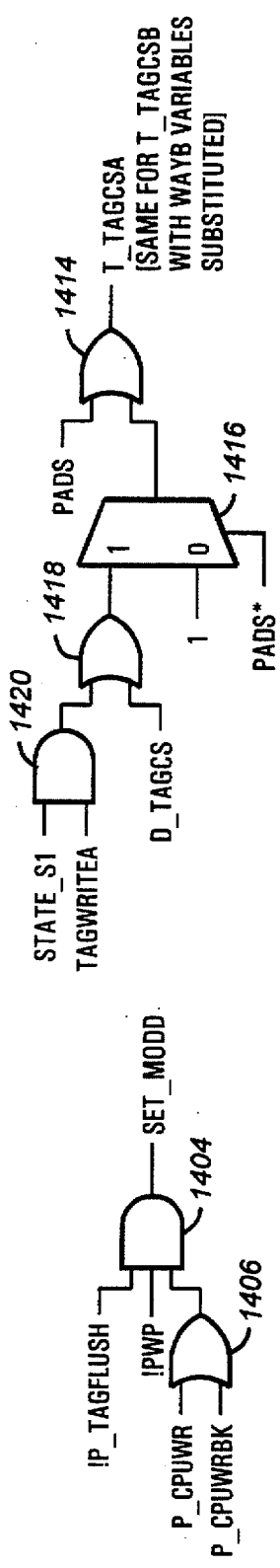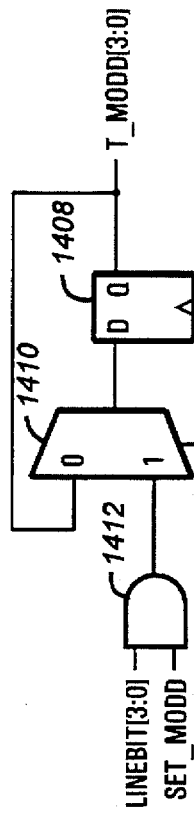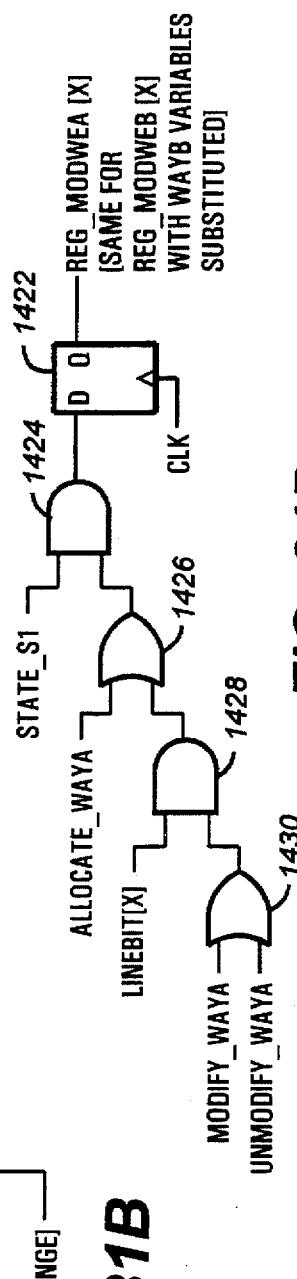

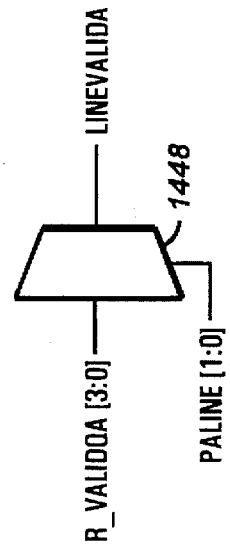
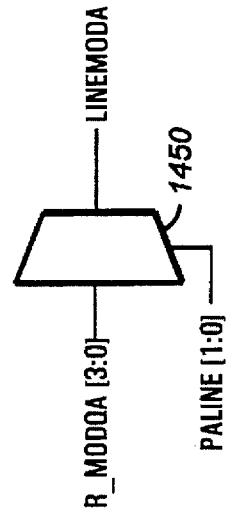
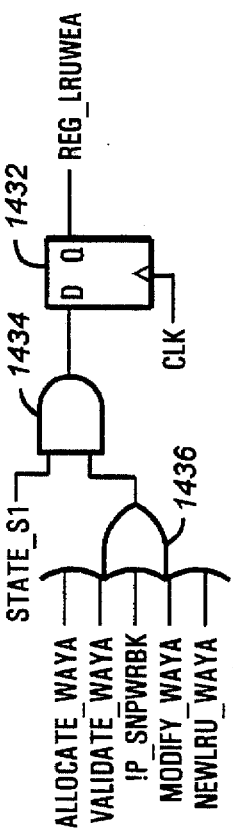

COMPUTER SYSTEM CACHE PERFORMANCE ON WRITE ALLOCATION CYCLES BY IMMEDIATELY SETTING THE MODIFIED BIT TRUE

BACKGROUND OF THE INVENTION

1. Field of the Invention

The invention relates to microcomputer systems employing cache memory, and more specifically relates to a microcomputer system that more quickly performs a processor write to a line of the cache memory that must first be retrieved from main memory.

2. Description of the Related Art

The field of microcomputer design has seen tremendous advances in the past decade. Microcomputer systems have undergone revolutionary changes since the introduction of the original Personal Computer by International Business Machines using an 8088 microprocessor by Intel Corporation. Systems today include multiple buses, extremely wide data paths, huge addressing spaces, and processor speeds of over 50 MHz.

In the course of improving these microcomputer systems, designers of both the chips and the systems themselves resorted to cache technology to more efficiently couple the higher speed processors with lower speed memory. These caches have evolved into multiple level caches, with both data and code caches in the microprocessor, and a second level (L2) cache coupling the microprocessor host bus to slower speed system memory.

The purpose of a cache is to eliminate wait states. A processor running at 50 Mhz only has 20 nanoseconds seconds per clock cycle, and only more expensive static random access memory (SRAM) can respond to memory operations in that amount of time without wait states. Main memory is usually implemented using less expensive dynamic random access memory (DRAM), which is slower and requires the processor to wait additional clock cycles for a response. A cache provides an intermediate store of much higher speed memory, relatively smaller than main memory, that permits a processor to run with fewer wait states when the needed data is stored in the cache memory. When the data is not stored in the cache memory, a cache controller then retrieves that data from main memory.

Cache design is well known to the microcomputer art and includes a number of configurations. Two popular configurations are a direct mapped cache and a multiple-way cache. In a direct mapped cache, a certain portion of the memory address is stored in a cache tag RAM as a tag. This tag indicates to what block of main memory the data stored in the cache data RAM corresponds. A second portion of the processor provided memory address, known as the index, then addresses the cache data RAM when the corresponding tag in the tag RAM matches a valid tag portion of the processor address bus. For example, assume a simple memory system using 16 bit addressing, providing 64 kilobytes of memory. Assume that the high speed cache data RAM provides 8 kilobytes of high speed cache memory. The lower 8 bits of the memory address then acts as an index into both the cache data RAM and the cache tag RAM, while the top 8 address bits are then stored in the indexed location in the tag RAM. When the microprocessor seeks to access a certain memory location, the top 8 address bits are compared to the data stored in the indexed location of the tag RAM. If the tag matches those bits, then the indexed cache data memory location contains the data from main memory corresponding to the processor provided memory address.

This example illustrates a direct mapped cache. A problem with such a direct mapped cache is that if two memory locations are accessed which are one cache "page" apart—i.e., they have the same index—they could only occupy the same location in the cache data RAM. Thus, on alternating accesses to such locations, the cache must be updated from or to main memory resulting in a cache "miss."

To provide for a greater "hit" percentage, designers implemented multi-way set-associative caches. A typical example is a two-way set-associative cache. In such a cache, each cache index has two corresponding cache data RAM storage locations and two corresponding tags in the cache tag RAM. If one indexed "way" is already occupied by data corresponding to another tag, then the second way can be used to store and retrieve the main memory data. When yet a third location of main memory needs to be stored in the cache, various algorithms are used to determine in which way of the cache to replace data, such as a least recently used algorithm.

Both of these types of cache designs are well known in the art of microcomputer design. There are implementation details of such caches, however, that can effect system speed. Advances have become incremental in recent years, with the savings of even a single wait state becomming important to improving system performance.

In a two-way set-associative cache, one of the ways must be chosen during a microprocessor read operation. The index portion of the asserted address is latched to the cache data and tag RAMs, and then when the cache tag RAMs return signals indicating a hit or miss to a first or second way, the output enables of the appropriate bank of cache data RAM corresponding to that way is enabled. But when running at 50 MHz, even the act of enabling the output buffers of the appropriate "way" of the cache can require a wait state. Cache designers have therefore implemented way prediction algorithms based on which way of the cache was most recently used. Then, when an address is strobed onto the processor host bus by the processor for a read operation, this most recently used way prediction logic predicts which way will be needed and enables that way's cache output enable. This occurs even before other more complicated circuitry determines which, if any, way is actually a hit, saving precious time in enabling the output of the cache data RAM.

This causes a problem, however, should the way be a miss. In such a case, the output enables of the bank that forms the first way must be disabled and only then the other way's output enables enabled. This will typically require extra wait states. But, because the way prediction logic will be correct at least half of the time, this generally improves system performance, allowing no wait state operation in at least half of the cases. But in high speed systems, the cache data RAM's output enables cannot wait on a read of the tag RAM to generate the most recently used bit. That is, the most recently used bit will not become available from the most recently used logic and the cache tag RAMs in time to enable the cache output enables in anticipation of a cache data RAM read. In such a case, only the use of extremely high speed SRAMs would allow no wait state operation.

Therefore, it would be desirable if other efficient way prediction algorithms could be developed that would allow no wait state operation in a majority of cases without using prohibitively expensive cache data SRAMs.

As noted above, a multi-way set-associative cache has historically been implemented using a separate physical bank of cache data RAM for each way, with the output enables being used for way selection.

In a two-way set-associative cache, at least two banks of memory would be required. Assuming a 64-bit-wide data bus and 32-bit-wide burst SRAMs, this would mean four physical chips. It would be greatly desirable to allow implementation of multi-way caches without these minimum requirements of memory banks, allowing less expensive cache memory systems to be designed. Generally, the only alternative in the past has been using a direct mapped cache memory subsystem.

To maintain coherency between the cache memory and main memory, cache tag RAMs typically have a number of bits of information associated with the state of the corresponding data in the cache data RAM. For example, a valid bit is typically used to indicate whether a particular line of a cache contains valid data. Further, in a writeback cache, in which data written from the processor to the cache is not updated to main memory until necessary, a modified bit indicates that the processor has written to a particular line of the cache data RAM, but that line has not been subsequently written back to main memory.

These bits typically provide another source of system delays. When the processor writes to a line of cache memory in the writeback cache that has not been modified, that modified bit must be updated to reflect the modified status of the corresponding line in the cache data RAM. This will typically take an extra clock cycle except in complicated, and expensive, multi-ported cache memory systems. In a cache memory system where the memory is only accessed through one bus, however, a write to an unmodified valid line in the cache data RAM typically requires extra clock cycles to update the modified bit in the cache tag RAM.

When the processor writes to the cache and the indexed line in both ways of the cache data RAM is not valid, or if both ways result in cache tag misses, then the cache does not contain the line of memory to which the processor is attempting to write. This condition instigates an allocation cycle for writeback caches. If the line of data in the chosen way of the cache data RAM is valid but a tag miss, that data must first be written back to main memory before the appropriate line of main memory is read into the cache, whereas, if the line of data in the cache data RAM is invalid, no writeback is needed. After such a writeback, if needed, the cache memory controller allocates a line in the cache data RAM for the addressed memory location. This line of data is read from main memory, and the corresponding index location of the tag RAM is updated to include the tag and the various valid and modified bits. A read allocation cycle is typically just a cache linefill, so the corresponding valid bits are set to true and the modified bits would be set to unmodified. The processor write operation that instigated the allocate is then permitted to restart, whereupon the appropriate data is written into the cache and the modified bit for that line of the cache is then asserted.

But as noted above, the assertion of this bit requires an extra clock cycle. Therefore, in single-ported cache memory systems, a write allocation cycle typically requires an extra wait state for the cache memory controller to set the appropriate modified bits on the subsequent write from the microprocessor. It would be desirable to eliminate such wait states.

SUMMARY OF THE INVENTION

In a computer system implemented according to the invention, wait states associated with the update of cache tag memory modified bits are eliminated during write allocate cycles. When a microprocessor write results in a cache miss, either because of a tag miss or because of an invalid line, the modified bits for that line are set true during the resulting line allocation cycle. Then, when the microprocessor resumes the write operation that caused the line allocation, the microprocessor will be writing to a "modified" line, even though the microprocessor has never actually modified that line of the cache. This eliminates the extra cycles normally required to update the modified bit from an unmodified state to a modified state during a processor write cycle.

BRIEF DESCRIPTION OF THE DRAWINGS

A better understanding of the present invention can be obtained when the following detailed description of the preferred embodiment is considered in conjunction with the following drawings, in which:

FIGS. 4A–4C and 5A–5F are schematic illustrations of circuitry used to generate the single-bank two-way cache way prediction signal according to the invention;

FIGS. 6A–6K and 7A–7G are schematic illustrations of circuitry used to assert the output enables to separate banks of the two-bank two-way cache according to the invention based on way prediction;

FIG. 11A–11C are schematic illustration of circuitry used within the module implementing the state machine of FIG. 10;

FIG. 12 is a state diagram of a local memory write state machine implemented in the cache and memory controller according to the invention;

FIG. 13A–13F are schematic illustration of circuitry used by the module implementing the state machine of FIG. 12;

FIGS. 15A–15E and 16A–16B are schematic illustrations of circuitry used within the module implementing the state machine of FIG. 14;

FIGS. 20A–20K are schematic illustrations of the circuitry used to create various signals used by the request module, principally relating to cache control;

FIGS. 21A–21D are schematic illustrations of circuitry used to generate various signals in the request block, including memory read, allocation, and back-off signals;

FIGS. 22A–22B are schematic illustrations of circuitry used to generate various signals relating to cache output enables and read hits;

FIGS. 23A–23G are schematic illustrations of circuitry used to generate various cache write related signals;

FIGS. 24A–24G are schematic illustrations of circuitry used to create various signal relating to the cache tag memory;

FIGS. 25A–25F are schematic illustrations of various circuitry used to generate signals for control of the cache data RAMs;

FIGS. 26A–26H are schematic illustrations of circuitry used to generate various cache chip select signals;

FIG. 28 is a block diagram illustrating the cache tag RAM implemented in the cache and memory controller according to the invention;

FIG. 29A is a state diagram of a state machine implemented within the cache and memory controller according to the invention that tracks writes to the cache tag memory;

FIG. 29B–31J are schematic illustrations of circuitry used in implementing the state machine of FIG. 29A;

DETAILED DESCRIPTION OF PREFERRED EMBODIMENT

The following disclosures are hereby incorporated by reference:

U.S. application Ser. No. 08/324,016, entitled "Single Bank, Multiple Way Cache Memory," by Sampong P. Olaug, Jens K. Ramsey, and Michael J. Collins, filed Oct. 14, 1994;

U.S. application Ser. No. 08/324,246, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994;

U.S. application Ser. No. 08/323,263, entitled "Data Error Detection and Correction System," by William J. Walker and Alan L. Goodrum, filed Oct. 14, 1994;

U.S. application Ser. No. 08/324,020, entitled "Circuit for Invalidating Portions of a Cache Memory if a Write Occurs to a Write Protected Area of Main Memory" by Jens K. Ramsey, filed Oct. 14, 1994;

U.S. application Ser. No. 08/323,110, entitled "Circuit for Placing a Cache Memory Into Low Power Mode in Response to Special Bus Cycles," by Jens K. Ramsey, and Jeffrey C. Stevens, filed Oct. 14, 1994; and U.S. application Ser. No. 08/324,011, entitled "System for Arbitrating Access to Memory" by John E. Larson, Michael Moriarty, Michael J. Collins and Gary W. Thome, filed Oct. 14, 1994; all of which are assigned to the assignee of this invention.

System Overview

Figure 1:
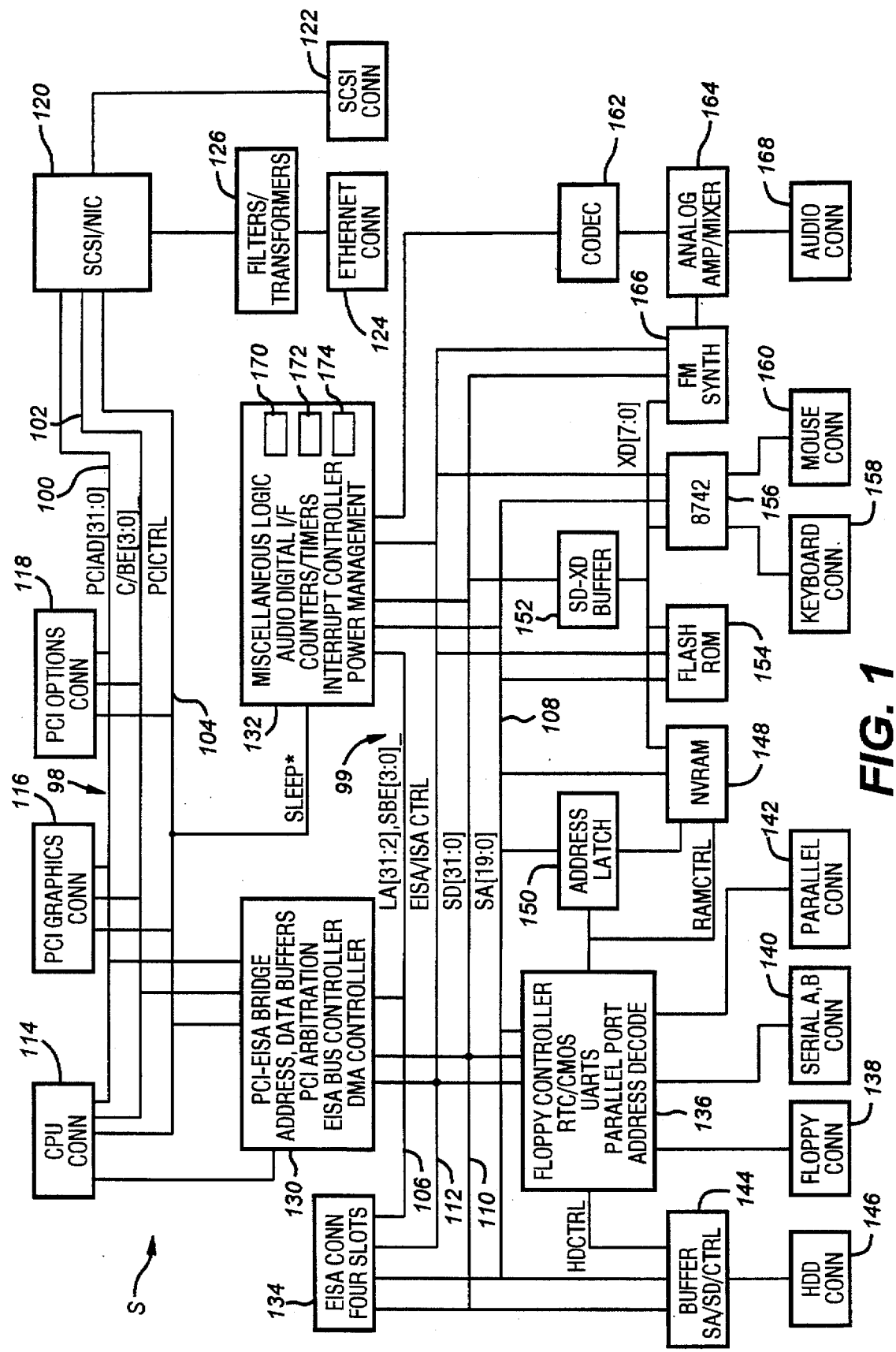
FIG. 1 is a block diagram of a system board of a computer system according to the preferred embodiment.

Referring to FIG. 1, the system board S of a computer system according to the present invention is shown. In the preferred embodiment, the system boards contain circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2:
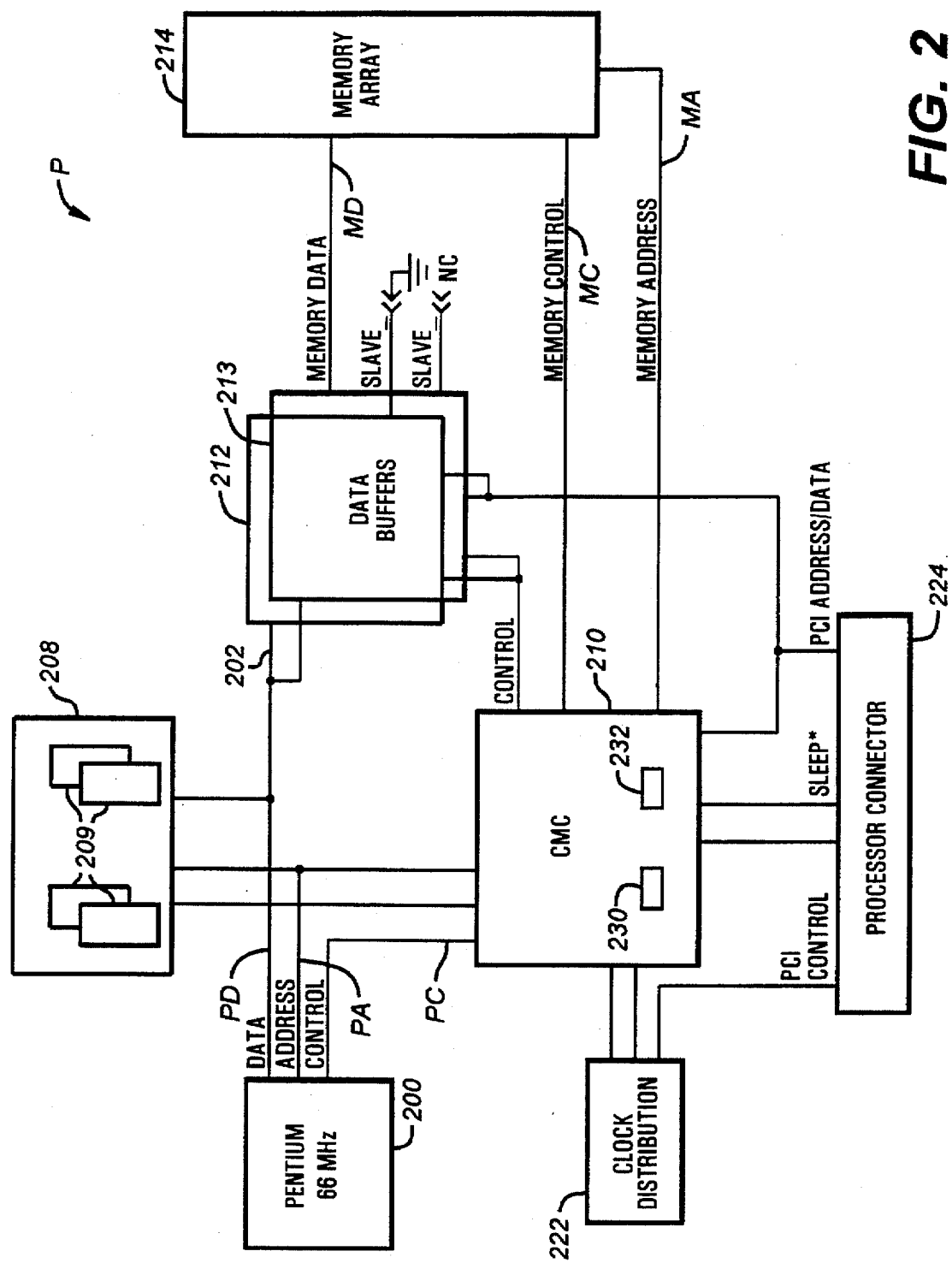
FIG. 2 is a block diagram of a processor board according to the present invention for use with the computer system of FIG. 1.

A CPU connector 114 is connected to the PCI bus P to receive interchangeable processor cards, such as the one shown in FIG. 2. A PCI graphics connector 116 is connected to the PCI bus P to receive a video graphics card as shown in FIG. 3. A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, and EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive.

A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer.

Referring now to FIG. 2, the processor board P is shown. In the processor board P of FIG. 2, the CPU or processor 200 can be any of a plurality of processors, such as the 486DX/33, 486DX2/66, 486DX4/50-100, 486DX4/33-100, 486DX4/33-83, P24T, Pentium 50/75, Pentium 60/90, and Pentium 66/100, and other similar and compatible processors. The processor 200 provides data, address and control portions 202, 204 and 206 to form a processor bus PB. A level 2 (L2) or external cache memory system 208 is connected to the processor bus PB to provide additional caching capabilities to improve performance of the computer system. The L2 cache 208 can be organized as a 128 kbyte direct mapped cache or 256 kbyte two-way set associative cache when used with 486 family processor and as a 256 or 512 kbyte direct mapped or two-way set associative cache when used with Pentium family processors. In the preferred embodiment, however, the L2 cache 208 is implemented in the two-way set-associative mode. A cache and memory controller (CMC) and PCI bridge chip 210, is connected to the control portion 206 and to the address portion 204. The CMC 210 is connected to the L2 cache 208 as it incorporates the cache controller and therefore controls the operations of the cache memory devices in the L2 cache 208. The CMC 210 is also connected to control a series of address and data buffers 212. The data buffers 212 are utilized to handle memory data to a main memory array 214. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210. Clock distribution and generation circuitry 222 is associated with the processor card P and is connected to the CMC 210. A processor connector 224, such as a card edge, is provided to be mateably received by the processor connector 114. The processor connector 224 is connected to the CMC 210, the data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Cache Memory Controller Overview

Hardware Configuration

Figure 3A:
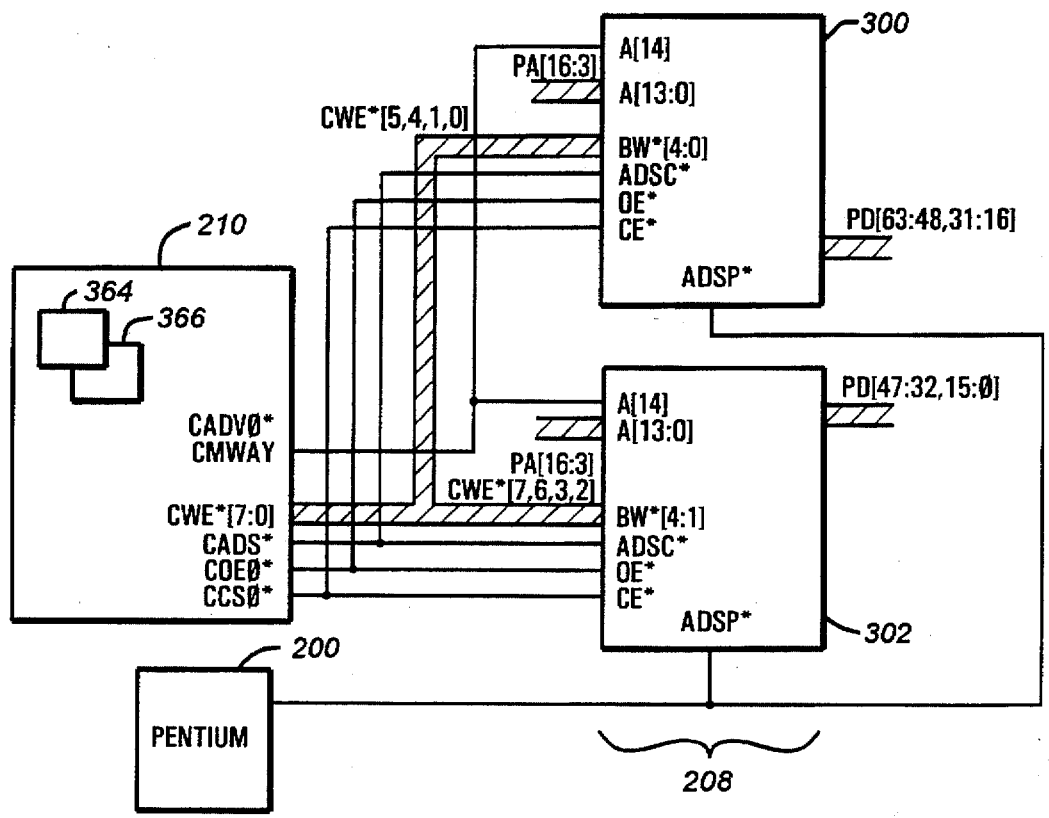
FIG. 3A is a block diagram illustrating a single-bank two-way cache implemented according to the invention.
Figure 3B:
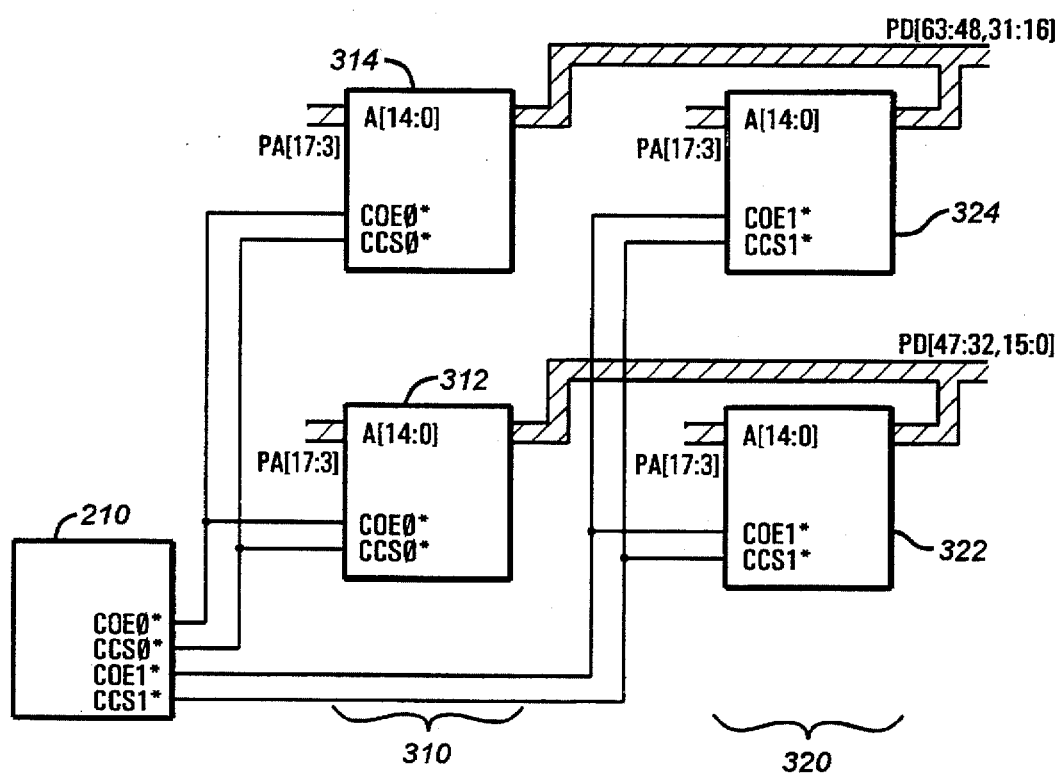
FIG. 3B is a block diagram illustrating a two-bank two-way cache implementing certain features according to the invention.
Figure 3C:
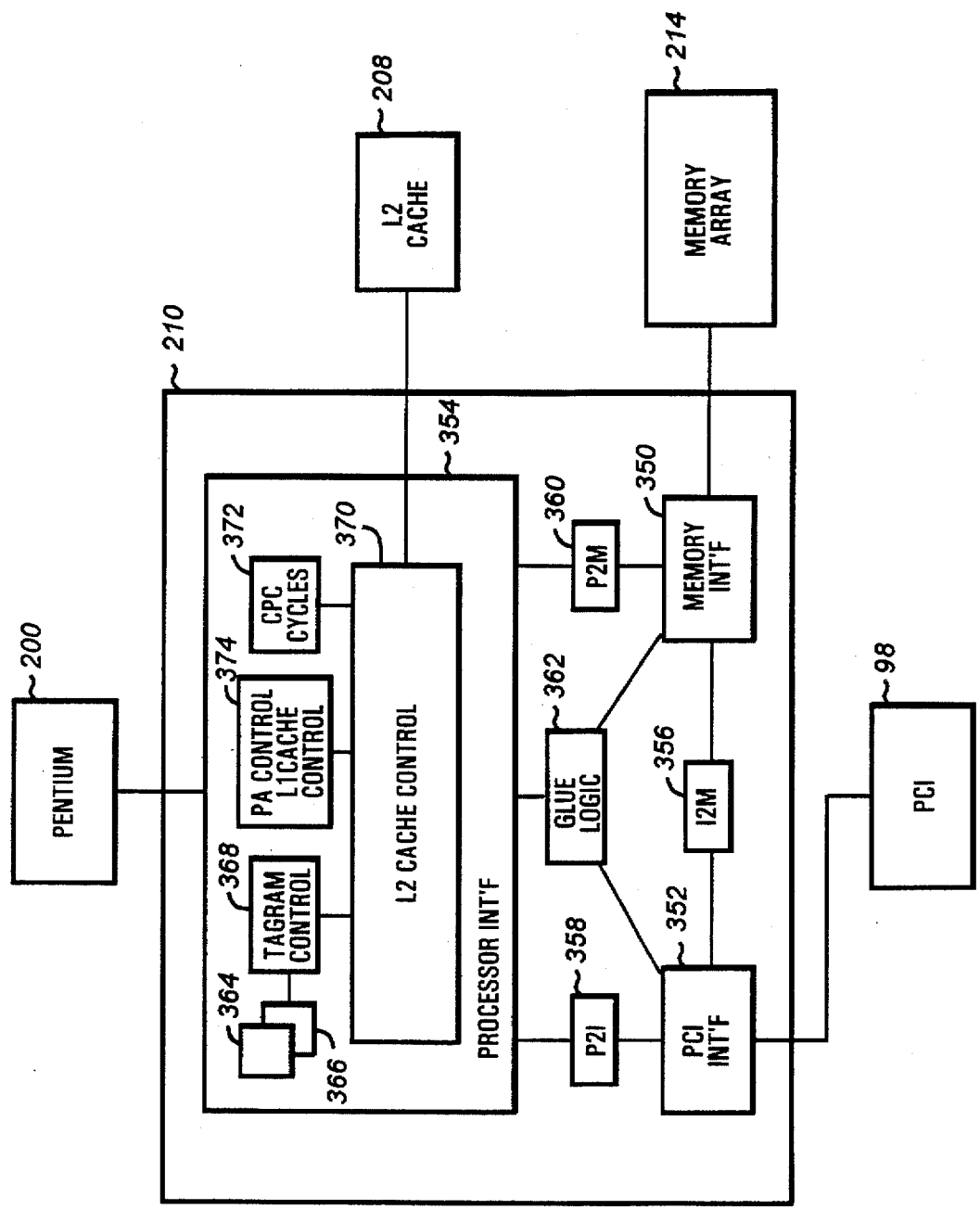
FIGS. 3C and 3D are block diagrams of a cache and memory controller according to the invention showing specific logical modules and blocks within that controller.

Turning to FIGS. 3A to 3C, further details of the CMC 210 and its connections to the L2 cache 208 are shown. Turning to FIG. 3A, the L2 cache 208 includes two 32-bit wide synchronous burst SRAMs 300 and 302. These are preferably MT58LCK36B2 32K by 36 synchronous burst SRAMs by Micron Semiconductor, Inc. Two burst SRAMs 300 and 302 are used in the disclosed embodiment because the processor data bus is 64 bits wide. The burst SRAM 300 is connected to the processor 200 data bus lines PD[63:48, 31:19], while the burst SRAM 302 is connected to lines PD[47:32, 15:0]. Thus, each of the burst SRAMS 300 and 302 provides half of the data to and from the processor 200 data bus. The processor 200 address bus PA, however, is identically connected to each of the burst SRAMs 300 and 302. PA[16:3] is provided to fourteen address inputs of each of the burst SRAMs 300 and 302, thus providing a 14-bit index. The fifteenth address input A[14] of the burst SRAMs 300 and 302, however, is provided by a cache memory way selection signal CMWAY, which according to the invention, provides for a two-way cache using the single bank of cache data memory. This signal is generated by the CMC 210, and will be discussed below in conjunction with FIG. 4A–4C. Other inputs provided by the CMC 210 to the burst SRAMs 300 and 302 are an active low output enable signal COE0* that is provided to the chip output enable inputs, a cache address strobe signal CADS0* that is provided to the controller address strobe input of the burst SRAMs 300 and 302, a cache chip select signal CCS0* that is provided to the chip enable input of the burst SRAMs 300 and 302, a cache advance strobe CADV* that is provided to the cache advance input of the burst SRAMs 300 and 302, and cache write enable signals CWE*[7:0], the appropriate ones of which are provided to each of the burst SRAMs 300 and 302 corresponding to the data lines PD to which the burst SRAMs 300 and 302 are connected. These signals are further described below in conjunction with FIGS. 4A–4C, 6A–6K, and 25A–25F.

Certain signals in the computer system S according to the invention are physically manifested as active low signals. That is, when the physical signal is logical low, it is considered true. Such signals are generally designated by being following with an asterisk, "*". When discussing these signals in a logical sense, they will often be referred to without the asterisk, "*", which indicates a corresponding, active high logical signal. A logical negation operation, as opposed to the logic sense of a physical signal, is delineated by placing an exclamation point, "!", in front of the signal. In the figures, this technique is used to reduce drawing complexity that would be necessitated by showing the inverters necessary with this convention.

In prior art systems, if the burst SRAMs 300 and 302 were used to implement a two-way set-associative cache, four such chips would be necessary. FIG. 3B illustrates such a system. This is an alternative embodiment for implementing one aspect according to the invention. FIG. 3B illustrates a first bank 310 of such a two-way set-associative cache. In such a two-bank mode, all 15 bits of the first bank 310 address inputs are connected to PA[17:3], with the CMC 210 providing COE0* as before to the first bank 310, but now providing a second enable signal COE1* as the chip output enable to the second way, formed by a second bank 320. Similarly, a second chip select signal CCS1* is provided to the second bank 320, and now each bank requires two burst SRAMs 312 and 314, and 322 and 324, to handle the 64-bit data path of PD[63:0]. Even in such a prior art system, advantages can result when the last code read or last code plus data read way prediction according to the invention is used. This is further discussed below, especially in conjunction with FIG. 33. Selection in FIG. 3B between the two ways formed by banks 310 and 320 requires either waiting until tag RAMS 364 or 366 in the CMC 210 have returned a hit to one way or the other way and then selecting the appropriate way of the banks 310 or 320 using COE0* or COE1*, or alternatively, predicting which way of the banks 310 or 320 the next processor 200 operation would be directed to, typically based on a least recently used algorithm from data in the tag RAMs 364 or 366. In either case, however, a separate physical bank of chips would be necessary for each way.

According to one aspect of the invention, however, the CMC 210 provides CMWAY to the burst SRAMs 300 and 302. In this manner, the appropriate way of the burst SRAMs 300 or 302 is then selected not by enabling one bank or another as would be the case in FIG. 3B, but instead by using a single address line. This cuts in half the number of chips required for a two-way set-associative cache.

A further advantage is that should the way prediction logic in the CMC 210 used to generate CMWAY be incorrect, no delay is necessary for disabling the first bank 310 of FIG. 3B, and then enabling the second bank 320. Instead, CMWAY can simply be changed to the appropriate way and the address restrobed, with no wait states need to avoid bus contention as could occur between the two ways of the banks 310 and 320 of FIG. 3B. In prior art systems, the output enables of the first bank 310 would have to be deselected and then the second bank 320 output enables selected after an appropriate delay, thus adding wait states to the cache operation.

One problem with using CMWAY as the way selection line is that the index cannot be strobed into the burst SRAMs 300 and 302 until CMWAY is valid. In prior systems as shown in FIG. 3B, the entire index PA[17:3] was strobed into both banks 310 and 320, and then the appropriate COE0* or COE1* would be used to select between one way or the other. Using such a two-bank system, the way selection could occur very late in the cache memory read or write cycle, well after the address strobe. Using the single-bank two-way cache as shown in FIG. 3A, however, CMWAY must be selected by the time an address strobe signal PADS* from the processor 200 occurs.

This means that most-recently-used way selection algorithms are not appropriate. Using such an algorithm, CMWAY would not be available until after the tag RAMs 364 and 366 in the CMC 210 had been strobed with PADS*. But by that time, the selection of CMWAY would be too late, and a wait state would always be necessary.

According to the invention, instead of using most-recently-used way prediction or no prediction, the appropriate way is predicted based on either the last code read operation or the last code or data read operation. This is not based on the memory address PA asserted by the microprocessor 200, so such prediction can be provided as CMWAY before the microprocessor 200 asserts PADS*.

Logical Blocks of the CMC

Turning to FIG. 3C, logical blocks implemented within the CMC 210 are shown. The state machines and other related circuitry of these various blocks is discussed below as appropriate. A memory interface 350, a PCI bus interface 352, and a processor interface 354 are all coupled in a delta configuration by queues 356, 358, and 360. Further, glue logic 362 communicates with the PCI interface 352 and the memory interface 350 and provides signals to the microprocessor interface 354. The memory interface 350 couples the CMC 210 with the memory array 214, the PCI interface 352 couples the CMC 210 with the PCI bus, and the microprocessor interface 354 connects the CMC 210 to the microprocessor 200.

The processor interface 354 is of principal interest, because it controls the L2 cache 208 through a number of submodules, including the tag RAMs 364 and 366 coupled to a tag RAM controller module 368. The tag RAM controller module 368 is not a separate physical part, but is instead a module implemented in the application specific integrated circuit of the CMC 210. The tag RAM controller module 368 communicates various signals with an L2 cache controller module 370. The L2 cache controller module 370 communicates with a CPU cycle tracking module 372 that tracks the CPU cycles as is well known to the art, and further communicates with a processor address control module and L1 cache interface 374.

The CPU cycle tracking module 372 includes a number of state machines for tracking system operation, including a processor state machine, which provides signals indicative of the current type of cycle running in the processor 200 and a CPU request queue state machine, which tracks outstanding processor cycle requests. It also includes a memory read state machine, which tracks processor to memory reads. The memory read state machine tracks both burst and non-burst memory reads, and if a read has been committed to the memory system through the queue 360, and it is then backed off by assertion of a processor backoff signal PBOFF* to the microprocessor 200, a standard microprocessor signal in the Pentium®, the memory read state machine tracks that backed off memory cycle and recognizes that cycle when the microprocessor 200 restarts it.

The CPU tracking module 372 also includes a local write state machine that tracks local memory write cycles, discussed below in conjunction with FIG. 12. Also included is a PCI read state machine and a PCI write state machine. A ready state machine generates processor PRDY* and PBRDY* signals, only the latter of which is used when the processor 200 is a Pentium® processor. Finally, the CPU cycle tracking module 372 further includes control logic for the data buffers 212 and 213.

Figure 3D:
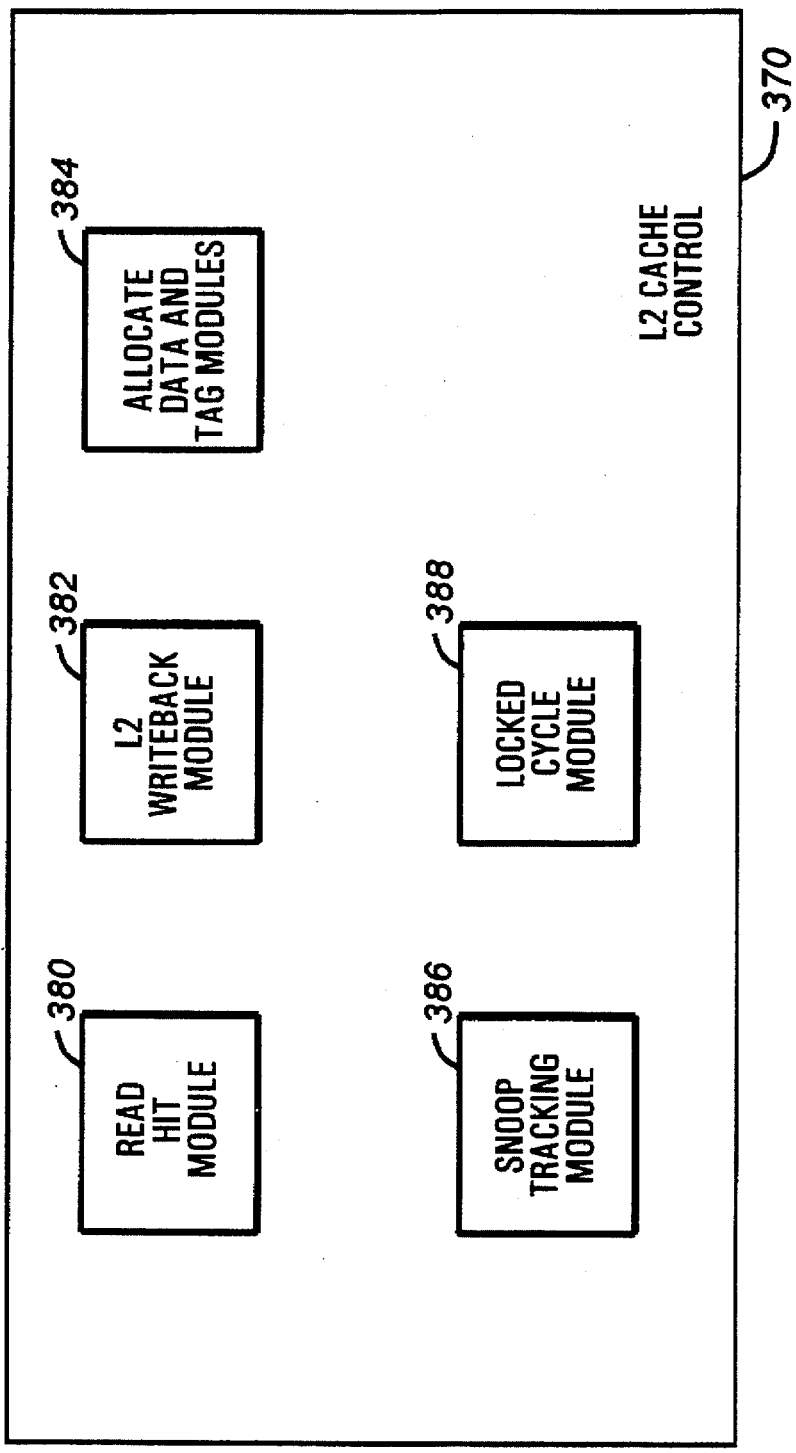

Turning to FIG. 3D, the principal logic of interest is in the L2 cache controller 370. Included in this module is a read hit module 380, discussed below in conjunction with FIG. 8, which tracks L2 cache 208 read hits. Also contained is an L2 writeback module 382, which tracks writebacks of the L2 cache 208 to the memory array 214, as discussed below in conjunction with FIG. 10. Also included are allocate data and tag modules 384, which are responsible for performing allocate cycles to the L2 cache 208 and also for allocating tags in the tag RAMs 364 and 366. This logic is discussed below in conjunction with FIGS. 14 and 17. The L2 cache control module 370 also contains snoop tracking module 386 for tracking the states of both L1 and L2 snoops, and a locked cycle module 388. The implementation of the modules 386 and 388 is well known to the art, and any changes will be readily apparent from the discussion of the other logic implemented in the L2 cache control module 370.

In the discussion that follows, an effort has been made to focus on various signals most pertinent to various aspects of the invention. To that end, for clarity, certain states and state machines have been omitted, as has the generation of certain signals and the use of certain signals as inputs to various gates.

Specifically, the following assumptions are made in the discussion that follows. All memory cycles are cachable, all caches are implemented as writeback rather than write-through caches, all writes are to local memory rather than to the PCI bus, all memory locations are writebackable, all of the queues 356, 358, and 360 are empty, there is no write-protected memory, reset logic has been omitted, snoop logic has been omitted, flush logic has been omitted, locked cycles are excluded, and the generation of well known signals has been omitted. Further, all caches are on. Inclusion of these alternatives into the disclosed logic can be readily performed by those skilled in the art.

Way Selection Circuitry

Figures 4A, 4B, 4C:
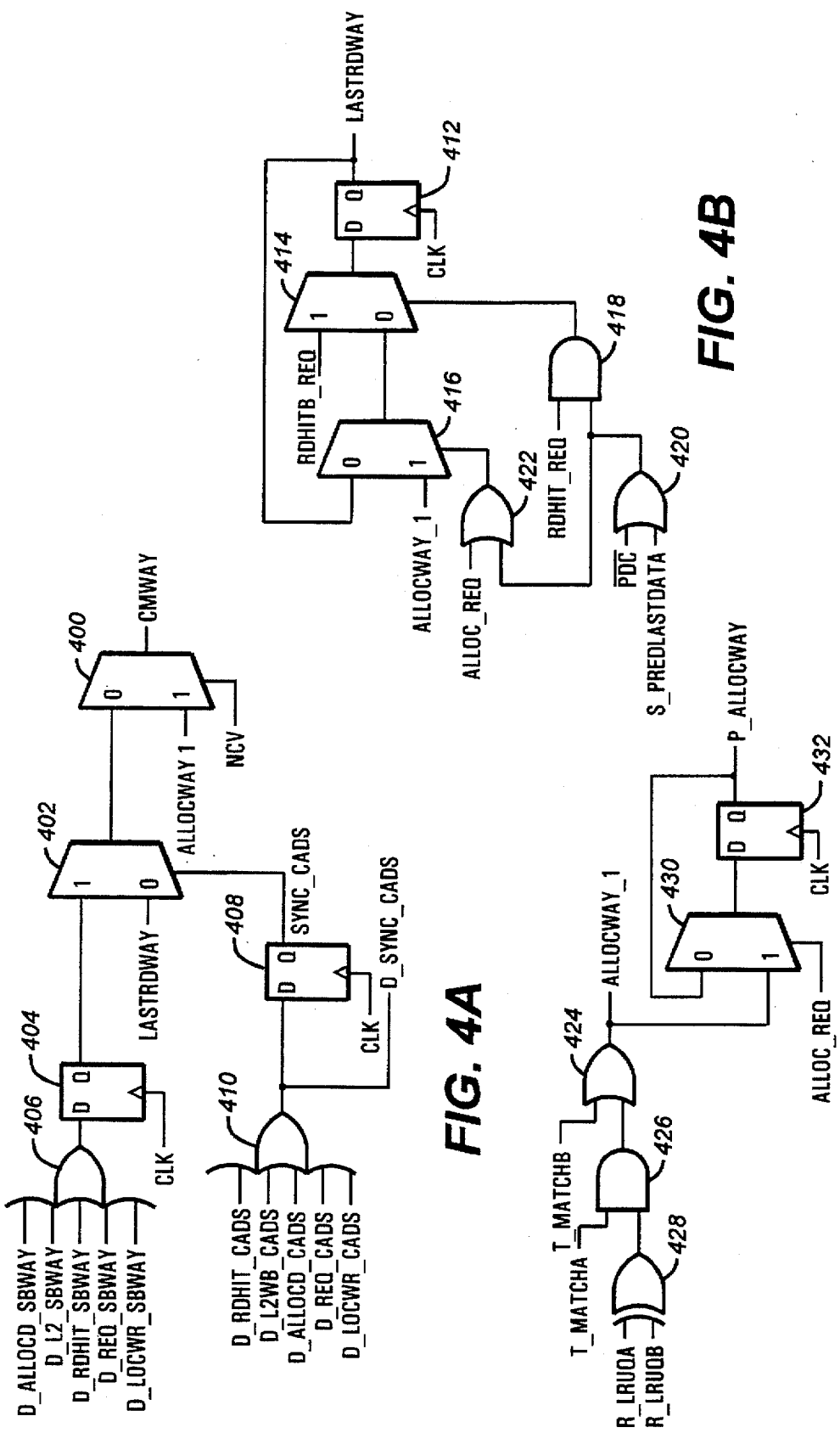
Figure 7D:
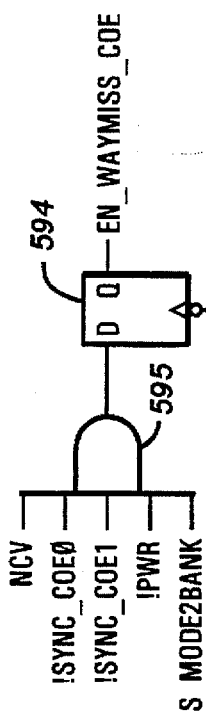
Figure 7E:
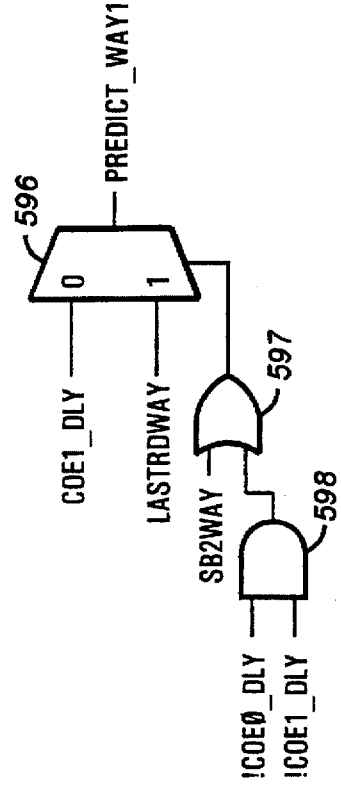
Figure 7F:
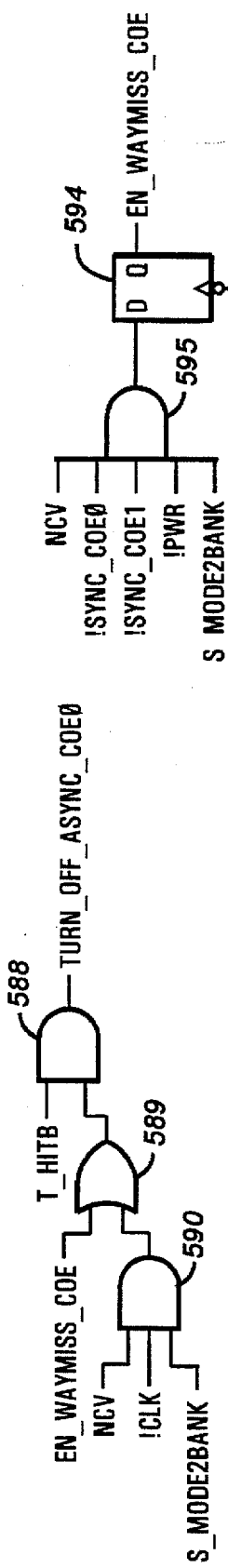
Figure 7G:
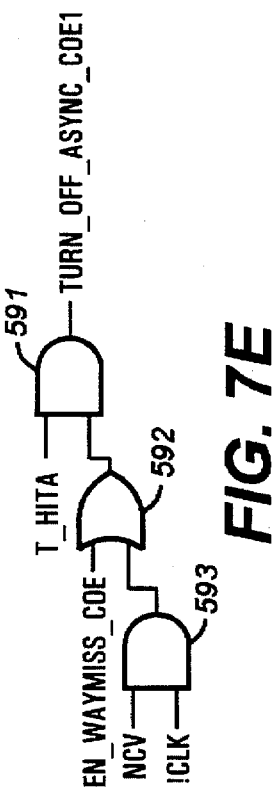

Turning to FIGS. 4A–4C, the circuitry for generating CMWAY is shown. CMWAY is provided by a multiplexer 400, which is switched by a new processor cycle available and valid signal NCV, discussed below in conjunction with FIGS. 27A–27C. NCV is true at the start of each new processor operation. When NCV is true, or high, CMWAY is provided by an allocation way signal ALLOCWAY_1. When NCV is false, the multiplexer 400 provides CMWAY from the output of a second multiplexer 402.

The select input of the multiplexer 402 is provided by a synchronous cache address strobe signal SYNC_CADS. SYNC_CADS is true in synchronization with the system clock CLK whenever the cache address strobes are being asserted. When SYNC_CADS is false, the multiplexer 402 provides a last read way signal LASTRDWAY on its zero input to the one input of the multiplexer 400. LASTRDWAY reflects either the way of the last code read or the way of the last code or data read, depending which mode is enabled. When SYNC_CADS is true, the multiplexer 402 provides a signal from the Q output of a flip-flop 404 to the one input of the multiplexer 400. The flip-flop 404 is clocked by a system clock signal CLK, typically 50 MHz, and as its D input receives the output of an OR gate 406, which receives as inputs a number of single-bank way signals D_ALLOCD_SBWAY (see FIG. 14), D_L2_SBWAY (see FIG. 10), D_RDHIT_SBWAY (see FIG. 8), D_REQ_SBWAY (see FIG. 19), D_LOCWR_SBWAY (see FIG. 12). These signals are provided by various other logical blocks in the CMC 210, and will be further described below. To summarize, however, each of these blocks when active drives the appropriate way of CMWAY. These signals are provided by these blocks when the actual cache way is known, whereas LASTRDWAY and ALLOCWAY_1 are provided respectively by the way prediction logic and the line allocation logic in the CMC 210.

SYNC_CADS is provided by a flip-flop 408 that is clocked by CLK and as a D input receives an input D_SYNC_CADS, which is provided by the output of an OR gate 410. The inputs of the OR gate 410 include D_RDHIT_CADS (see FIG. 8), D_L2WB_CADS (see FIG. 10), D_ALLOCD_CADS (see FIG. 14), D_REQ_CADS (see FIG. 19), and D_LOCWR_CADS (see FIG. 12). These signals are again provided by various blocks of the CMC 210 discussed below, and are generated by state machines that determine when to strobe the cache address strobe to the burst SRAMs 300 and 302.

Of note, a number of signals have been omitted. For example, the CMC 210 includes locked cycle logic as well as snooping logic which also may generate corresponding SBWAY and CADS signals. The implementation of such blocks is well known to the art of cache design, and one skilled in the art would readily understand from the following disclosure how to implement the SBWAY and CADS signals out of these blocks.

Also shown in FIG. 4A–4C is circuitry used to generate LASTRDWAY. This signal is synchronized to the system clock by a flip-flop 412, which as a D input receives the output of a multiplexer 414. When the select line of the multiplexer 414 is high, a signal RDHITB_REQ (discussed in conjunction with FIG. 5A–5F) indicating a read hit to way 1 (also called way B), is provided to the flip-flop 412. When the select input to the multiplexer 414 is low, the output of a multiplexer 416 is selected instead. When the select input of the multiplexer 416 is low, LASTRDWAY is provided through feedback to the multiplexer 414 zero input. When the select input of the multiplexer 416 is high, ALLOCWAY_1 is provided to the zero input of the multiplexer 414.

The select input of the multiplexer 414 is driven by the output of an AND gate 418, which as inputs receives a read way hit true signal RDHIT_REQ, discussed below in conjunction with FIG. 5A–5F. As a second input, the AND gate 418 receives the output of an OR gate 420, which as inputs receives the inverse of a processor data/code signal PDC, as well as a registered signal S_PREDLASTDATA, an I/O register signal set by startup software, which when true indicates that way prediction is based on both last code and data reads, rather than just last code reads.

The multiplexer 416 select input is driven by an AND gate 442, which as inputs receives a line allocation request signal ALLOC_REQ, discussed in conjunction with FIG. 5A–5F, as well as the output of the OR gate 420. ALLOC_REQ becomes true when a line must be allocated in the cache, either because of a write to an invalid line, a write to a valid line that is a tag miss, or a read tag miss.

The output of the OR gate 420 is true when either code and data reads are to be used for way prediction, or when a code read is occurring. The AND gates 418 and 422 then select the appropriate way prediction, which is the last read way on a read hit request or the line allocation way on an allocation request.

ALLOCWAY_1 is provided by the output of an OR gate 424, which as inputs receives a way B match signal T_MATCHB as well as the output of an AND gate 426. The AND gate 426 receives as inputs a way A match signal T_MATCHA and the output an XOR gate 428. T_MATCHA and T_MATCHB are true when the label being output from the appropriate tag RAM 364 or 366 is equal to the label being input. The XOR gate 428 receives as inputs two least recently used signals R_LRUQA and R_LRUQB, which are provided as outputs of the tag RAMs 364 and 366 in the CMC 210. Those tag RAMs 364 and 366 are discussed below in conjunction with FIG. 28. As an ultimate result, ALLOCWAY_1 either selects way 0 if there is a match to way A, way 1 if there is a match to way B, or the least recently used way otherwise. This is the appropriate way to allocate. If a tag match, of course one should refill to that line and if no match, one should allocate to the least recently used way.

ALLOCWAY_1 is also latched through the one input of a multiplexer 430, whose output is provided as the D input of a CLK clocked flip-flop 432. The Q output of flip-flop 448 is provided as a latched allocate way signal P_ALLOCWAY. The multiplexer 432 select input is driven by ALLOC_REQ and when that signal is low, P_ALLOCWAY remains unchanged. So on an allocate request, P_ALLOCWAY is latched to the value of ALLOCWAY_1.

In operation, ALLOCWAY_1 provides either the way to which the tag RAMS 364 and 366 indicate a match, or if no match, the way to which an allocate cycle should write data. So, on a valid new cycle indicated by NCV, CMWAY is provided by ALLOCWAY_1. This is appropriate, because NCV immediately follows the standard processor address strobe PADS, so if CMWAY is strobed in by the cache address strobes on the cycle following PADS, it should be strobed to the correct way as actually determined by ALLOCWAY_1.

When NCV is false, LASTRDWAY is provided as CMWAY when SYNC_CADS is false. This is appropriate, because this would be the predicted way. When SYNC_CADS is true, the burst SRAMs 300 and 302 are being strobed with CADS*, so when NCV is false and the burst SRAMs 300 and 302 are being strobed with CADS*, the way selected is the appropriate SBWAY signal from the various control blocks of the CMC 210.

Turning to FIG. 5A–5F, the circuitry for generating RDHIT_REQ, a read hit way signal RDHIT_WAY, and ALLOC_REQ is shown.

RDHIT_REQ is provided by the output of an OR gate 434, which receives as inputs RDHITA_REQ and RDHITB_REQ, which are the outputs of an AND gate 436 and an AND gate 438. The AND gate 436 receives as inputs a hit to way A signal T_HITA and a cachable read on a valid new cycle signal NCV_CACHABLE_READ, generated by logic not shown. The AND gate 438 similarly receives a hit to way B signal T_HITB and NCV_CACHABLE_READ. Because all reads are assumed cachable, NCV_CACHABLE_READ will be true on all reads when NCV is true.

ALLOC_REQ is provided by the output of an AND gate 440, which as inputs receives NCV, a tag miss signal TAGMISS, and a signal indicating a read or write cycle READ_OR_WRITE_CYC, generated by circuitry not shown. ALLOC_REQ is thus true on a new cycle which is a memory read or write cycle and is a tag miss. In such case, a line must be allocated in the L2 cache 208.

RDHIT_WAY indicates to which cache way a read has hit, and is provided by the output of a flip-flop 442, which is clocked by CLK and receives as its D input RDHITB_REQ from the one input of a multiplexer 444 when the multiplexer select input is driven high by a RDHIT_REQ. Otherwise, the multiplexer 444 provides RDHIT_WAY to the D input of the flip-flop 508.

T_HITA is provided as the output of an AND gate 446, which receives as inputs a tag RAM way A label comparison signal LABELACMPR (which is the equivalent of T_MATCHA) and a tag RAM way A current line valid signal LINEVALIDA, discussed below in conjunction with FIG. 31A–31J. LABELACMPR is provided by the output of a comparator 448, which as inputs receives tag RAM way A label input signals T_LABELDA[10:0], as well as tag RAM way A label output signals R_LABELQA[10:0], discussed below in conjunction with FIG. 28. Thus, LABELACMPR is true when the label being driven to the way A tag RAM 364 is the same as the label actually in the tag RAM 364. T_HITB is generated in a similar way using way B signals with circuitry not shown.

TAGMISS, which is true on a miss to the tag RAMS 364 and 366, is provided by the output of an AND gate 450, which receives as inputs the inverse of T_HITA and T_HITB. Similarly, a tag match signal TAGMATCH is provided by the output of an OR gate 452 which receives as inputs LABELACMPR and LABELBCMPR.

Cache Output Enables for Dual Bank Cache

Turning to FIG. 6A–6K, circuitry is shown illustrating the generation to the two banks 310 and 320 of the two bank, two way cache of FIG. 3B are shown. In the disclosed embodiment, COE0 is used as the cache output enable for the single-bank two-way cache of FIG. 3A, whereas both COE0 and COE1 are used in the two bank, two way cache.

COE0 is provided by an OR gate 550, which receives as inputs a predict pipelined way 0 hit signal PIP_PRED_COE0, a predict last way 0 hit signal LASTWAY_PRED_COE0, an early single bank output enable signal EARLY_1B_COE0, an early way miss signal EARLY_WAYMISS_COE0, an early cache enable on read hit signal RDHIT_EARLY_PIP_COE0 (see FIGS. 9A–9D), and a synchronized way 0 cache enable signal SYNC_COE0. The generation of these signals will be further described below.

An OR gate 552 provides a corresponding signal COE1, which is the equivalent of COE0, with the exception that EARLY_1B_COE1 does not exist. This is because COE1 is not used in the single bank, two way case. Otherwise, all signals merely substitute for corresponding way 0 signals.

SYNC_COE0 is the synchronized combination of COE signals from a number of modules, and is provided by the output of a flip-flop 554, clocked to CLK, whose D input receives the output of an OR gate 556. The OR gate 556 as inputs receives cache output enable way request signals from various of the modules to be discussed below, including a read hit way 0 request signal D_RDHIT_COE0 (see FIG. 8), an L2 writeback way 0 request signal D_L2WB_COE0 (see FIG. 10), and a cycle request logic way 0 request signal D_REQ_COE0 (see FIG. 19). SYNC_COE1 is provided in a similar manner by a flip-flop 558 and OR gate 560.

A delayed COE0 signal COE0_DLY is provided by the output of a flip-flop 562, clocked to CLK, which receives the output of an OR gate 564 as its D input. The OR gate 564 receives as its inputs SYNC_COE0 and the output of an AND gate 566, which receives as inputs NCV and COE0. A corresponding signal COE1_DLY is provided by similar circuitry using a flip-flop 568, an OR gate 569, and an AND gate 570.

LASTWAY_PRED_COE0 is provided by the output of an AND gate 572, which receives as inputs an enable two bank COE prediction signal EN_2B_PRED_COE, the inverse of SYNC_COE1, the inverse of an asynchronous COE way 0 disable signal TURN_OFF_ASYNC_COE0, a lengthened address strobe signal P2DLY, the inverse of a processor write signal PWR, and the inverse of LASTRDWAY. P2DLY is provided by the output of an OR gate 573, which as inputs receives a processor address strobe signal PADS, a delayed address strobe signal DLY_PADS, and a double delayed address strobe signal DLY2_PADS. The corresponding way 1 signal LASTWAY_PRED_COE1 is provided by similar circuitry out of an AND gate 574, which combines the corresponding way 1 signals. Thus, LASTWAY_PRED_COE0 is true when way 0 is the predicted way based upon the last read way, and it has not been determined that there is a way miss to way 0.

EN_2B_PRED_COE is provided by the output of a negative edge clocked flip-flop 576, which is clocked on the falling edge of CLK. As its D input, it receives the output of an AND gate 577, which receives as inputs the inverse of SYNC_COE0, the inverse of SYNC_COE1, and a two-way two-bank enabled signal S_MODE2BANK, which is accessed via an I/O register.

EARLY_1B_COE0 is provided by the output of an AND gate 578, which as inputs receives the inverse of S_MODE2BANK, P2DLY, and the inverse of PWR. EARLY_1B_COE0 will only be true in the single bank two-way case, whereas the signal_EN_2B_PRED_COE will only be true in the two bank, two way case.

DLY_PADS is provided by the Q output of a flip-flop 580, clocked by CLK, which receives as its D input PADS. DLY_2PADS is provided by the Q output of a flip-flop 581, which receives as its D input DLY_PADS and which is clocked on the negative edge of CLK.

Turning to FIG. 7A–7G, further circuitry for generating the L2 cache 208 output enables is shown. PIP_PRED_COE is provided by the output of an AND gate 582, which as inputs receives the inverse of TURN_OFF_ASYNC_COE0, P2DLY, and the inverse of PWR. It also as an input receives the Q output of a flip-flop 583 which as its D input receives SYNC_COE0, and which is clocked on the negative edge of CLK. PIP_PRED_COE1 is provided by an AND gate 584 and a flip-flop 585 implemented in a manner similar to PIP_PRED_COE0, with the way 1 signals substituted for the way 0 signals.

EARLY_WAYMISS_COE0 is provided by an AND gate 586 that receives as inputs T_HITA and a way miss enable signal EN_WAYMISS_COE, while EARLY_WAYMISS_COE1 is provided by an AND gate 587 that receives as its inputs EN_WAYMISS_COE and $T_{13}$ HITB. EARLY_WAYMISS_COE0 thus goes true immediately after PADS when it is determined that the operation was actually a tag hit to way 0.

TURN_OFF_F_ASYNC_COE0 is provided by the output of an AND gate 588, which receives as its inputs T_HITB and the output of an OR gate 589. This signal is used to turn off the wrong bank 310 or 320 if it was turned on using way prediction. This is done on a hit to the other way. The OR gate 589 receives as its inputs EN_WAYMISS_COE and the output of an AND gate 590, which in turn receives as inputs NCV, the inverse of CLK, and S_MODE2BANK. TURN_OFF_ASYNC_COE0 goes true when it is determined that the current operation is a way miss to way 0, thus turning off COE0 immediately.

TURN_OFF_ASYNC_COE1 is provided by the output of an AND gate 591, which receives as its inputs T_HITA and the output of an OR gate 592. This OR gate 592 receives as its inputs EN_WAYMISS_COE and the output of an AND gate 593, which in turn receives as its inputs NCV and the inverse of CLK.

EN_WAYMISS_COE is provided by the output of a flip-flop 594, which is clocked on the negative edge of CLK. As its D input, the flip-flop 594 receives the output of an AND gate 595. The AND gate 595 receives as its inputs NCV, the inverse of SYNC_COE0, the inverse of SYNC_COE1, the inverse of PWR, and S_MOD2BANK. EN_WAYMISS_COE thus enables the logic that determines whether there was a way hit or a way miss, allowing COEs to be switched if necessary.

A way prediction signal PREDICT_WAY1 is provided by the output of a multiplexer 596, whose select input is driven by the output of an OR gate 597. The OR gate 597 receives as its inputs a registered single bank, two way signal SB2WAY and the output of an AND gate 598, which receives as its inputs the inverse of COE0_DLY and the inverse of COE1_DLY. The zero input of the multiplexer 596 is provided by COE1_DLY, while the one input is provided by LASTRDWAY. PREDICT_WAY1 provides LASTRDWAY in a single bank system or if both delayed COEs are false, whereas it provides the delayed COE1 otherwise.

The various timings of COE0 and COE1 are discussed below in conjunction with FIG. 33. When in two-bank, two-way mode, either COE0 or COE1 is predriven based on a prediction of what the next memory operation way will be. If that prediction fails, COE0 and COE1 are switched, allowing access to the proper way, albeit after a wait state.

Various Modules of the CMC

L2 Cache Read Hit Module

Figure 8:
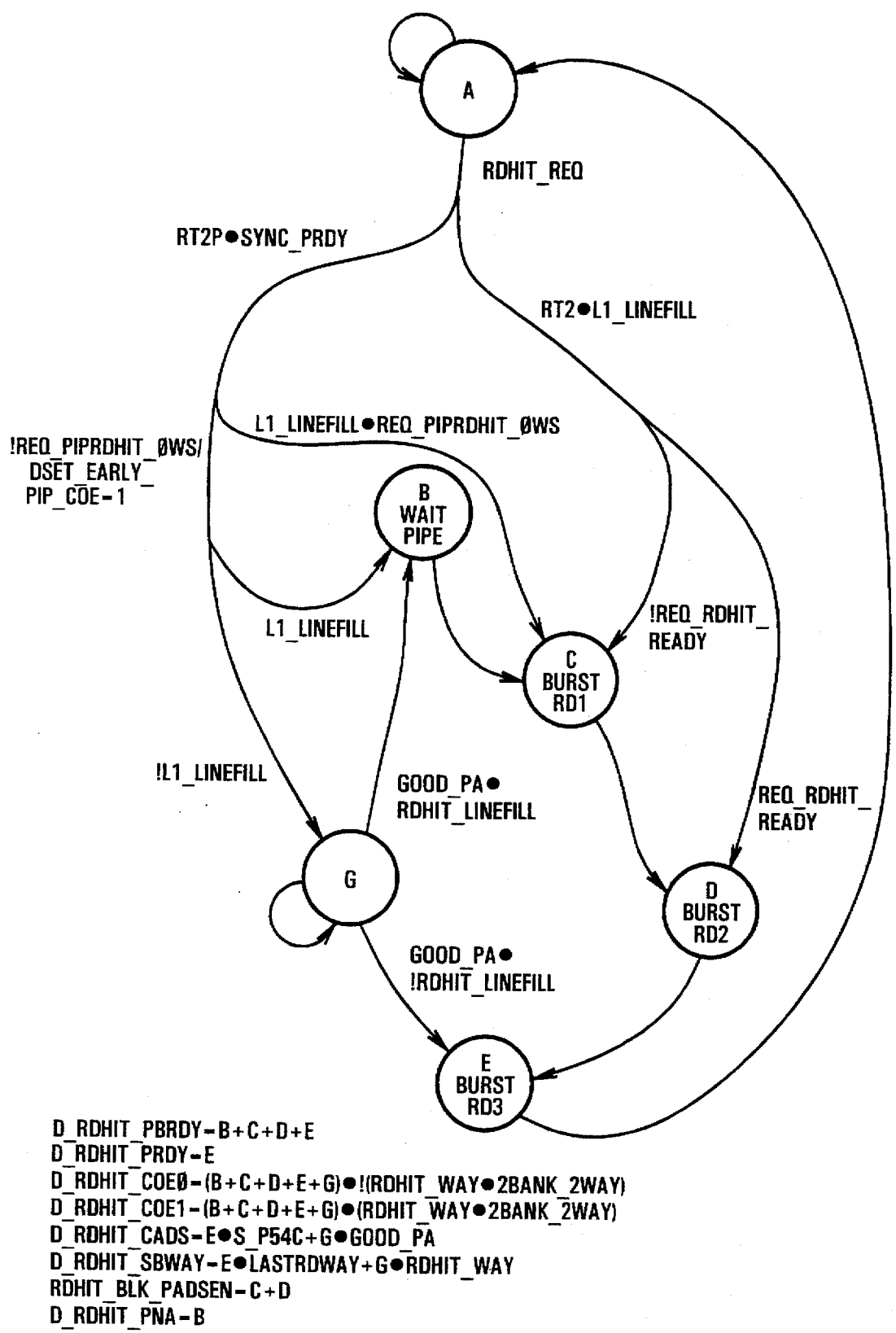
FIG. 8 is a state diagram illustrating the operation of a read hit module in the cache and memory controller according to the invention.
Figure 9A:
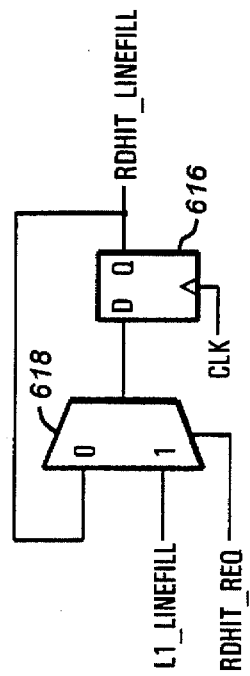
FIG. 9A–9D are schematic illustration of circuitry used by the module employing the state diagram of FIG. 8.
Figure 9B:
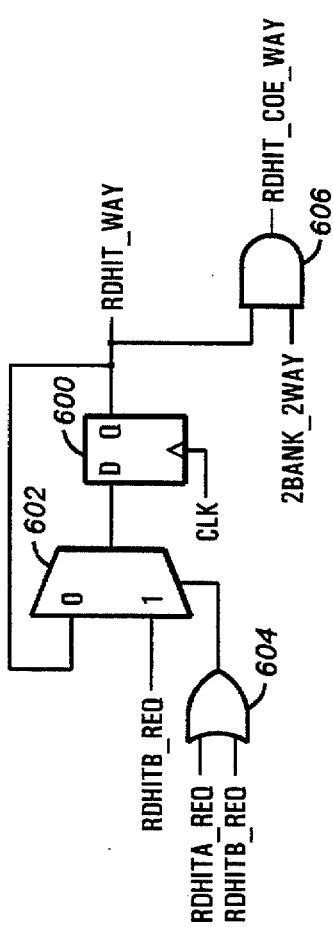
Figure 9C:
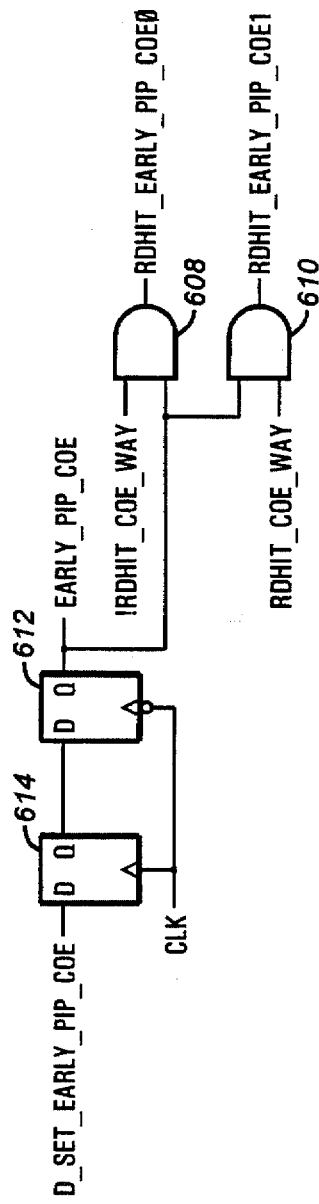
Figure 9D:
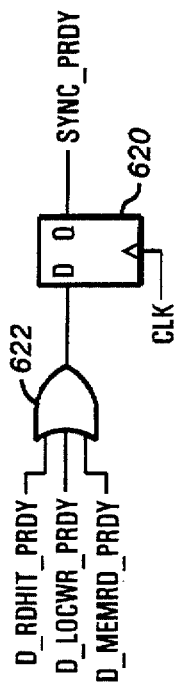

Turning to FIG. 8, the read hit state machine for a hit to the L2 cache 208 logic is shown. This state machine is clocked to the system clock CLK. Of note, other synchronous way prediction logic related to read hits is included in the cycle request logic discussed below in conjunction with FIGS. 19–27C. Further, many of the signals discussed in conjunction with FIG. 8 are further discussed in conjunction with FIG. 9A–9D. For clarity, the illustrated state machine omits a number of states and associated signals not necessary to an understanding of the invention. For example, a wait state for pipelined read hits is not shown, as well as states related to locked and snooped cycles. These could of course be added by one skilled in the art of cache system design.

From state A, when RDHIT_REQ is true, the processor is in a T2P cycle of a read operation as indicated by a signal RT2P, a synchronous ready signal SYNC_PRDY is true, a signal indicating a zero wait state pipelined read hit REQ_PIP_RDHIT_0WS (see FIGS. 22A–22B) is false, and a L1 linefill signal L1_LINEFILL is true, the state machine proceeds to the B state. L1_LINEFILL is generated by circuitry not shown, and is true on a code fetch by the processor 200 to its internal cache when that fetch is allocatable. State B is the wait for a pipelined burst read hit state (an L1 cache linefill is always a burst read).

From state B, the state machine proceeds to state C, which is the first data state of a burst read, and then to state D which is the second data state of a burst read, and then to state E which is the third data state of a burst read. The state machine then proceeds to state A, which, although the idle state, is the fourth data state of a burst read.

From state A, when RDHIT_REQ is true, RT2P is true, a synchronous ready signal SYNC_PRDY is true, REQ_PIPRDHIT_0WS is true, and L1_LINEFILL is true, the state machine proceeds from state A to state C. This is a pipelined burst read with no wait states.

Figure 19:
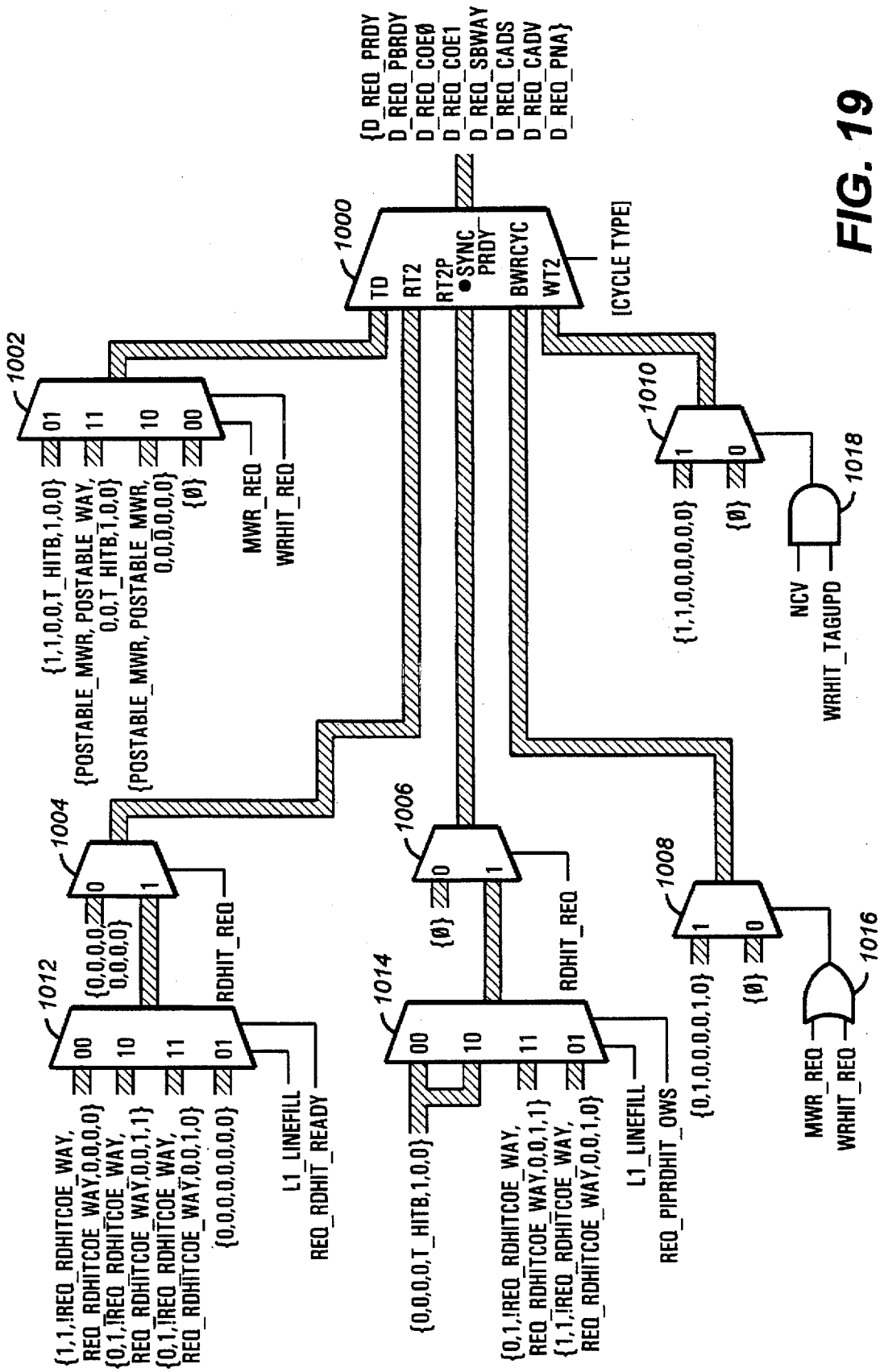
FIG. 19 is a schematic illustration of cycle request logic.

The first read, whose data is ready in state C, is initiated by logic in the cycle request block to be discussed in conjunction with FIG. 19. That block handles timing critical cycle requests.

If from state A all the conditions are true for proceeding to state B but L1_LINEFILL is false, the state machine proceeds to state G, a wait state on a pipelined read hit where a valid address is not yet in the L2 cache 208. From state G, when the processor is driving its PA outputs as indicated by a signal GOOD_PA being true and a latched linefill signal RDHIT_LINEFILL is true, the processor proceeds from state G to state B. GOOD_PA is true when the processor 200 is providing a valid address on PA, and is generated by circuitry not shown. When GOOD_PA is true but RDHIT_LINEFILL is false, the state machine proceeds from state G to state E for a single read. From state A to either state B or state G, a set early COE request signal D_SET_EARLY_PIP_COE is set true, indicating that the read hit module is requesting the COE logic illustrated in FIGS. 6A–6K and 7A–7G to initiate an early COE.

From state A, when RDHIT_REQ is true, on a T2 read cycle indicated by a signal RT2 (i.e. not a pipelined cycle), and L1_LINEFILL is true, the state machine proceeds to state C if a signal REQ_RDHIT_READY (discussed below in conjunction with FIG. 22) is false, but proceeds to state D if REQ_RDHIT_READY is true.

From states A and G, if none of the specified conditions are true, the state machine remains in that particular state on the next clock cycle, or possibly moves to another state not illustrated that is not important here.

The output variables of the state machine are illustrated below the state diagram. Of particular interest, D_RDHIT_SBWAY is true when the state machine is in the E state and LASTRDWAY is true, or when the state machine is in the G state and RDHIT_WAY is true.

D_RDHIT_COE0 is true in states B, C, D, E, or G, as long as RDHIT_WAY and 2BANK_2WAY when AND'd together are not true. D_RDHIT_COE1 is true in the same states, but only when RDHIT_WAY and 2BANK_2WAY are both true.

A read hit state machine request cache address strobe signal D_RDHIT_CADS is true in state E when the processor 200 is a Pentium® P54C processor, and is true in state G when GOOD_PA is true.

A block cache address strobe request signal RDHIT_BLK_PADSEN is true in state C or D. A next address request signal D_RDHIT_PNA is true in the B state.

Certain states have been omitted from this state machine, including states related to snooping as well as states related to locked writes.

Turning to FIG. 9A–9D, circuitry used to generate certain of the signals used by the state machine of FIG. 8 are shown. A latched read hit way signal RDHIT_WAY is provided by the output of a flip-flop 600, clocked by CLK, which as its D input receives the output of a multiplexer 602. The multiplexer 602 select input is driven by the output of an OR gate 604, which as inputs receives RDHITA_REQ and RDHITB_REQ. The one input of the multiplexer 602 is provided by RDHITB_REQ, and the zero input is tied to RDHIT_WAY. A cache output enable way signal RDHIT_COE_WAY is provided by the output of an AND gate 606, which receives as inputs RDHIT_WAY and 2BANK_2WAY.

RDHIT_EARLY_PIP_COE0 is provided by the output of an AND gate 608, while the corresponding signal RDHIT_EARLY_PIP_COE1 is provided by the output of an AND gate 610. As inputs, both of these AND gates 608 and 610 receive a signal EARLY_PIP_COE, while the AND gate 608 also receives the inverse of RDHIT_COE_WAY, while the AND gate 610 receives that signal in a non-inverted state.

EARLY_PIP_COE is provided by the output of a flip-flop 612, clocked on the negative edge of CLK, whose D input is in turn driven by the output of a flip-flop 614, clocked to CLK. As its D input, the flip-flop 614 receives D_SET_EARLY_PIP_COE.

RDHIT_LINEFILL is provided by the output of a flip-flop 616, clocked by CLK, which as its D input receives the output of a multiplexer 618. The select input of the multiplexer 618 is provided by RDHIT_REQ, the one input is provided by L1_LINEFILL, and the zero input is provided by RDHIT_LINEFILL.

SYNC_PRDY is provided by the output of a flip-flop 620, clocked to CLK, whose D input is driven by the output of an OR gate 622. As inputs, the OR gate receives D_RDHIT_PRDY, a signal D_LOCWR_PRDY (see FIG. 12), and a signal D_MEMRD_PRDY (generated by circuitry not shown). SYNC_PRDY is thus true when these modules have indicated a RDY input to a 486 series processor should be asserted.

L2 Cache Writeback Module

Figure 10:
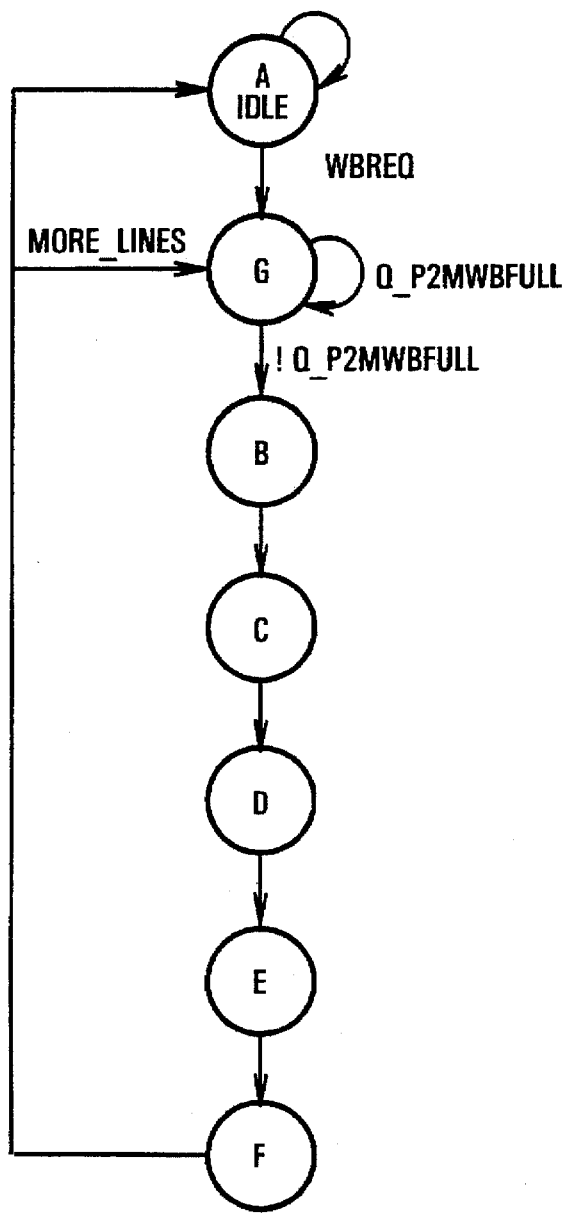
FIG. 10 is a state diagram of a level 2 cache writeback state machine implemented in the cache and memory controller according to the invention.

Turning to FIG. 10, the state machine for the level two write back module is shown. Again, the state machine is clocked by the system clock CLK, and a number of the signals pertaining to this state machine are further described in conjunction with FIG. 11A–11C. Beginning from the idle state A, the state machine proceeds to the G state on a writeback request being indicated by a writeback request signal WBREQ being asserted. In all other cases, the state machine stays in state A on its next transition. WBREQ is asserted by various other modules, including the allocation module, L2 snoop module and a flush module. Specifically, WBREQ is asserted when a signal ALLOCD_WBREQ is asserted, indicating the allocation module is requesting a writeback. The allocation module is described in conjunction with FIGS. 14 and 17. The L2 snoop module and flush modules are not described, but are well known to those skilled in the art of cache design.

The WBREQ signal is asserted when the CMC 210 detects the need to writeback a line in the L2 cache 208. From state G, the state machine remains in state G if a signal Q_P2MWBFULL is true. This signal is true when the queue 360 between the memory interface 350 and the processor interface 354 is full, and is generated by circuitry not shown. Because multiple lines could be written back sequentially, this queue 360 would likely fill up.

When Q_P2MWBFULL is false, the state machine proceeds through states B, C, D, E, and F, and in states B, C, D, and E, writes from the cache to main memory are posted to the processor to main memory writeback queue 360 by circuitry not shown.

From state F, the state machine proceeds to state A if there are no more lines to write back. If there are more lines to write back as indicated by a more lines variable MORE_LINES, the state machine again proceeds to state G. MORE_LINES is set by circuitry not shown to indicate that more modified lines remain to be written back to main memory in the current block that is being written back. Lines in the L2 cache 208 are preferably allocated in blocks of four, so if it is determined that one line within such a block must be written back, the rest of the lines within that block should also be written back to main memory if they have been modified.

Referring to the state variables, a cache advance request signal D_L2WB_CADV is true in states B, C, and D, indicating the burst SRAMs 300 and 302 should be advanced in the next cycle. A cache address strobe request signal D_L2WB_CADS is true in state G, indicating that the address should be strobed into the burst SRAMs 300 and 302. D_L2_SBWAY is set to L2WB_WAY in state G, which will be discussed below. D_L2WB_COE0 and D_L2WB_COE1 are set to the negation of L2WB_WAY ANDed with 2BANK_2WAY or to L2WB_WAY ANDed with 2BANK_2WAY, respectively, in states B, C, D, and E. An L2 writeback acknowledge signal L2WB_ACK is true in state B when a current writeback acknowledge signal CURWB_ACKED is false. An L2 writeback done signal L2WB_DONE is true in state E when MORE_LINES is false.

Turning to FIG. 11A-11C, the logic for generating L2WB_WAY and CURWB_ACKED is shown. L2WB_WAY is provided as the output of a flip-flop 800, which is clocked by CLK. The D input to the flip-flop 800 is provided by the output of a multiplexer 802, which when the one input is selected provides a writeback way signal WBWAY to the D input of the flip-flop 800. When the zero input of the multiplexer 800 is selected, L2WB_WAY is provided to the D input of the flip-flop 800. The select line of the multiplexer 802 is provided by the output of an AND gate 804, which receives as inputs WBREQ and a signal L2WB_STATE_A which is true when the L2 writeback state machine of FIG. 10 is in state A.

WBWAY is provided by the output of a multiplexer 806, which selects an allocation data way signal ALLOCD_WAY when a select signal ALLOCD_WBREQ is true, selects a signal FLSH_WBWAY when a signal FLSH_WBREQ is true, and selects a signal SNP_WAY when a signal SNP_WBREQ is true. That is, WBWAY is set to the way selection signal provided by either the allocate, flush, or snoop modules, depending on which of those modules instigated the writeback request. The signals ALLOCD_WAY and ALLOCD_WBREQ are discussed below in conjunction with FIGS. 14 and 15A-15E, and the flush and snoop signals are similarly developed.

The signal CURWB_ACKED is provided by the output of a flip-flop 808, clocked by CLK, which at its D input receives the output of an OR gate 810. The OR gate 810 receives as inputs L2WB_ACK and the output of an AND gate 812. The AND gate 812 receives as inputs the negation of L2WB_STATE_A and CURWB_ACKED.

Local Memory Write Module

Turning now to FIG. 12, a state machine illustrating the state transitions in the local memory write module is shown. Note that a number of states have been omitted because they pertain to aspects of the CMC 210 that are not related to the invention. For example, the full state machine includes states for waiting for the queues 358 and 360 between the processor logic and the memory logic or the processor logic and the PCI bus logic to clear. These queues are assumed to always be clear. Similarly, states relating to writes to write protected memory have not been shown, as we have assumed for clarity that all writes are to non-protected memory.

Turning to FIG. 12, the state machine proceeds from state A to state B when a memory write signal MWR_REQ is true and a write hit signal WRHIT_REQ is false. MWR_REQ, generated by circuitry not shown, is true on a memory write cycle. WRHIT_REQ is true on a write cache hit, and is discussed in conjunction with FIG. 13A-13F. This condition would be true on a memory write that is not a write hit in the L2 cache 208. From state B, the state machine returns to state A on the next cycle when the write is complete, and otherwise remains in state B. On a burst write, indicated by a signal BWRT2 being true, and either MWR_REQ or WRHIT_REQ being true, the state machine proceeds from state A to state E, the burst write state. When the burst write is completed, as indicated by a signal BURST_DONE being true, the state machine returns to the idle state A. BURST_DONE is generated by circuitry not shown, and becomes true when all of the data writes within a burst write have been completed. On a pipelined write that is a write hit indicated by a signal WT2P being true, WRHIT_REQ being true, and SYNC_PRDY being true, the state machine proceeds from state A to state G, the pipelined write hit with a valid new cycle state. From this state, the state machine returns to state A. On a pipelined write hit in which SYNC_PRDY is not true, the state machine proceeds to state H, where the cache tags must be reread from the tag RAM 364 or 366. In this transition, a local write tag chip select signal D_LOCWR_TAGCS is set to true. If the processor is backed off, indicated by a standard processor backoff signal PBOFF being true, the state machine proceeds from state H back to state A, because the write has been aborted. Otherwise, the state machine proceeds to state I when the address on the processor address bus is not held (as indicated by GOOD_PA) and TD is true, or WT2 is true, or WT2P and SYNC_PRDY are true. From state I, the state machine returns to state A when T_HITVALID is true and TAGHIT is true, indicating the tags have been updated.

Turning to the state variables, a block cache chip select way 0 signal D_LOCWR_BLK_CCS0 is true in state G when a way signal LOCWR_WAY is true, and in state H when the next state is going to be state I and LOCWR_WAY is true. A block cache chip select way 1 signal D_LOCWR_BLK_CCS1 is true in the same states as D_LOCWR_BLK_CCS0, with the exception that the inverse of LOCWR_WAY is used. D_LOCWR_SBWAY is true in the same states as D_LOCWR_BLK_CCS0. An assert ready signal D_LOCWR_PRDY is true in state B when a memory write has been posted to the queue 360 by circuitry not shown, as indicated by a posted signal POSTED, and in state E when BURST_DONE is not true and a signal BURST2 is true, which indicates two writes of a burst write have been completed in state G, or in state I, when the next state is going to be the idle state A. An assert BRDY signal D_LOCWR_PBRDY is true in the same states as D_LOCWR_PRDY, with the exception that in the E state, the signal is true whenever BURST_DONE is false.

A cache advance request signal D_LOCWR_CADV is true in the E state when BURST_DONE is false and LOCWR_WRHIT is true. A cache address strobe request signal D_LOCWR_CADS is true in state G or state H when the next state is going to be state I. D_LOCWR_CWE0 is set to the inverse of a cache write enable way signal CWE_WAY when in state E with BURST_DONE false and LOCWR_HIT true, when in state G, or when in state I where the next state will be state A. D_LOCWR_CWE1 is set during the same states as D_LOCWR_CWE0, with the exception that it is set to CWE_WAY rather than the inverse of that signal.

A request tag chip select signal D_LOCWR_TAGCS is true in state H. A tag request signal LOCWR_PTAGREQ is true in state H when the next state is going to be state I.

From states A, B, E, H, and I, the state machine, on transition conditions other than those specified, either remains in its present state or moves to states not shown that are not particularly pertinent here.

Turning to FIG. 13A-13F, logic is shown to provide certain of the signals discussed in the state machine of FIG. 12. TAGHIT is provided by the output of an OR gate 850, which, as inputs, receives T_HITA and T_HITB. It thus goes true on a tag hit. WRHIT_REQ is provided by the output of an OR gate 852, which receives as its inputs two write hit signals WRHITA_REQ and WRHITB_REQ discussed below in conjunction with FIGS. 20A–20K. It thus goes high on a write hit. CWE_WAY is provided by the output of an AND gate 854 which receives as inputs LOCWR_WAY and 2BANK_2WAY. REQ_CWE_WAY is provided by the output of an AND gate 856, which receives as inputs WRHITB_REQ and 2BANK_2WAY. LOCWR_WAY is provided by the output of a flip-flop 858, clocked by CLK, whose D input is provided by the output of a multiplexer 860. The zero input of the multiplexer 860 is provided by LOCWR_WAY, while WRHITB_REQ is provided as the one input to the multiplexer 860. The multiplexer 860 select input is true when the local write state machine of FIG. 12 is in state A.

LOCWR_WRHIT is provided by the output of a flip-flop 862, clocked by CLK, whose D input receives the output of a multiplexer 864. The zero input of the multiplexer 864 is provided by LOCWR_WRHIT, while the one input is provided by WRHIT_REQ. As with the multiplexer 860, the multiplexer 864 select input is true when the local write state machine is in state A.

Cache Data and Tag Ram Allocation Modules

Figure 14:
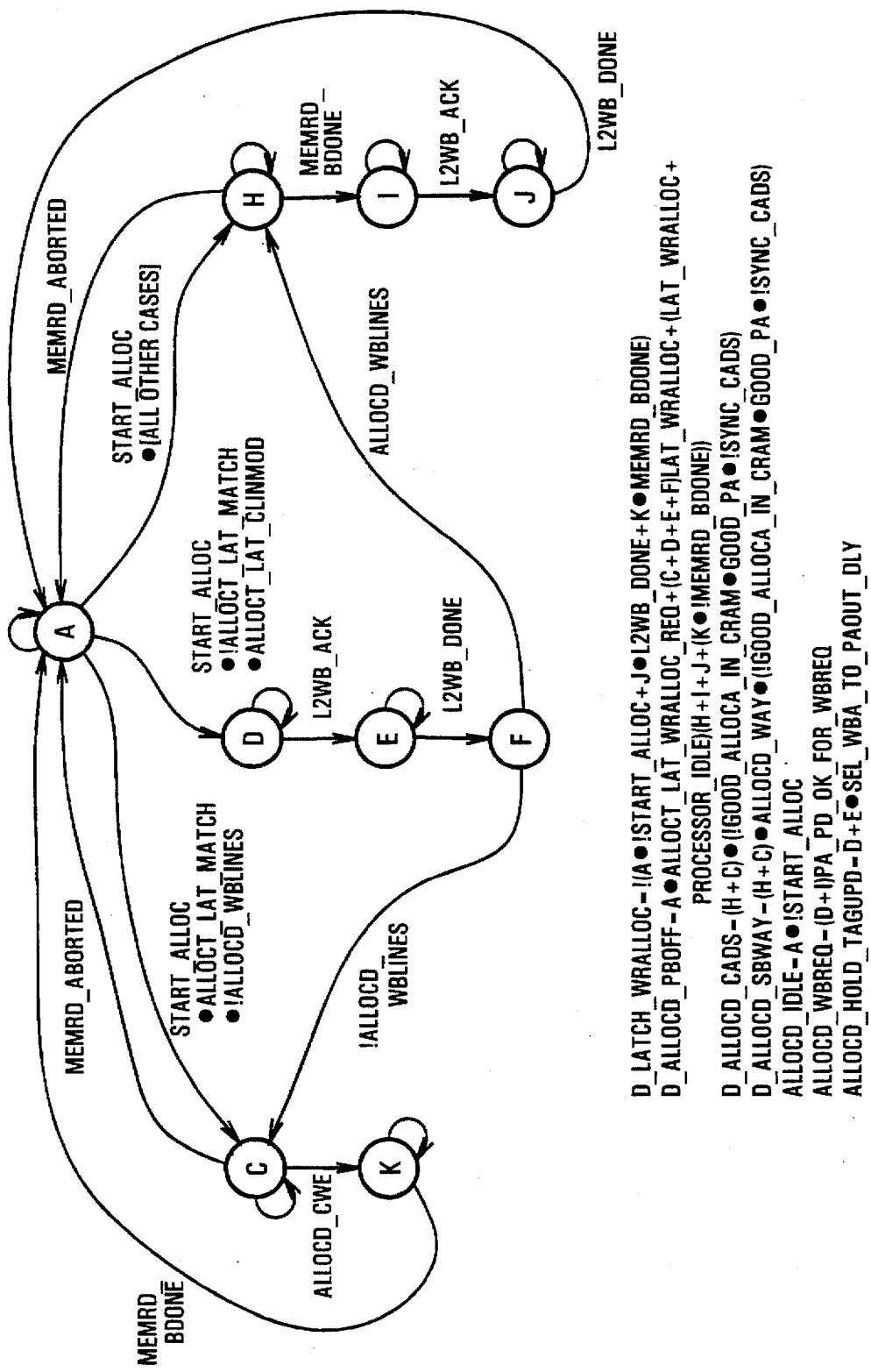
FIG. 14 is a state diagram of a cache data RAM allocation state machine implemented the cache and memory controller according to the invention.

Turning to FIG. 14, the L2 cache 208 data ram allocation state machine is shown. This state machine controls line allocation in the burst SRAMs 300 and 302. Again, it is clocked by CLK. For clarity, the illustrated state machine omits some states and associated signals not necessary to an understanding of the invention. For example, a wait state that waits for the memory interface to be ready is not shown. These could of course be added by one skilled in the art of cache system design.

A number of the signals discussed in conjunction with FIG. 14 are further described in FIGS. 15A–18. From all states except state F, the state machine remains in its present state if the indicated transition conditions are not met.

From state A, the idle state, the state machine proceeds to state D when a start allocation signal START_ALLOC is true, which indicates that start of an allocation cycle. When a latched match signal ALLOCT_LAT_MATCH is false, which indicates that a tag allocation state machine has indicated a tag miss, and when a latched cache line modified signal ALLOCT_LAT_CLINEMOD is true, indicating that some of the lines in the current way are modified, and thus need to be written back. In state D, a writeback of the L2 cache is instigated in the L2 writeback module of FIG. 10, and when that writeback is acknowledged by L2WB_ACK true, the state machine proceeds to state E. At state E, the state machine waits for the writeback to be completed as indicated by L2WB_DONE true, and then the state machine proceeds to state F. From state F, if there are no more lines to write back, as indicated by ALLOCD_WBLINES being false, the state machine proceeds to state C.

At state C, all writebacks have been completed, so the allocation state machine proceeds to allocate the line. When a cache write enable signal ALLOCD_CWE, provided true by a memory read module when a memory request from the memory array 214 is available, goes true, this indicates that the appropriate CWE signals are asserted to the cache, so the state machine proceeds to state K where it remains until the memory read—i.e., the allocation—is completed, as indicated by a memory read done signal MEMRD_BDONE, provided by the memory read module. The state machine then proceeds from state K to state A. From state C, if the memory read is aborted for any reason, as indicated by a signal MEMRD_ABORTED, the state machine proceeds from state C to state A.

MEMRD_BDONE and MEMRD_ABORTED are generated by a memory read state machine that is not shown. MEMRD_BDONE goes true when a burst memory read has been completed. MEMRD_ABORTED goes true when the memory read stat machine aborts a memory read, such as on a snoop cycle.

The state machine goes directly from state A to state C on the start of an allocation cycle as indicated by START_ALLOC, but where the tag allocation state machine indicates a match as indicated by ALLOCT_LAT_MATCH and there are no lines to writeback, as indicated by ALLOCD_WBLINES being false. In such a case, state C directly proceeds with the read allocation.

In all other cases on START_ALLOC, the state machine proceeds from state A to state H, where the state machine then goes to state A on MEMRD_ABORTED, or to state I when a memory read is completed, as indicated by MEMRD_BDONE. In state I, writebacks are requested of the L2 writeback module, and when acknowledged, as indicated by L2WB_ACK, the state machine proceeds to state J. From state J, the state machine proceeds to state A when L2WB_DONE is true, indicating the writeback has been completed.

Note from state F, the state machine proceeds to state H if there are additional lines to writeback, as indicated by ALLOCD_WBLINES. State H would be entered, for example, if the processor 200 needed to read allocate a single line in a block, but the CMC 210 had to write back all four lines of that block because they were modified. For example, if the second line of the block was to be read allocated, the state machine would first proceed to state E, where the second line would be written back in the L2 cache 208 to the memory array 214, then to state H, where that line would be allocated from the memory array 214 into the L2 cache 208. The state machine would then proceed to state J, where the remaining three lines of the block would be written back from the L2 cache 208 to the memory array 214. Thus, the H state is entered when multiple lines must be written back with an intervening allocate. State H is specifically entered to perform an allocate when write backs will be needed after the read is done, while state C is entered for an allocate when no more write backs will be needed after the read is done. That is, state C would be entered, for example, if the remaining lines of the block had not been modified.

The equations for the state variables are indicated below the state machine. A latch write strobe signal D_LATCH_WRALLOC, which indicates that a write allocation should be performed, is true in all cases except in state A when an allocation is not starting as indicated by START_ALLOC being false, in state J when a writeback is completed as indicated L2WB_DONE, and in state K when a memory read is completed as indicated by MEMRD_BDONE.

An allocate module request backoff signal D_ALLOCD_PBOFF is true in state A when a signal ALLOCT_LAT_WRALLOC_REQ is true, indicating the tag allocation state machine discussed below in conjunction with FIG. 17 has requested a write allocation, and true in states C, D, E, and F when a latched write allocate signal LAT_WRALLOC is true, and in states H, I, J, and K when MEMRD_BDONE is false and either LAT_WRALLOC is true or the processor 200 is idle (i.e., a Ti state) as indicated by a signal PROCESSOR_IDLE which is true when the processor is in an idle state.

A cache address strobe request signal D_ALLOCD_CADS is true in states H and C when an address has not been driven to the burst SRAMs 300 and 302 as indicated by a signal GOOD_ALLOCA_IN_CRAM being false (see discussion of FIGS. 27A–27C), GOOD_PA is true, and a synchronous cache address strobe signal SYNC_CADS is false.

D_ALLOCD_SBWAY is set to ALLOCD_WAY in states C and H when GOOD_ALLOCA_IN_CRAM is false, GOOD_PA is true, and SYNC_CADS is false.

An allocation state machine idle signal ALLOCD_IDLE is true in state A when START_ALLOC is false.

ALLOCD_WBREQ is true in states D and I when the processor address and processor data bus are in an appropriate state for a writeback as indicated by a signal PA_PD_OK_FOR_WBREQ. It is true when the state machine is requesting the L2 writeback state machine of FIG. 10 to write back a line of the L2 cache.

ALLOCD_HOLD_TAGUPD is true in state D and in state E when a signal SEL_WBA_TO_PAOUT_DLY is true. This latter signal is created by the L2 writeback state machine of FIG. 10 by logic not shown, and is a synchronous, delayed signal that is true when that state machine still has write operations to perform of the currently pending writeback.

Turning to FIGS. 15A–15F, circuitry for generating various of the above mentioned signals is shown. A series of writeback needed line indicator signals ALLOCD_WBLINES[3:0] are provided as the output of a series of circuits illustrated by a multiplexer 900, which as a select input receives a signal ALLOCD_STATE_D which is true when the allocation state machine of FIG. 14 is in the D state. When the one input of the multiplexer 900 is selected, the output of an AND gate 902 is driven as ALLOCD_WBLINES[3:0]. The inputs of the AND gate 902 are a series of cache line mask signals CLINMASK[3:0] and latched modified bit signals ALLOCT_LAT_MODLINES[3:0], which are line modified outputs of the tag RAM 364 or 366 as provided by the tag allocation state machine of FIG. 17. When the multiplexer 900 zero input is selected, the output of an AND gate 904 is provided as ALLOCD_WBLINES[3:0]. The AND gate 904 ANDs together ALLOCT_LAT_MODLINES[3:0] with the inverted CLINMASK[3:0] signals. ALLOCD_WBLINES is provided as the output of an OR gate 905, which ORs together all of the individual lines of ALLOCD_WBLINES[3:0].

PA_PD_OK_FOR_WBREQ is provided by an AND gate 906, which receives as inputs GOOD_PA, a processor hold signal PAHOLD generated by logic not shown, and the inverse of a hold line writeback signal ALLOCT_HOLD_CLINWB, which when true indicates that the tag allocation state machine is holding up the line writebacks.

ALLOCD_WAY is provided by the Q output of a flip-flop 908, clocked by CLK, which as its D input receives the output of a multiplexer 910, an unlatched signal D_ALLOCD_WAY. The multiplexer 910 has select inputs ALLOC_REQ and ALLOCD_STATE_A. When ALLOCD_STATE_A is false, indicating the data allocation state machine is not in the idle state, ALLOCD_WAY is provided as the output of the multiplexer 910. Otherwise, when ALLOC_REQ is true, ALLOCWAY_1 is provided as the output of the multiplexer 910, and when ALLOC_REQ is false, P_ALLOCWAY is provided as the output of the multiplexer 910. Thus, when an allocation is requested, the allocation way signal is chosen, whereas when an allocation is not requested, allocation way prediction is selected.

LAT_WRALLOC is provided as the output of a multiplexer 912, which receives as a select input the output of a flip-flop 914, clocked by CLK, with D_LATCH_WRALLOC as its D input. When the one input is selected on the multiplexer 912, LAT_WRALLOC is provided to itself. When the zero input is selected, ALLOCT_LAT_WRALLOC_REQ is provided as LAT_WRALLOC.

START_ALLOC is provided by the output of an OR gate 916, which has as inputs a start of a pipelined allocate signal START_PIP_ALLOC, and a start of a non-pipelined allocate signal START_NPIP_ALLOC.

START_NPIP_ALLOC is provided by the output of a flip-flop 918, clocked by CLK and receiving as a D input a non-pipelined request signal NPIP_ALLOC_REQ. This signal is provided by an AND gate 920, which as inputs receives ALLOC_REQ as well as the output of an OR gate 922. The OR gate 922 receives as inputs the inverse of T2P, as well as a signal SYNC_ENDPCYC_NOSWB, generated by circuitry not shown, which indicates this is not a snoop writeback cycle.

START_PIP_ALLOC is provided by an AND gate 924, which receives as inputs the SYNC_ENDPCYC_NOSWB signal as well as the output of a flip-flop 926, which is clocked by CLK. The flip-flop 926 receives as its D input the output of an AND gate 928, which receives as inputs an inverted allocation tag updated abort signal ALLOCT_TAGUPD_ABORTED, the inverse of SYNC_ENDPCYC_NOSWB, and the output of an OR gate 930. The OR gate 930 has as inputs the Q output of the flip-flop 926 and the output of an AND gate 932, which receives as inputs ALLOC_REQ and T2P. ALLOCT_TAGUD_ABORTED goes true when a tag update is aborted because of an aborted memory read, and is provided by the tag state machine.

Figure 16A:
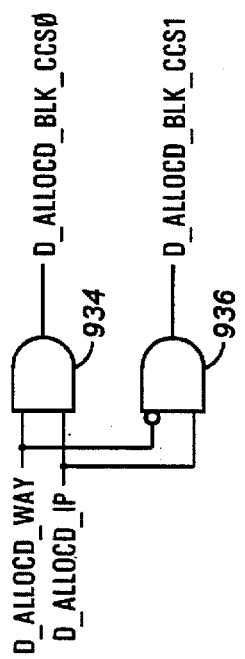
Figure 16B:
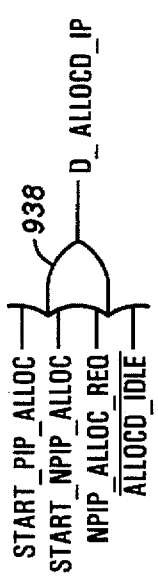

Turning to FIGS. 16A and 16B, further circuitry for generating the allocation module signals is shown. D_ALLOCD_BLK_CCS0 is provided by the output of an AND gate 934, while D_ALLOCD_BLK_CCS1 is provided by the output of an AND gate 936. Both the AND gates 934 and 936 receive as inputs an allocate in process signal D_ALLOCD_IP, and the AND gate 934 also receives D_ALLOCD_WAY, whereas the AND gate 936 receives as an input the inverse of that signal.

The signal D_ALLOCD_IP is provided by the output of an OR gate 938, which has as inputs START_PIP_ALLOC, START_NPIP_ALLOC, NPIP_ALLOC_REQ, and the inverse of ALLOCD_IDLE. D_ALLOCD_IP is thus true when the data allocation state machine is not idle.

Figure 17:
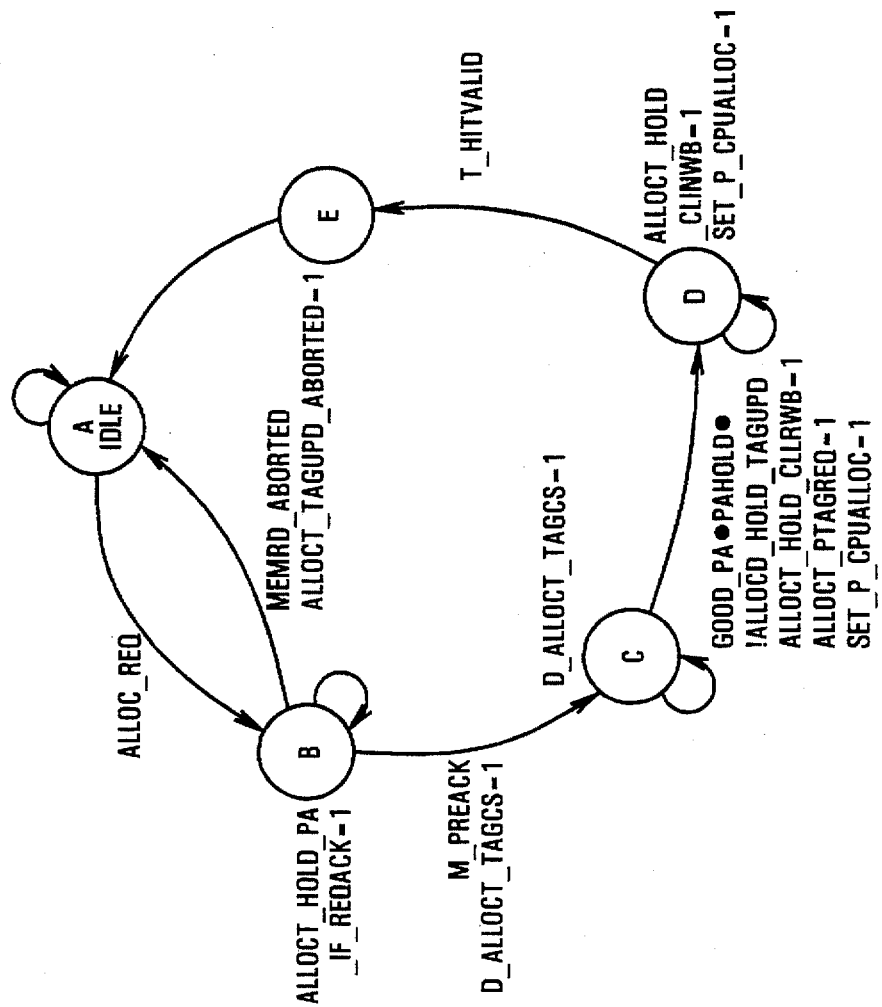
FIG. 17 is a state diagram illustrating a cache tag memory implemented in the cache and memory controller according to the invention.

Turning to FIG. 17, the tag allocation state machine is shown. This state machine controls the cycle timing of allocations within the tag RAMs 364 and 366. From all states but state E, the state machine remains in its present state when the illustrated transition conditions are not met.

Beginning at state A, the idle state, the state machine proceeds to state B when ALLOC_REQ is true. In state B, if a memory read is aborted, as indicated by MEMRD_ABORTED, the state machine proceeds back to state A, setting ALLOCT_TAGUPD_ABORTED to true.

In state B, ALLOCT_HOLD_PA_IF_REQACK is set to true. From state B, when a memory read module acknowledge read request signal M_PREQACK becomes true, the state machine proceeds from state B to state C, setting D_ALLOCT_TAGCS true, which requests the appropriate tag RAM 364 or 366 chip select be enabled. In state C, D_ALLOCT_TAGCS is set to true and the state machine proceeds to state D when GOOD_PA is true, when processor address hold is true as indicated by PAHOLD, and when ALLOCD_HOLD_TAGUPD, provided by the L2 cache 208 allocation state machine of FIG. 14, is false. On the transition from C to D, ALLOCT_HOLD_CLINEWB is set true, as is a request tag signal ALLOCT_PTAGREQ and a set allocation signal SET_P_CPUALLOC. These signals hold the data allocation state machine, request a tag, and cause the subsequently written tag to be to the modified state.

In state D, ALLOCT_HOLD_CLINWB and SET_P_CPUALLOC are set true. From state D, the state machine proceeds to state E when T_HITVALID becomes true, and from state E, in all cases, the state machine proceeds to state A.

Figure 18:
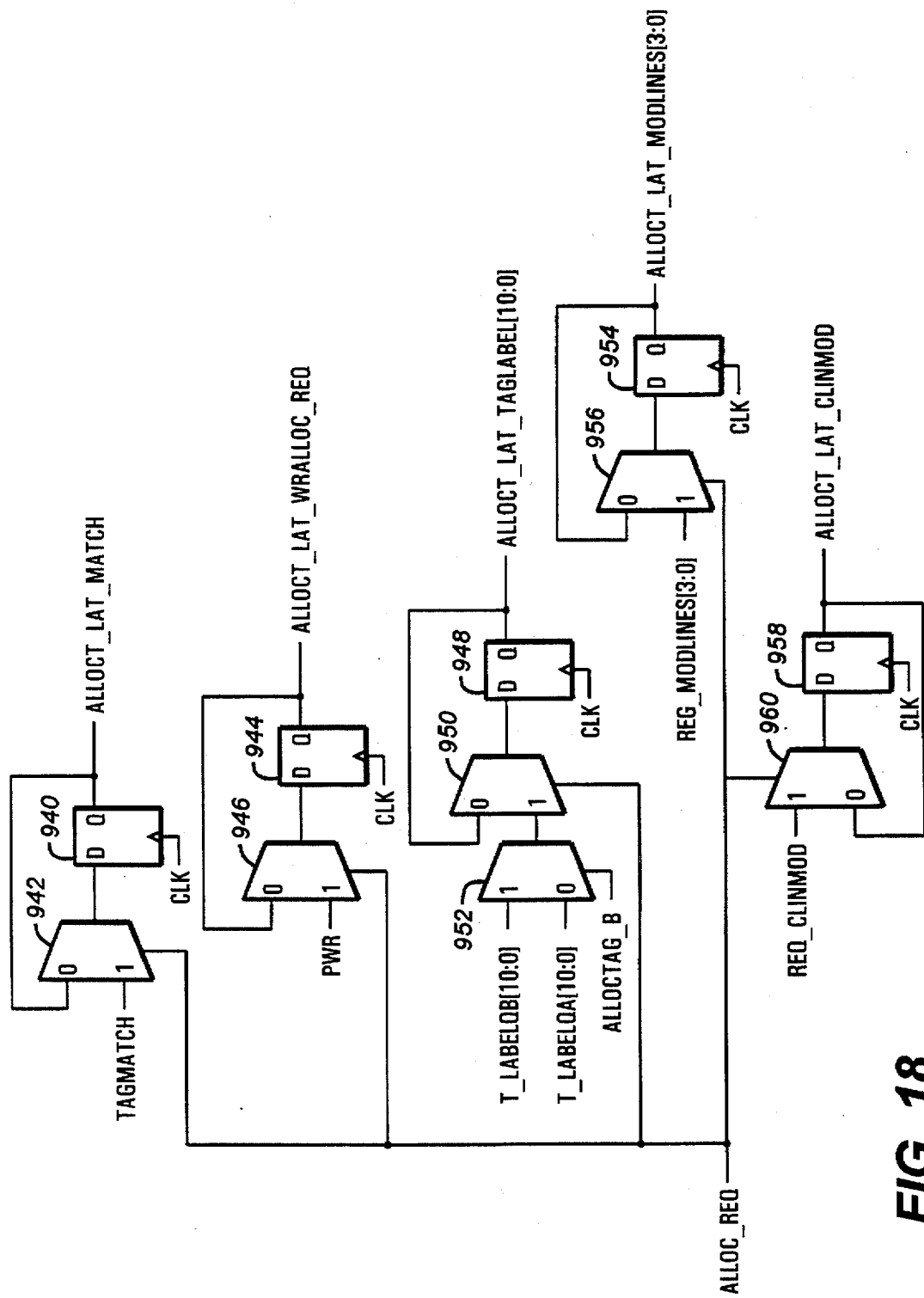
FIG. 18 is a schematic illustration of circuitry used in the module implementing the state machine of FIG. 17.

Turning to FIG. 18, circuitry used by the state machines of FIGS. 14 and 17 is shown. ALLOCT_LAT_MATCH is provided by the output of a flip-flop 940, which is clocked by CLK. The D input to the flip-flop 940 is provided by the output of multiplexer 942, which as its one input receives TAGMATCH and as its zero input receives ALLOCT_LAT_MATCH. The multiplexer 942 receives as its select input ALLOC_REQ. ALLOCT_LAT_WRALLOC_REQ is provided by the output of a flip-flop 944, which is clocked by CLK. As its D input, the flip-flop 944 receives the output of a multiplexer 946, which receives as its one input PWR and as its zero input ALLOCT_LAT_WRALLOC_REQ. The select input of the multiplexer 946 is provided as ALLOC_REQ. A latched tag label signal ALLOCT_LAT_TAGLABEL[10:0] is provided by the output of a series of flip-flops illustrated by a flip-flop 948. The flip-flop 948 receives as its input the output of a multiplexer 950, which receives as its zero input ALLOCT_LAT_TAGLABEL[10:0]. As its one input, the multiplexer 950 receives the output of a multiplexer 952, which as its one input receives tag label outputs T_LABELQB[10:0] and as its zero input receives tag label outputs T_LABELQA[10:0]. The multiplexer 950 select input is provided by ALLOC_REQ, and the multiplexer 952 select input is provided by a tag allocation signal ALLOCTAG_B, discussed below in conjunction with FIGS. 24A–24G. This signal provides the allocation tag B way as true when the allocate module should allocate to that way. It will be appreciated that the flip-flop 948 and the multiplexers 950 and 952 are actually a series of flip-flops and multiplexers sufficient to provide all eleven signals of ALLOCT_LAT_TAGLABEL[10:0].

ALLOCT_LAT_MODLINES[3:0] are provided by the output of a flip-flop 954, which again represents a series of flip-flops. The flip-flop 954 is clocked by CLK, and receives as its D input the output of the multiplexer 956, which receives as its zero input ALLOCT_LAT_MODLINES [3:0]and as its one input a series of modified line signals REQ_MODLINES[3:0], which is provided by the request module and is discussed below in conjunction with FIGS. 24A–24G. The select input of the multiplexer 956 is provided as ALLOC_REQ. ALLOCT_LAT_CLINMOD is provided by the output of a flip-flop 958, which is clocked by CLK. The D input to the flip-flop 958 is provided by the output of a multiplexer 960, which as its zero input receives ALLOCT_LAT_CLINMOD. As its one input, the multiplexer 960 receives a cache line modified signal REQ_CLINMOD, which is again provided by the request module and is discussed below. The select input of the multiplexer 960 is provided by ALLOC_REQ.

Critical Timing Cycle Request Module

Turning to FIG. 19, critical cycle request logic is shown. This request logic requests that certain signals be asserted, and is provided by multiplexers rather than through state machines because of tight timing requirements. A multiplexer 1000 provides as outputs signals D_REQ_PRDY, D_REQ_PBRDY, D_REQ_COE0, D_REQ_COE1, D_REQ_SBWAY, D_REQ_CADS, D_REQ_CADV, and D_REQ_PNA.

The multiplexer 1000 is driven according to the cycle type of the processor 200. These cycle types shown are standard for a Pentium®. On a TD cycle, the multiplexer 1000 provides as its output the output of a multiplexer 1002, on an RT2 (T2 on a read) cycle provides the output of a multiplexer 1004, on a RT2P (T2P on a read) cycle and where SYNC_PRDY is true provides the output of a multiplexer 1006, on a burst write cycle indicated by a signal BWRCYC (T2 on a write) provides the output of a multiplexer 1008, and on a WT2 cycle provides the output of a multiplexer 1010.

The multiplexer 1002 has as select inputs MWR_REQ and WRHIT_REQ, and as outputs provides the signals indicated that correspond to the output of the multiplexer 1000. The multiplexer 1004 has as its select input RDHIT_REQ, and when that signal is false, provides all zeros, but when that signal is true, provides the outputs of a multiplexer 1012, which as its select inputs receives L1_LINEFILL and REQ_RDHIT_READY, which select the indicated signals as outputs. The multiplexer 1006 as its select input receives RDHIT_REQ, and when that signal is false, provides all zero outputs. When that signal is true, the output of a multiplexer 1014 is provided as the output of the multiplexer 1006. The multiplexer 1014 has as its select inputs L1_LINEFILL and REQ_PIPRDHIT_OWS. These again select the indicated signals. The multiplexer 1008 has as its select input the output of an OR gate 1016, which has as inputs the signals MWR_REQ and WRHIT_REQ. When the output of the OR gate 1016 is false, all zeros are provided as the outputs of the multiplexer 1008. When the output of the OR gate 1016 is true, the indicated signals are provided as the outputs of the multiplexer 1008. The multiplexer 1010 has as its select input the output of an AND gate 1018, which has as inputs NCV and WRHIT_TAGUPD. When the output of the AND gate 1018 is false, all zeros are provided as the output of the multiplexer 1010. When the output of the AND gate 1018 is true, the indicated signals are provided as the output of the multiplexer 1010.

Turning to FIGS. 20A–20K, additional circuitry provided by the request module is shown. A cachable write signal CABLEWR_REQ is provided by the output of an AND gate 1020, which receives as its inputs the signals NCV, a standard processor signal PCACHE*, PWR, and a standard processor signal PMIO. WRHITA_REQ is provided by the output of an AND gate 1022, which receives as its inputs CABLEWR_REQ and T_HITA. WRHITB_REQ is provided by the output of an AND gate 1024, which receives as its inputs CABLEWR_REQ and T_HITB.

A cache way enable match signal D_REQ_CWE_MATCH is provided by the output of an AND gate 1026, which receives as its inputs NCV, PWR, PCACHE*, and a standard processor hit to modified signal PHITM*.

A cache write enable hit signal D_REQ_CWE_HIT is provided by the output of an AND gate 1028, which receives as its inputs CABLEWR_REQ and TD.

D_REQ_CWE0 is provided by the output of an OR gate 1030, which receives as its inputs the output of an AND gate 1032 and the output of an AND gate 1034. The AND gate 1032 receives as its inputs D_REQ_CWE_HIT and the output of an OR gate 1036, which receives as its inputs T_HITA and the output of an AND gate 1038. The AND gate 1038 receives as its input T_HITB and the inverse of 2BANK_2WAY. The AND gate 1034 receives as its inputs D_REQ_CWE_MATCH and the output of an OR gate

1040. The OR gate 1040 receives as its inputs T_MATCHA and the output of an AND gate 1042. The AND gate 1042 receives as its inputs the inverse of 2BANK_2WAY and T_MATCHB.

D_REQ_CWE1 is provided by the output of an OR gate 1044, which receives as its inputs the outputs of an AND gate 1046 and an AND gate 1048. The AND gate 1046 receives as its inputs D_REQ_CWE_HIT, T_HITB, and 2BANK_2WAY. The AND gate 1048 receives as its inputs D_REQ_CWE_MATCH, T_MATCHB, and 2BANK_2WAY.

RDHITA_REQ is provided by the output of an AND gate 1050, while RDHITB_REQ is provided by the output of an AND gate 1052. As inputs, the AND gate 1050 receives T_HITA, while the AND gate 1052 receives T_HITB, and both the AND gates 1050 and 1052 receive as inputs a cachable read signal CABLERD_REQ which is provided by the output of an AND gate 1054. The AND gate 1054 receives as inputs NCV, the inverse of PWR, and PMIO.

An enable asynchronous read BRDY signal EN_ASYNC_RDBRDY is provided by the output of an AND gate 1056, which receives as inputs the inverse of PWR and PMIO. An enable asynchronous read RDY signal EN_ASYNC_RDRDY is provided by the output of an AND gate 1058, which receives as its inputs the inverse of PWR, PMIO, and the inverse of a level one cache allocatable memory location signal L1_ALLOCABLE, which is always assumed to be true. Three cache way hit A read enable signals, EN_ASYNC_RDRDY_HITA, EN_ASYNC_PNA_HITA, and EN_ASYNC_RDBRDY_HITA, are provided by the output of an AND gate 1060. These signals are equivalent because, as with a number of the other signals provided by the various modules, certain non-essential signals have been eliminated. That is, for example, EN_ASYNC_RDRDY generally includes the inverse of L1_ALLOCABLE while EN_ASYNC_RDBRDY does not. Because we have assumed that all memory operations are allocatable in the L1 cache, the signals thus might become equivalent. The inputs to the AND gate 1060 are EN_ASYNC_RDBRDY and the inverse of PREDICT_WAY1. Similar signals for way B are provided by the output of an AND gate 1062, which receives as inputs EN_ASYNC_RDBRDY and PREDICT_WAY1.

Turning to FIGS. 21A–21D, the creation of further signals is shown. MRD_REQ is provided by an AND gate 1064, which receives as its inputs NCV and the output of an OR gate 1066. The OR gate receives as its inputs the output of an AND gate 1068 and the output of an AND gate 1070. The AND gate 1068 receives as its inputs PMIO, the inverse of PWR, and TAGMISS. The AND gate 1070 receives as its inputs PMIO, PWR, PCACHE*, the inverse of the standard processor signal PWT, the inverse of PCD, and TAGMISS. Note that again, write through cycles are generally assumed not allowed for simplicity, but the use of the processor write through signal PWT is here illustrated.

A memory read line fill signal MRD_LF is provided by the output of an OR gate 1072, which receives as its inputs the output of an AND gate 1074 and the output of an AND gate 1076. The AND gate 1074 receives as its inputs the inverse of PWR, the inverse of PCD, and PMIO. The AND gate 1076 receives as its inputs PWR, PMIO, PCACHE*, the inverse of PCD, and the inverse of PWT.

ALLOC_REQ is provided by the output of an AND gate 1078, which receives as its inputs NCV and the output of an OR gate 1080. The OR gate 1080 receives as its inputs the output of an AND gate 1082 and the output of an AND gate 1084. The AND gate 1082 receives as its inputs PMIO, the inverse of PWR, the inverse of PCD, and TAGMISS. The AND gate 1084 receives as its inputs PMIO, PWR, the inverse of PWT, the inverse of PCD, PCACHE*, and TAGMISS.

A back-off request signal D_REQ_BOFF is provided by the output of an AND gate 1086, which receives as its inputs NCV, the output of an OR gate 1088, PMIO, PWR, the inverse of PWT, the inverse of PCD, PCACHE*, and TAGMISS. The OR gate 1088 receives as its inputs the inverse of T2P and SYNC_PRDY.

Turning to FIGS. 22A–22B, further signals produced by the request block are shown. REQ_RDHIT_READY is provided by the output of an OR gate 1090, which receives as its inputs the outputs of two AND gates 1092 and 1094. The AND gate 1092 receives as its inputs EN_ASYNC_RDBRDY_HITA, T_HITA, and NCV, while the AND gate 1094 receives the equivalent signals for way B.

A read hit cache output enable way signal REQ_RDHITCOE_WAY is provided by the output of an AND gate 1096, which receives as its inputs T_MATCHB and 2BANK_2WAY. The output of the AND gate 1096 is also provided as the select input of a multiplexer 1098, which as its zero input receives SYNC_COE1 and as its one input receives SYNC_COE0. The multiplexer 1096 provides a pipelined cache output enable O.K. signal REQ_PIP_COE_OK, and a pipelined read hit with no wait state signal REQ_PIPRDHIT_0WS. These two signals are equivalent because of the elimination of irrelevant conditions.

Turning to FIGS. 23A–23G, further signals generated by the request module are shown. A write hit enable ready signal EN_WRHIT_RDY is provided by the output of an AND gate 1100, which receives as its inputs NCV and WT2. Two signals, a write hit BRDY and write hit RDY signal EN_ASYNC_WRBRDY_HIT and EN_ASYNC_WRRDY_HIT are provided by the output of an AND gate 1102, which receives as its inputs PWR, PCACHE*, PMIO, the inverse of PWT, and the inverse of PCD.

An asynchronous write hit cache write enable signal EN_ASYNC_WRCWE_HIT is provided by the output of an AND gate 1104, which receives as its inputs PWR, PCACHE*, and PMIO. An enable asynchronous write BRDY with no tag match and writeback buffer not full signal EN_ASYNC_WRBRDY_NOMATCH_NOTWBFULL is provided by the output of an OR gate 1106, which receives as its inputs the output of an AND gate 1108 and the output of an AND gate 1110. The AND gate 1108 receives as its inputs the inverse of a signal REQ_P2MNOPOST, which when true indicates that a write cannot be posted to memory, PWR, PCACHE, and PHITM*. The AND gate 1110 receives as its inputs PHITM, and the inverse of a snoop write signal M_SNPWR. Note that both REQ_P2MNOPOST and M_SNPWR are both illustrated, although such signals and logic pertaining to snooping and memory posting have been otherwise eliminated for simplicity.

An asynchronous write BRDY with match signal EN_ASYN_WRBRDY_MATCH is provided by the output of an AND gate 1112, which receives as its inputs PWR, PCACHE, and PHITM*. An asynchronous write BRDY with match and writeback buffer not full signal EN_ASYNC_WRBRDY_MATCH_NOTWBFULL is provided by the output of an OR gate 1114, which receives as its inputs the output of AND gates 1116 and 1118. The AND gate 1116 receives as its inputs the inverse of REQ_P2MNOPOST, PWR, PCACHE, and PHITM*. The AND gate 1118 receives as its input PWR, PHITM, and the inverse of M_SNPWR.

An asynchronous write BRDY with no buffer full signal REQ_ASYNC_WRBRDY_NOTWBFULL is provided by the output of an OR gate 1120, which receives as its inputs the output of an AND gate 1122 and the inverse of REQ_P2MNOPOST. The AND gate 1122 receives as its inputs PWR and PCACHE.

Turning to FIGS. 24A–24G, certain other way related signals are shown. WAYHIT is provided by the output of a multiplexer 1150, which receives as its zero input T_HITA and as its one input T_HITB. The select input of the multiplexer 1150 is provided as PREDICT_WAY1.

REQ_MODLINES[3:0] are provided by the output of a multiplexer 1152, which receives as its one input R_MODQB[3:0], and as its select zero input R_MODQA [3:0]. The select input of the multiplexer 1152 is provided by ALLOCTAG_B. Of course, in actual practice the multiplexer 1152 represents four multiplexers. A demultiplexed line select signal LINEBIT[3:0] is provided by the output of a multiplexer 1154, which receives as its select inputs PALINE[1:0], which correspond to the appropriate processor address bus PA bits that select the cache lines, here PA[5:4] for a 486 processor and PA[6:5] for a Pentium®. The multiplexer 1154 provides LINEBIT[3:0] with the corresponding bit of LINEBIT set that corresponds to PALINE [1:0].

REQ_CLINEMOD is provided by the output of a multiplexer 1156, which as its one input receives LINEMODB and as its zero input receives LINEMODA. The select input of the multiplexer 1156 is provided as ALLOCTAG_B. Note that ALLOCTAG_B is the equivalent of ALLOCWAY_1.

An end of process or cycle signal ENDPCYC is provided by the output of an OR gate 1158, which receives as its input PRDY and SYNC_CYCLE_ABORTED.

WRHIT_TAGUPD is provided by the output of an AND gate 1160, which receives as its input a line writebackable signal WRBACKABLE, which is always assumed to be true, as well as the output of an OR gate 1162, which receives as its input the output of an AND gate 1164 and the output of an AND gate 1166. The AND gate 1164 receives its inputs THIT_A and the inverse of LINEMODA, while AND gate 1166 receives a corresponding way B inputs.

Turning to FIGS. 25A–25F, circuitry used to generate CADS*, CAPU*, and PNA is shown.

CADS* is provided by an inverter 1500, which receives as its input the output of an OR gate 1502. The OR gate 1502 receives as inputs an asynchronous cache address strobe signals SYNC_CADS and the output of an AND gate 1504. The AND gate 1504 receives as inputs NCV and the output of an OR gate 1506. The OR gate 1506 receives as inputs an asynchronous cache address strobe signal REQ_ASYNC_CADS and an asynchronous memory write cache address strobe signal ASYNC_MWR_CADS.

REQ_ASYNC_CADS is provided by the output of an AND gate 1508, which receives as inputs PADSEN and the output of an OR gate 1510. The OR gate 1510 receives as inputs TAGMISS, the inverse of PADSEN_DLY, and the output of an AND gate 1512. The AND gate 1512 receives as inputs SB2WAY and the inverse of WAYHIT.

ASYNC_MWR_CADS is provided by the output of an OR gate 1514, which receives as inputs WT2 and the output of an AND gate 1516, which receives as inputs PWR and PCACHE.

SYNC_CADS is provided by the output of a flip-flop 1518, clocked to CLK, which receives as its D input a signal D_SYNC_CADS, which is provided by the output of an OR gate 1520, which receives as inputs D_RDHIT_CADS, D_L2WB_CADS, D_ALLOCD_CADS, D_REQ_CADS, and D_LOCWR_CADS. These of course are the cache address strobe signals from the various logical modules in the CMC 210, and are generated by the state machines within those modules.

In this way, CADS* is generated at appropriate times allow the address on the burst SRAMs 300 and 302 address inputs to be strobed in for a subsequent read.

On burst reads, the address in the burst SRAMs 300 and 302 must be advanced at appropriate times. This is provided by CADV*, which is provided by the output of an OR gate 1522, which receives as inputs the output of a flip-flop 1524, an AND gate 1526, and an AND gate 1528. The flip-flop 1524 is clocked to CLK, and receives as its D input the output of an OR gate 1530, which receives as inputs a memory read cache advance signal D_MEMRD_CADV, D_L2WB_CADV, D_LOCWR_CADV, D_RDHIT_PBRDY, and D_REQ_CADV. These signals advance the cache burst SRAMs 300 and 302 address during a burst read or write. D_MEMRD_CADV is generated by a state machine in the memory read module, which is not illustrated.

The AND gate 1526 receives as inputs NCV_EN RHITA_RDY, EN_ASYNC_RDBRDY_HITA, and T_HITA. The AND gate 1528 receives as inputs NCV_EN_RHITB_RDY, EN_ASYNC_RDBRDY_HITB, and T_HITB.

The processor next address signal PNA is used for pipelining when the processor 200 is a Pentium® P54 processor. PNA is provided by the output of an OR gate 1530, which receives as inputs asynchronous PNA signals SYNC_PNA, provided by the output of an AND gate 1532, the output of an AND gate 1534, and the output of an AND gate 1536. The AND gate 1532 receives as inputs the output of an OR gate 1534, the inverse of a signal NOPIPE_ADDR, which indicates that the current address is not a pipelined address when true, and S_P54C, a registered signal which indicates the processor is a Pentium® P54. The OR gate 1534 receives as inputs a memory read PNA request signal D_MEMRD_PNA, D_RDHIT_PNA, a PCI read request signal D_PCIRD_PNA, and D_REQ_PNA. It will be understood that the various modules request PNA be asserted through these signals from their state machines, with the memory read state machine producing D_MEMRD_PNA and the PCI read state machine producing D_PCIRD_PNA not being illustrated.

The AND gate 1534 receives as inputs NCV_EN_RHITA_RDY, EN_ASYNC_PNA_HITA, and T_HITA. The AND gate 1536 receives as inputs NCV_EN_RHITB_RDY, EN_ASYNC_PNA_HITB, and T_HITB.

The generation of PNA is well known to the art, but this circuitry serves to further illustrate how the CMC 210 generates it according to the invention.

Turning to FIGS. 26A–26H, circuitry for generating chip select strobes CCS0* and CCS1* when a two-bank two-way cache is implemented is shown. As will be understood, when a single-bank two-way cache is implemented, only one of these signals, CCS0*, is used. A chip select block signal REQ_BLK_CCS0 is provided by the output of an AND gate 1538, which receives as inputs NCV, the inverse of SB2WAY, and ALLOCWAY_1. The corresponding way 1 signal REQ_BLK_CCS1 is provided by the output of an AND gate 1540, which receives as inputs NCV and the inverse of ALLOCWAY_1.

A synchronous block chip select signal SYNC_BLK_CCS0 is provided by the output of a flip-flop 1542, clocked to CLK, which receives its D input from the output of an OR gate 1544, which in turn receives as inputs the output of an AND gate 1546 and the output of an AND gate 1548. The AND gate 1546 receives as inputs the inverse of SB2WAY and the output of an OR gate 1550. The OR gate 1550 receives as inputs D_ALLOCD_BLK_CCS0, a synchronous cache write enable signal D_SYNC_CWE1, and D_LOCWR_BLK_CCS0. The AND gate 1548 receives as inputs the inverse of D_PADSEN and the inverse of D_SYNC_CADS. SYNC_BLK_CCS0 blocks the cache way 0 chip select when that is not the appropriate way.

A corresponding way 1 signal SYNC_BLK_CCS1 is provided by the output of a flip-flop 1552, clocked to CLK, which receives as its D input the output of an OR gate 1554. The OR gate 1554 receives as inputs the output of an OR gate 1556, and the output of an AND gate 1558. The OR gate 1556 receives as inputs D_ALLOCD_BLK_CCS1, a cache write enable signal D_SYNC_CWE0, and D_LOCWR_BLK_CCS1.

D_SYNC_CWE0 is provided by the output of an OR gate 1560, which receives as inputs D_LOCWR_CWE0, and D_REQ_CWE0. The corresponding way 1 signal D_SYNC_CWE1 is provided by the output of an OR gate 1562, which receives as inputs D_LOCWR_CWE1 and D_REQ_CWE1. CWE*[7:0] are controlled in part using these signals and in part using other circuitry not shown. The generation of the appropriate cache byte way enables is well known to the art, and is done to write the data on PD into the cache burst SRAMS 300 and 302. They would appropriately be enabled on any allocation cycles, processor write hits, and other cycles well understood by those skilled in the art.

From all of these signals, CCS0* is provided by the output of an OR gate 1564, which receives as inputs REQ_BLK_CCS0 and SYNC_BLK_CCS0. Corresponding way 1 signal CCS1* is provided by the output of an OR gate 1566, which receives as inputs REQ_BLK_CCS1 and SYNC_BLK_CCS1.

Miscellaneous Signals

Figure 27A:
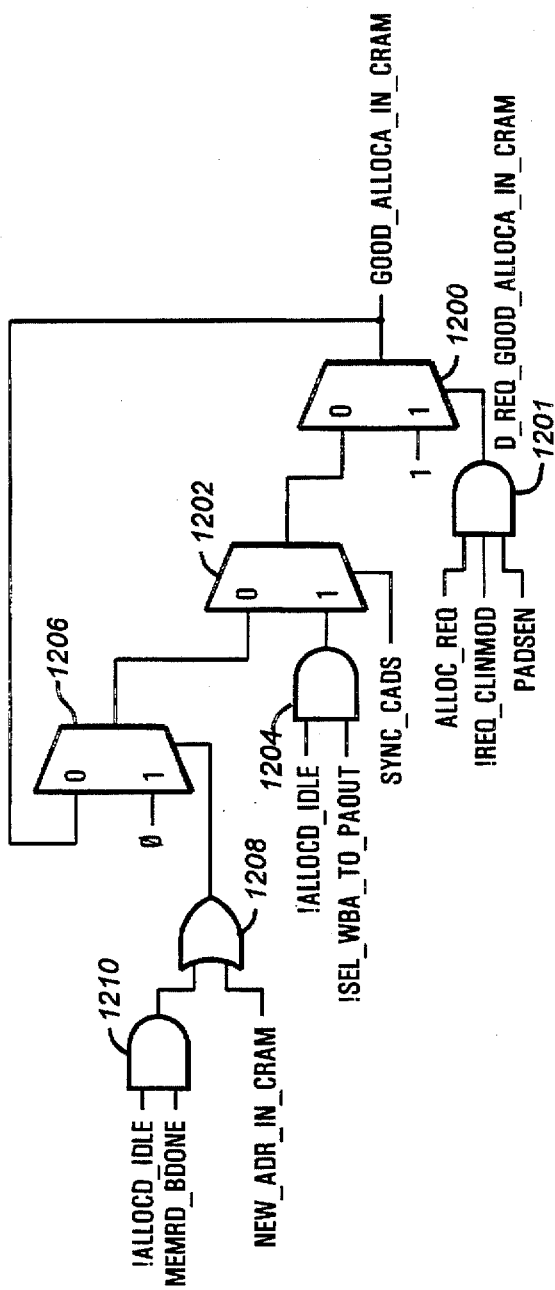
FIGS. 27A–27C are schematic illustrations of circuitry used to create various address strobes and allocation status signals.
Figure 27B:
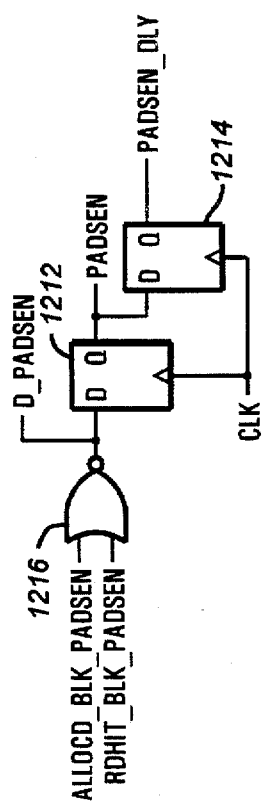
Figure 27C:
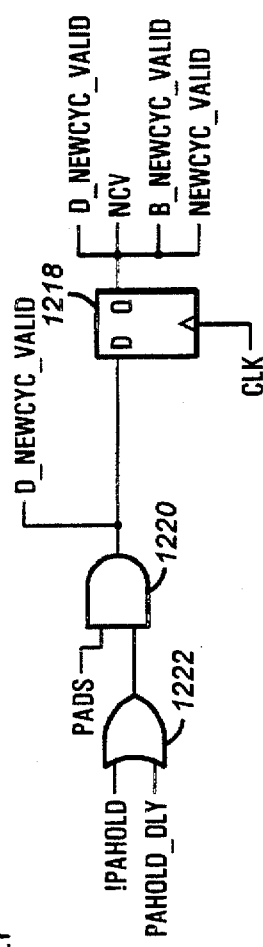

Turning to FIGS. 27A–27C, the generation of various miscellaneous signals is shown. GOOD_ALLOCA_IN_CRAM is provided by the output of a multiplexer 1200. The select input of the multiplexer 1200 is provided by D_REQ_GOOD_ALLOCA_IN_CRAM. This signal is provided by the output of an AND gate 1201, which receives as inputs ALLOC_REQ, the inverse of REQ_CLINMOD, and PADSEN. Thus, D_REQ_GOOD_ALLOCA_IN_CRAM is true on an allocation request when no cache lines are modified.

The one input of the multiplexer 1200 is driven true. The zero input is provided by the output of a second multiplexer 1202, whose select input is provided as SYNC_CADS. The one input of the multiplexer 1202 is driven by the output of an AND gate 1204, having as inputs the inverse of ALLOCD_IDLE and the inverse of a signal SEL_WBA_TO_PAOUT. SEL_WBA_TO_PAOUT is provided by the L2 writeback state machine of FIG. 10 through logic not shown, and is true whenever that state machine still has data pending to writeback of the current writeback cycle. The zero input of the multiplexer 1202 is provided by the output of a third multiplexer 1206, whose select input is driven by the output of an OR gate 1208. The OR gate 1208 has as inputs NEW_ADR_IN_CRAM (true when PADS and PADSEN are both true, and created by circuitry not shown) and the output of an AND gate 1210, which has as inputs the inverse of ALLOCD_IDLE, and MEMRD_BDONE. The one input of the multiplexer 1206 is driven false and the zero input is provided by GOOD_ALLOCA_IN_CRAM.

A flip-flop 1212 provides PADSEN, which is also provided to the D input of a flip-flop 1214, the output of which is PADSEN_DLY. Both flip-flops 1212 and 1214 are clocked by CLK, and flip-flop 1212 receives as its D input D_PADSEN output by an NOR gate 1216. The inputs to the NOR gate 1216 are ALLOCD_BLK_PADSEN and RDHIT_BLK_PADSEN. The latter signal is provided by the read hit state machine of FIG. 8, while the former is provided through circuitry not shown by the allocation state machine of FIG. 14.

Various new cycle valid signals NCV, B_NEWCYC_VALID, and NEWCYC_VALID are provided by the output of a flip-flop 1218, clocked by CLK. As its D input, the flip-flop 1218 receives a signal D_NEWCYC_VALID, which is provided by the output of an AND gate 1220, which receives as its input PADS as well as the output of an OR gate 1222. As inputs, the OR gate 1222 receives the inverse of PAHOLD, as well as that signal delayed by one clock cycle, indicated by PAHOLD_DLY.

Cache Tag Memory

Turning to FIG. 28, the tag RAM 364 is shown as logically implemented in the CMC 210. Shown is way A, or way 0, of the tag RAM 364. Way B of the tag RAM 366 would be the equivalent, with "A" being substituted for "B" in the various tag memory inputs and outputs. As inputs, the tag RAM 364 includes tag label write enable signals T_LABELWEA[10:0], modified line bit write enable signals T_MODWEA[3:0], valid bit write enable signals T_VALIDWEA[3:0], LRU bit write enable signal T_LRUWEA, chip select signal T_TAGCSA, label data signals T_LABELDA[10:0], modified bit data signals T_MODD[3:0], valid bit data signals T_VALIDD[3:0], and LRU data signal T_LRUDA. Also driven into the tag RAM 365 is the index, which is processor address lines 16 through 7 when using a Pentium® processor, indicated by PA[16:7].

As outputs, the tag RAM 364 provides label output data signals R_LABELQA[10:0], modified bit output data signals R_MODQA[3:0], valid bit output data signals R_VALIDQA[3:0], and LRU output data signals R_LRUQA. Of note, the tag RAM 364 implements the modified, shared, and invalid states, but does not implement the exclusive state of the MESI standard because the CMC 210 is not intended to operate in a multiprocessor environment with other caches. Therefore, cache coherency requiring the exclusive state is not needed.

Proceeding to FIGS. 29A–29K, a state machine for updating the tags in the tag RAMs 364 and 366 is shown, as well as various circuitry for creating signals needed by the tag RAMs 364 and 366 and the tag RAM state machine. One state associated with a forced wait state is omitted, as in the preferred embodiment, operation is without a forced wait state. State S0 is the idle state, and it proceeds to state S1 on a tag request signal P_TAGREQ being true or on a new tag cycle signal NEWTAGCYC being true. When P_TAGREQ is not true, the tag write state machine remains in state S0. From state 1, the state machine proceeds to state 0 if a tag write (i.e., a tag update) is not needed, as indicated by TAGWRITEA and TAGWRITEB being false. If either TAGWRITEA or TAGWRITEB is true, the state machine instead proceeds to state S2, where the tags are rewritten. After state S2, the state machine returns to state S0. Of note, NEWTAGCYC is the equivalent of D_NEWCYC_VALID.

A tag latch signal TAGLATCH is provided by the output of a flip-flop 1302, clocked by CLK, which receives its D input true when the state machine is not in state S1.

P_CPU_ALLOC is provided by flip-flop 1304, clocked by CLK, which as its D input receives SET_P_CPUALLOC. It is true when a tag allocation is needed.

P_TAGREQ is provided by the output of an OR gate 1306, which receives as inputs ALLOCT_PTAGREQ, L2SNP_PTAGREQ, LOCWR_PTAGREQ, and FLSH_PTAGREQ. The signals L2SNP_PTAGREQ and FLSH_PTAGREQ are tag requests from the L2 snoop logic and the cache flush logic, which is not illustrated. It will be readily understood that when these state machines need new tags, they would assert this corresponding signal.

A modified bit update signal P_MODUPD is provided by the output of an OR gate 1308, which receives as inputs WT2, TD, and the output of an AND gate 1310, which in turn receives as inputs WT2P and SYNC_PRDY.

An assert tag chip select signal D_TAGCS is provided by the output of an OR gate 1312, which receives as inputs D_ALLOCT_TAGCS, D_L2SNP_TAGCS, D_LOCWR_TAGCS, and D_FLSH_TAGCS. Again, the snoop and flush logic would provide the L2SNP and FLSH tag chip select variables.

A writeback state signal P_CPUWRBK is provided by the output of an AND gate 1314, which receives as inputs NCV and WBT2. A cache least recently used way signal C_LRU_WAY is provided by the output of an exclusive OR gate 1316, which receives as inputs R_LRUQA and R_LRUQB.

A processor write signal P_CPUWR is provided by the output of an OR gate 1318, which receives as inputs LOCWR_CPUWR and the output of two AND gates 1320 and 1322. The AND gate 1320 receives as inputs P_CPU_ALLOC and ALLOCT_LAT_WRALLOC_REQ. The AND gate 1322 receives as inputs NCV and the output of an OR gate 1324. The OR gate 1324 receives as inputs WBT2 (writeback T2 cycle), WT2, TD, and the output of an AND gate 1326, which receives as inputs WT2P and SYNC_PRDY.

A processor read signal P_CPURD is provided by the output of an OR gate 1328, which as inputs receives the outputs of AND gates 1330 and 1332. The AND gate 1330 receives as inputs P_CPUALLOC and the inverse of ALLOCT_LAT_WRALLOC_REQ. The AND gate 1332 receives as inputs the inverse of PWR and NCV.

Proceeding to FIGS. 30A-30I, various logic for use in driving the tag RAMs 364 and 366 is shown. Way allocate signals ALLOCATE_WAYA and ALLOCATE_WAYB are provided by the outputs of two AND gates 1350 and 1352. The AND gate 1350 receives as inputs the inverse of P_ALLOCWAY as well as the output of an AND gate 1354. The AND gate 1352 receives as inputs the output of the AND gate 1354 and P_ALLOCWAY. The AND gate 1354 receives as inputs the inverse of T_MATCHA, the inverse of T_MATCHB, and P_CPUALLOC.

Set validate bit signals VALIDATE_WAYA and VALIDATE_WAYB are provided by the outputs of AND gates 1356 and 1358. The AND gate 1356 receives as inputs the output of an AND gate 1360, which receives as inputs T_MATCHA, the inverse of LINEVALIDA, and the output of an OR gate 1362. The OR gate 1362 receives as inputs P_CPUALLOC and P_CPUWRBK.

The AND gate 1358 receives as inputs the output of the OR gate 1362 and the output of an AND gate 1364, which receives as inputs T_MATCHB and the inverse of LINEVALIDB. Invalidate tag RAM signals INVALIDATE_WAYA and INVALIDATE_WAYB are provided by the outputs of AND gates 1366 and 1368. Both of these AND gates receive as inputs the output of an AND gate 1370, which receives as inputs P_SNPWR and the inverse of a snoop writeback signal P_SNPWRBK, generated by circuitry not shown.

The AND gate 1366 further receives as an input the output of an AND gate 1372, which receives as inputs T_MATCHA and LINEVALIDA. The AND gate 1368 further receives as an input the output of an AND gate 1374, which receives as inputs T_MATCHB and LINEVALIDB.

The AND gate 1376 provides as an output a way modify signal MODIFY_WAYA. It receives as inputs T_MATCHA, the inverse of LINEMODA, and the output of an OR gate 1378. The OR gate 1378 receives as inputs P_CPUALLOC, P_CPUWRBK, and an AND gate 1380. The AND gate 1380 receives as inputs P_CPUWR, P_MODUPD, the inverse of PWP, and LINEVALIDA. MODIFY_WAYB, the way B modified signal, is generated using the same logic, but substituting the way B signals for the way A signals.

Two unmodify signals UNMODIFY_WAYA and UNMODIFY_WAYB are provided by AND gates 1382 and 1384, both of which receive as inputs the output of an AND gate 1386. The AND gate 1386 receives as inputs P_SNPWRBK inverted along with the output of an OR gate 1388. The OR gate 1388 receives as inputs P_SNPRD and P_SNPWR. The AND gate 1382 further receives as inputs LINEMODB and T_MATCHB, and the AND gate 1384 further receives as inputs T_MATCHA and LINEMODA.

A new least recently used signal NEWLRU_WAYA is provided by the output of an AND gate 1390. The AND gate 1390 receives as inputs T_MATCHA along with the inverse of C_LRU_WAY and the output of an OR gate 1392. The OR gate 1392 receives as inputs P_CPUWRBK, P_CPUALLOC, and the output of an AND gate 1394. The AND gate 1394 receives as its inputs LINEVALIDA, P_LRUUPD (a signal generated by circuitry not shown which indicates that the LRU bit should be updated), and the output of an OR gate 1396. The OR gate 1396 receives as inputs P_CPURD and P_CPUWR.

A way B new least recently used bit signal NEWLRU_WAYB uses the same circuitry as NEWLRU_WAYA, with the exceptions that the way B signals are substituted for the way A signals shown, and the non-inverted value of C_LRU_WAY is used by the equivalent of the AND gate 1390.

A tag write to way A variable TAGWRITEA is provided by the output of an OR gate 1398. The OR gate 1398 receives as inputs P_TAGFLSH, ALLOCATE_WAYA, VALIDATE_WAYA, INVALIDATE_WAYA, MODIFY_WAYA, UNMODIFY_WAYA, and NEWLRU_WAYA. The occurrence of any of these signals and would indicate a tag write, forcing the state machine from state S1 to state S2. The way B tag write signal TAGWRITEB is generated in the same way as TAGWRITEA except that the way B signals are substituted for the way A signals.

A signal indicating that any lines of the currently selected block of the tag RAM 364 are modified ANYMODA is provided by the output of an OR gate 1400 which has as inputs each of the lines of T_MODQA[3:0]. An OR gate 1402 similarly provides the way B corresponding signal ANYMODB.

Proceeding to FIGS. 31A-31J, further circuitry showing how the tag RAMs 364 and 366 are updated is shown. A set modified bit data signal SET_MODD is provided by the output of an AND gate 1404, which has as inputs the inverse of P_TAGFLUSH, which indicates that the tag RAMs 364 and 366 should be flushed and is provided by circuitry not shown, along with the inverse of PWP. Further providing an input to the AND gate 1404 is an OR gate 1406, which receives as inputs P_CPUWR and P_CPUWRBK.

The four signals T_MODD[3:0] are provided by a series of flip-flops illustrated by the flip-flop 1408, which is clocked whenever one of the variables used to generate T_MODD[3:0] changes state. As its D input, the flip-flop 1408 receives the output of a multiplexer 1410, whose zero input is provided by the appropriate one of T_MODD[3:0]. The one input of the multiplexer 1410 is provided by the output of an AND gate 1412, which receives as inputs LINEBIT[3:0] and SET_MODD. The multiplexer 1410 has its select input driven by TAGLATCH.

T_TAGCSA is provided by the output of an OR gate 1414, which receives as inputs PADS and the output of a multiplexer 1416. The select input of the multiplexer 1416 is provided as PADS*, and the zero input is provided high. The one input is driven by the output of an OR gate 1418, which as inputs receives D_TAGCS along with the output of an AND gate 1420, which receives as inputs TAG-WRITEA and STATE_S1 which indicates the state machine of FIG. 29 is in the S1 state. T_TAGCSB is generated using corresponding logic.

A latched modified bit write enable signal REG_MODWEA[X], where X equals zero through three for the four modified bits, is provided by the output of a flip-flop 1422, which is clocked by CLK. The D input of the flip-flop 1422 is driven by the output of an AND gate 1424, which receives as its inputs STATE_S1 and the output of an OR gate 1426. The OR gate 1426 receives as inputs the output of an AND gate 1428 and ALLOCATE_WAYA. The AND gate 1428 receives as inputs LINEBIT[X] and the output of an OR gate 1430. The OR gate 1430 receives as inputs MODIFY_WAYA and UNMODIFY_WAYA.

Corresponding latched modified bit write enable signals REG_MODWEB[X] are generated using the same circuitry as used to generate REG_MODWEA[X], but by substituting the WAYB signals for the WAYA signals. Of note, these register mode write enable bits are enabled when ALLOCATE_WAYA is true during state S1. Thus, on allocation cycles, the latch mode bit is write enabled.

A latched least recently used bit write enable signal REG_LRUWEA is provided by the output of a flip-flop 1432, clocked by CLK. The D input of flip-flop 1432 is provided by the output of an AND gate 1434, which as inputs receives STATE_S1 as well as the output of an OR gate 1436. The OR gate 1436 receives as inputs ALLOCATE_WAYA, VALIDATE_WAYA, the inverse of P_SNPWRBK, MODIFY_WAYA, and NEWLRU_WAYA. The corresponding WAYB least recently used bit write enable signal REG_LRUWEB is generated using similar circuitry, but with the way B signals substituted for the way A signals.

A clear tag write enable signal TAGWEA_CLR is provided by the output of a flip-flop 1438, which is clocked on the negative edge of CLK. The D input of the flip-flop 1438 is driven by the output of an OR gate 1440, which receives as inputs REG_LRUWEA as well as the output of an OR gate 1442. The OR gate 1442 receives as inputs all of the lines of REG_MODWEA[3:0].

T_MODWEA[X] is provided by a series of AND gates illustrated by an AND gate 1444, which receives as its inputs the inverse of TAGWEA_CLR and REG_MODWE[X].

T_LRUWEA is provided by the output of AND gate 1446, which receives as inputs the inverse of TAGWEA_CLR, as well as REG_LRUWEA. Corresponding WAYB signals T_MODWEB[X] and T_LRUWEB are generated by substituting the corresponding way B signals for the illustrated way A signals.

LINEVALIDA is provided by the output of a multiplexer 1448, which as its select inputs receives PALINE[1:0], the line selects on the processor address bus PA. These line selects select the appropriate one of the four signals R_VALIDQA[3:0], thus providing it as LINEVALIDA. LINEMODA is similarly provided by a multiplexer 1450, again selected by PALINE[1:0] and in this case selecting between the four signals R_MODQA[3:0]. Corresponding LINEVALIDB and LINEMODB signals are generated using similar circuitry.

Allocate Direct to Modified Operation

Referring to the circuitry of FIGS. 28–31J, it will be understood that when a processor 200 write cycle results in a tag miss, the resulting L2 cache 208 allocate cycle takes that line directly to the modified state rather than to the unmodified state. Specifically, SET_MODD as provided by the AND gate 1404 will be true because one of the signals provided to the OR gate 1406 is P_CPUWR. Referring to the generation of that signal, the OR gate 1318 has as one input the output of the AND gate 1320. That AND gate 1320 will provide a true signal, because P_CPUALLOC will be true and the ALLOCT_LAT_WRALLOC_REQ will be true. This latter signal is latched by the flip-flop 944 on a write allocation request, while P_CPUALLOC from the flip-flop 1304 is similarly set by the tag allocation state machine of FIG. 17 setting SET_P_CPUALLOC. Thus, on a write miss the resulting allocated line in the tag RAM 364 or 366 will be set to modified, even though it has only been read, and yet not modified.

Then, when the back off signal PBOFF to the processor 200 is dropped, allowing the processor 200 to resume the write that caused the allocation, the resulting write hit will be to a modified line. A write hit to a modified line, however, does not require that the tags be updated, because the line simply remains modified. This results in one less wait state, because usually a tag update to modified requires one extra wait state.

Timing Diagrams Showing System Operation

Direct to Modified

Figure 32:
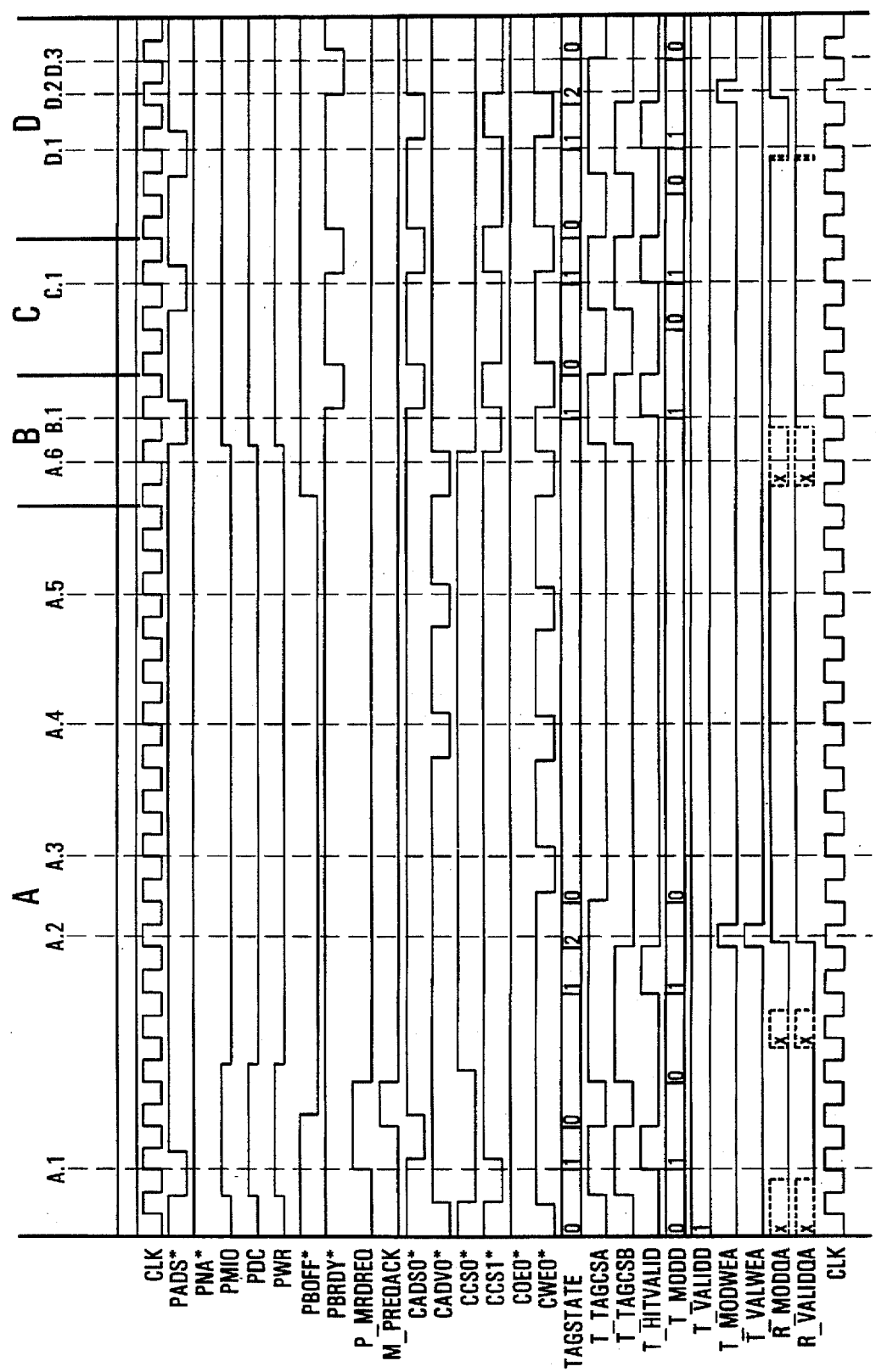
FIG. 32 is a timing diagram illustrating the write allocate direct to modified operation according to the invention.

Turning to FIG. 32, the timing of various signals in the computer system 100 is shown during a write allocate direct to modified cycle in which the processor is running at 50 MHz. Four distinct operations are illustrated. First, operation A is a write miss to the L2 cache 208 followed by an allocate cycle; operation B is the resulting write to the L2 cache 208 line just allocated; operation C is a write hit to a modified line; and operation D is a write hit to a valid but shared or unmodified line. The states of various illustrated signals will be examined at various times within each of these operations.

At time A.1, PADS* has been asserted, but the line for which the read is being attempted is not valid, as is indicated by T_HITVALID going true while R_VALIDQA remains false. So, the CMC 210 L2 cache 208 control logic requests a memory read by asserting P_MRDREQ true, which is acknowledged by M_PREQACK subsequently going true. PBOFF* is then asserted, backing off the write operation that caused the L2 cache 208 miss. While waiting for the memory read to become available, the tag state machine illustrated in FIGS. 29A–29K cycles from S0 to S1 to S2

(indicated by TAGSTATE), where the tags are rewritten in anticipation of the burst read from memory. At time A.2, it is seen that the tag state machine is in state S2, with T_MODWEA asserted true and T_MODD, the data for the modified bit, also being asserted true. Thus, the modified bit in the appropriate way of the tag RAMs 364 or 366 is set for this line before the data is even read into the L2 cache 208. At the following times, A.3, A.4, A.5 and A.6, the data is read into the L2 cache 208, as illustrated by CWE0* being asserted and CADV0* being subsequently strobed to advance the burst SRAMs 300 and 302 addresses. PBOFF* is also then deasserted, allowing the processor 200 to complete the write to the line it was attempting.

The processor 200 attempts this write to the previously invalid line in operation B. Operation B results in a hit to a line that the cache tag RAMs 364 or 366 indicate is modified, as illustrated by R_MODQA being true when T_HITVALID goes true at time B.1. Because this is a write to a modified line, the tag RAM 364 or 366 modified bits do not need to be updated, so the cycle then ends. Note that operation B has only taken three cycles. Operation C is similar to operation B, with a write hit to the previously allocated line. This write hit is not the result of the backed off write, but a new write. Again, however, the write to the modified line results in no need to update the modified bits, as is seen when T_HITVALID goes true with R_MODQA also true at time C.1.

Compare this with operation D, a write hit to an unmodified line. In this case, when T_HITVALID goes true at time D.1, R_MODQA is false, indicating the current line is not modified. But because this is a write operation, the tags for this line must be updated to indicate that it has been modified. So, TAGSTATE proceeds to state S2, which was unnecessary in operations B and C, where T_MODWEA is asserted with T_MODD true, thus writing the correct modified value to the tag RAMs 364 or 366 at time D.2. Then, only on the next clock cycle is PBRDY* asserted at D.3. Thus, this operation has occupied one extra clock cycle.

It will thus be appreciated that by setting a line's modified bits to true during the allocate read, rather than setting them to unmodified, the resulting backed-off write will take one less clock cycle than if the modified bits had not been so set. That is, in FIG. 32, operation B would have taken one extra clock cycle. It will thus be appreciated that performance is improved and a cycle save when using non-dual ported RAMS by taking the modified bits directly to modified on the allocate cycle.

It will further be appreciated that such an advantage can be realized whether using a direct mapped cache or two-way set-associative cache. In any case, the write operation to an allocated line saves a wait state.

Two-Bank Two-Way Code Read Way Prediction

Figure 33:
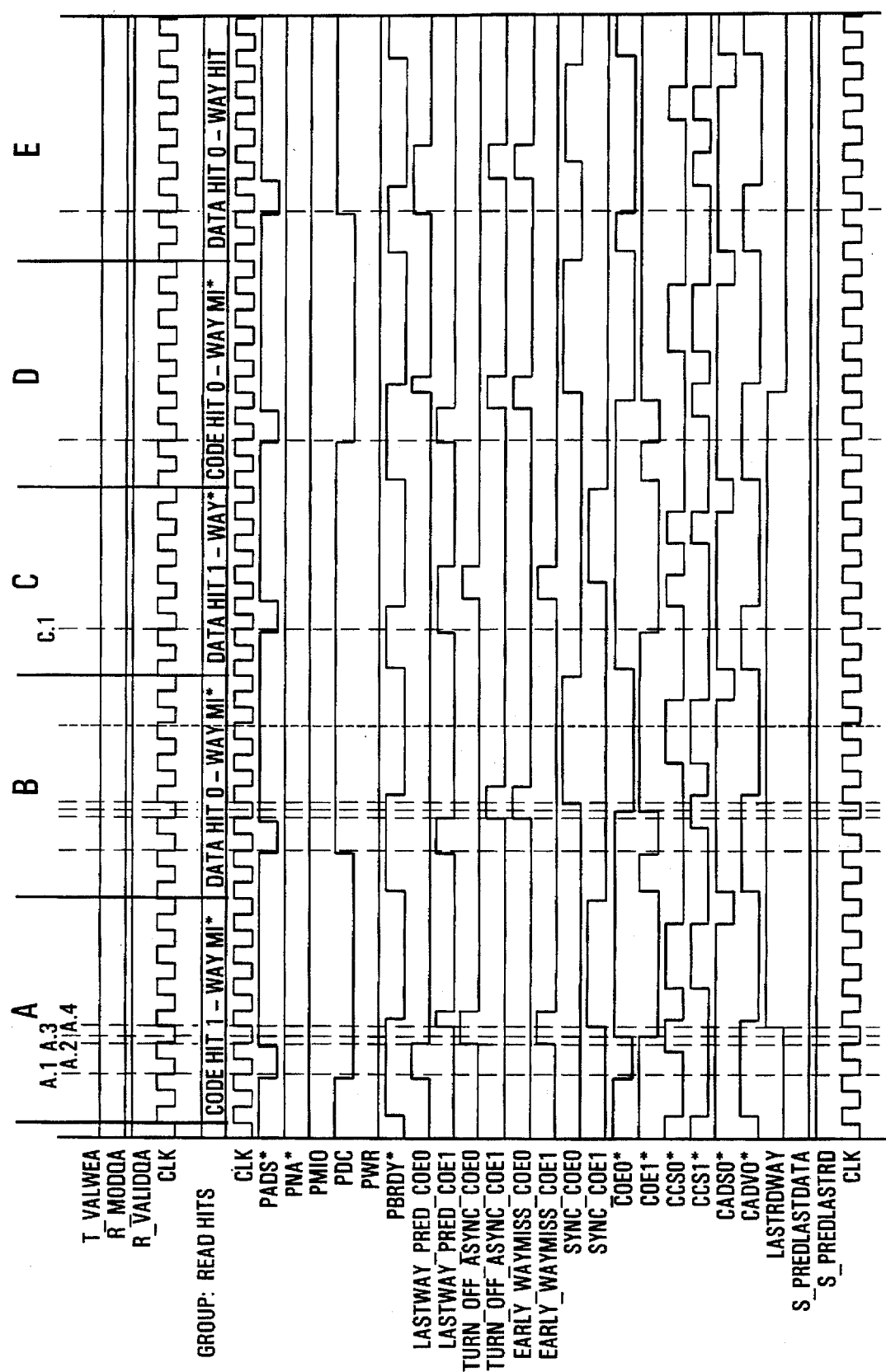
FIG. 33 is a timing diagram illustrating last code way prediction in a two-bank two-way cache according to the invention.

Turning to FIG. 33, the timing of various signals is shown that illustrates way prediction based on the last code read way in a two-bank two-way cache. Five operations are shown. Operation A is a code hit to way 1, in which the way prediction has missed. Operation B is a data hit to way 0, in which the way prediction has missed. Operation C is a data hit to way 1, in which the way prediction has hit. Operation D is a code hit to way 0, in which the way prediction has missed. Operation E is a data hit to way 0, in which the way prediction has hit. The way prediction being used is last code read, not last code plus data read. Using last code plus data read, data read operations would change LASTRDWAY to whatever way the data read occurred.

Referring to operation A, it is seen that when PADS* is asserted, LASTRDWAY is currently low, indicating way 0 was the last read way. Thus, at the assertion of PADS*, it is seen that COE0* is driven low, predicting that way 0 will be the way of this read operation. Further, LAST_PRED_COE0 is true, indicating that the last way prediction is to way 0. At A.2, which is the following edge of CLK, EARLY_WAYMISS_COE1 goes true, indicating that if the predicted way is not to way 1, a way miss has occurred. Simultaneously, TURN_OFF_ASYNC_COE0 goes true, forcing LASTWAY_PRED_COE0 low, the combination of which force COE0* high and COE1* low after a brief delay. This, however, costs one cycle, as PBRDY* is delayed, causing the read operation to take an extra cycle. Note that LASTRDWAY is reset to 1, indicating that this, the last code read, was to way 1. Operation B, a data read hit to way zero, but with the way prediction failing, having predicted way 0, includes similar timing as operation A, except that LASTRDWAY is not reset to zero, because S_PREDLAST data is false, indicating that only code read hits are used to predict the next way.

In operation C, at time C.1, COE0* is deasserted high, while COE1* is asserted low. This is a hit to way 1, and COE0* and COE1* remain at the respective states throughout the remainder of the operation. This does not cost an extra cycle, as PBRDY* is asserted low in the cycle immediately following PADS*.

In this way, way hits do not cause an extra cycle to be incurred, whereas way misses only cause a single extra cycle to be incurred. This method of prediction can even be preferable to a most recently used way prediction well known to the art in high speed systems. Most recently used signals are generated from the LRU bits in the cache tag RAMS, and obviously the LRU way will not be ready until the tag RAMS have output these LRU bits during PADS*. But by then, it can still be too late to assert PBRDY* without incurring a wait state, depending on system timing.

But as will be discussed below in conjunction with FIGS. 35A–35B, even though an extra wait state is not required in this instance, the single-bank two-way cache according to the invention does have a timing advantage over the two-bank two-way cache implemented using way prediction according to the invention in the case of pipelined operations. With pipelined operations, in the two-bank two-way cache, it is always necessary to deassert PBRDY* on a way miss between pipelined operations.

The cache output enable circuitry when using a two-bank two-way cache according to the invention also provides an advantage on a way miss using a two-bank two-way cache. Specifically, the circuitry used to generate COE0* and COE1* is not entirely synchronous. For an understanding of this, refer to FIG. 33, operation A, at time A.3. It appears as though COE0* and COE1* simultaneously switch, enabling COE1* and disabling COE0*.

But if these were simultaneous, that could stress the two-bank two-way cache burst SRAMs 312, 314, 322, and 324. If one bank was enabled simultaneously with another bank being disabled, they could conceivably be driving the data bus at the same time.

But according to the invention, the cache output enable circuitry is not entirely synchronous, so in fact COE0* is deasserted slightly before the time COE1* is asserted. In this way, in the disclosed embodiment, a wait state can be avoided on a way miss. Specifically, the extra state that would be required if COE1* in operation A were not asserted until after the time PBRDY* would have to be asserted is eliminated.

The circuitry for achieving this asynchronous switching is found in FIGS. 6A–7G. Assume, for example, that way prediction has predicted way 0, and thus COE0 is asserted. But then, a way miss occurs, requiring a switch to way 1. Referring to the circuitry of FIG. 6, it will be seen that one input to COE0 is LASTWAY_PRED_COE0. It is this signal which has previously asserted COE0 using way prediction. The AND gate 572 has as one input to LASTWAY_PRED_COE0 the inverse of TURN_OFF_ASYNC_COE0. Referring to FIG. 7, TURN_OFF_ASYNC_COE0 is seen to go true on a hit to way 1 (T_HITB) and on a low level of CLK as provided by the AND gate 590. The end result of this circuitry is that TURN_OFF_ASYNC_COE0 is driven directly by CLK, and when CLK goes false and we have a way miss and must go to way 1, TURN_OFF_ASYNC_COE0 goes immediately true. This forces LASTWAY_PRED_COE0 false, which immediately forces COE0 false, or deasserted.

COE1, however, is then asserted through a slightly different method. As one input, COE1 in FIGS. 6A–6K is dependent upon EARLY_WAYMISS_COE1. Referring to FIGS. 7A–7G, it is seen that this is in turn dependent upon EN_WAYMISS_COE, which is in turn also asserted on the negative edge of CLK by the flip-flop 594. But the flip-flop 594 provides a delay not present in the deassertion of COE0. The end result is the delay between the falling edge of CLK and the deassertion of COE0 is less than that of the assertion of COE1. That is, COE1 is asserted slightly later than COE0. Through these critical timing paths, COE0* and COE1* are never asserted at the same time, but have a slight delay between their assertions.

Single-Bank Two-Way Operation

Figure 34:
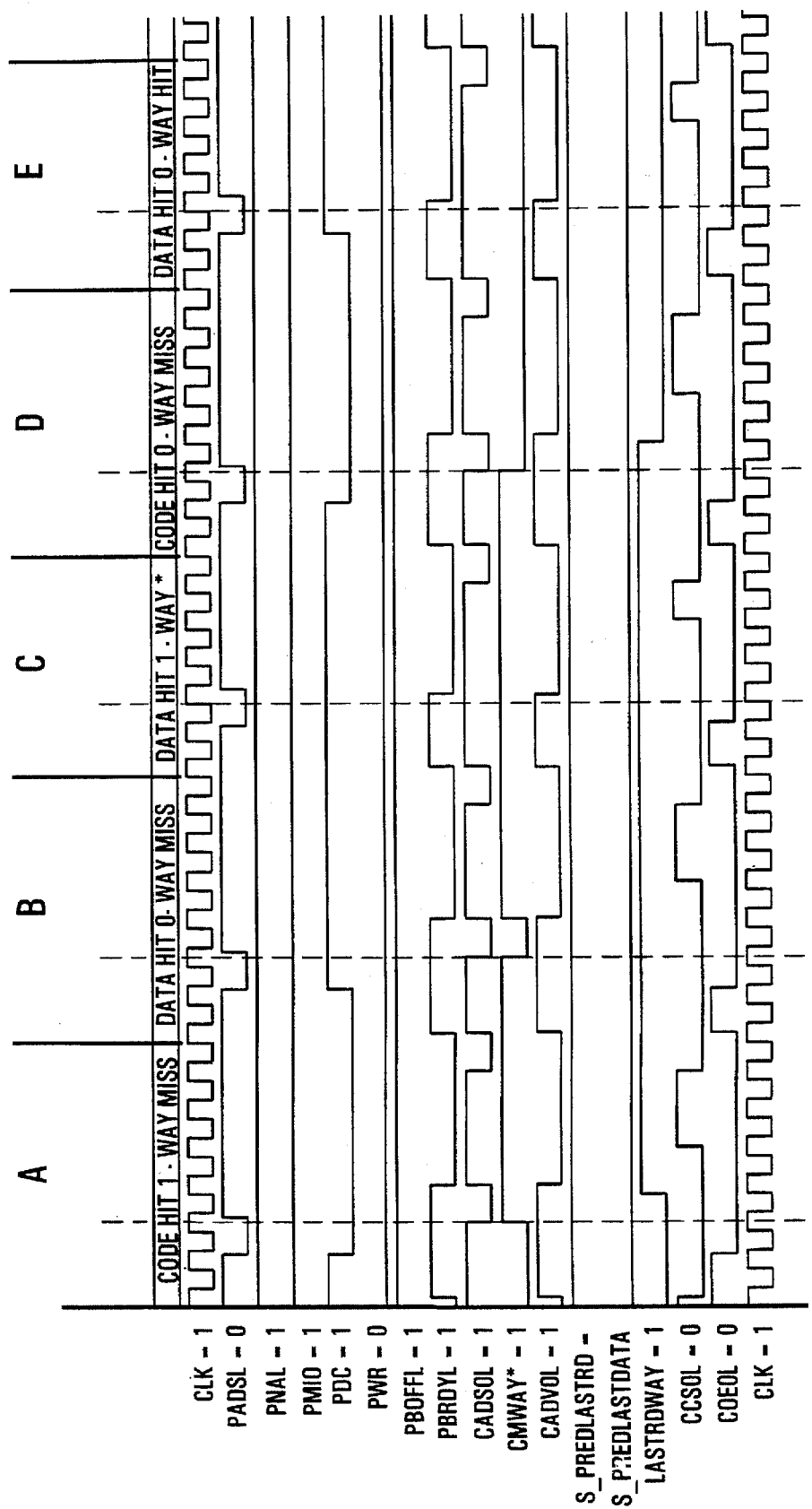
FIG. 34 is a timing diagram illustrating last code way prediction in one-bank two-way cache according to the invention.

Turning to FIG. 34, the timing of various signals used for way prediction in a single bank, two way cache data RAM are shown. Five operations are shown. Operation A is a code hit to way 1, but a way prediction miss. Operation B is a data hit to way zero, but a way prediction miss. Operation C is a data hit to way 1, with a way prediction hit. Operation D is a code hit to way zero, with a way prediction miss. Operation E is a data hit to way zero, with a way prediction hit.

The operation of the cache control signals using a single-bank two-way cache is relatively simpler than in a two-bank two-way cache using way prediction. Referring to operation A, at the indicated time it is determined that the way bit provided to the most significant address bit of the burst RAMs 300 and 302 and indicated by CMWAY is incorrect. Since this is a tag hit to way 1, CMWAY is changed to logic 1, and CADS0* is then strobed. Note that the processor 200 had previously strobed the burst RAMs 300 and 302 through PADS* being driven to the ADSP* input of the burst RAMs 300 and 302 while COE0* was asserted. Thus, on a way miss, an extra cycle is incurred for CADS0* to be strobed in correctly. Also note that LASTRDWAY is changed to way 1 in operation A, reflecting that this last code read was to way 1.

In operation B, CMWAY is high during the assertion of PADS*. This is because LASTRDWAY is high, thus predicting way 1. The tag RAMs 364 and 366 indicate this is a tag hit to way zero, indicating a way miss, so the correct way must be strobed in at the indicated time by CADS0* with CMWAY being asserted low. Note that immediately after this data is strobed in, however, CMWAY returns high, as LASTRDWAY is high. In operation C, the address strobed into the burst RAMs 300 and 302 during PADS* is correct. That is, CMWAY is correct. Thus, CADS0* does not need to be strobed low to strobe in a correct CMWAY. In this case, an extra cycle is not needed to strobe in the correct way. Operation D illustrates a code hit to way zero with a way miss, again causing LASTRDWAY to be switched and requiring an extra cycle, and operation E indicates a data hit to way zero with a way hit.

It will be appreciated, as in the two-bank two-way case, a way miss incurs a single extra clock cycle while a way hit incurs no wait state whatsoever. If LRU way prediction were used, or if no way prediction were used with a single-bank two-way cache, no address could be driven to the cache burst RAMs 300 and 302 until after the tag RAMs 364 and 366 had been strobed. This is because the outputs of the tag RAMs 364 and 366 would be required before an address could even be driven to the burst RAMs 300 and 302. This would result in at least one wait state in all cases, because the address to the burst RAMS could not be strobed in on PADS*.

Thus, way prediction based on a last code read or last code plus data read is crucial to operation of a single-bank two-way system.

Timing Differences Between Single-Bank Two-Way and Two-Bank Two-Way Caches

Figure 35A:
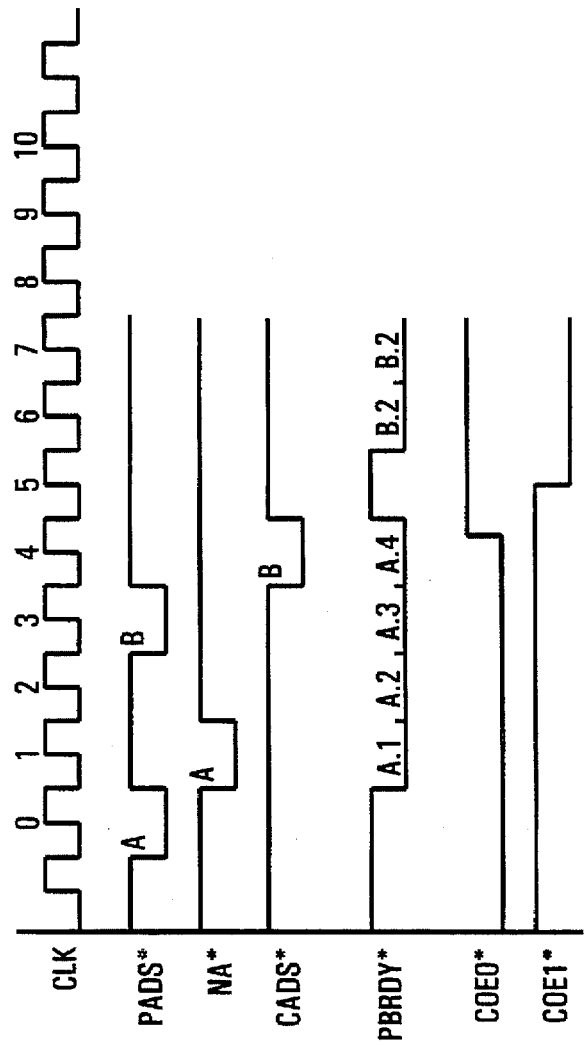
FIG. 35A and 35B are timing diagrams illustrating the difference between the timing of a one-bank two-way cache and a two-bank two-way cache according to the invention during pipelined memory operations.
Figure 35B:
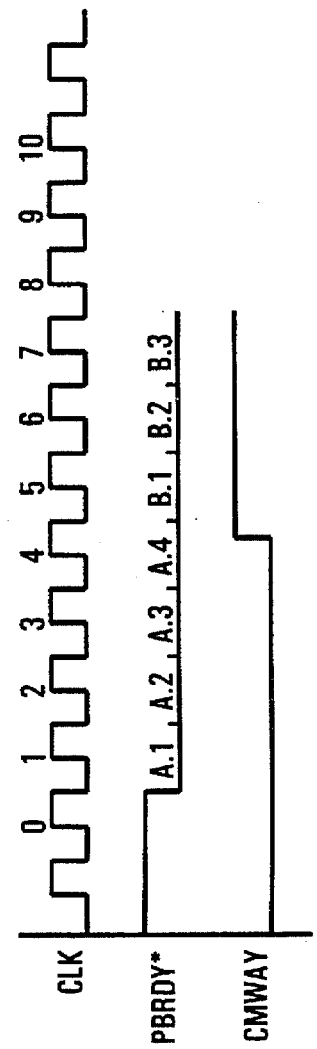

Referring to FIGS. 35A and 35B, the timing differences between a single-bank two-way cache implemented according to the invention and a two-bank two-way cache according to the invention is shown. Referring to FIG. 35A, a two-bank two-way pipelined read is illustrated. After the assertion of PADS* on operation A, the cache controller 210 asserts the appropriate COE0* or COE1* and then asserts PBRDY*. The pipelined read then occurs over the next four cycles (A.1 to A.4). At the end of those four cycles, however, if there is a way miss on the next pipelined read, so PBRDY* must be deasserted for one cycle to allow for the change of COE0* to COE1*, or vice versa. It is not possible to switch ways "on the run" on pipelined burst reads.

Referring to FIG. 35B, however, a pipelined burst read in a single-bank two-way cache is shown. Here it is seen that the appropriate CMWAY is set as would be COE0* or COE1*, but at the end of the pipelined read, on a way miss, CMWAY is simply switched to its opposite state. In this case, PBRDY* need not be deasserted for a cycle, so using a single-bank, two-way cache does not require an extra wait state on pipelined reads. The reads occur without interruption, but with A.4 being immediately followed by B.1.

Same Way Prediction on Pipelined Reads in a Two-Bank Two-Way Cache

Referring to FIG. 35A again, another feature of the invention will be appreciated. In a two-bank two-way cache, there is no advantage to using way prediction to the opposite way. It is seen in FIG. 35A that even on a way hit to the opposite way, an extra PBRDY* is required as is seen in cycle 5 of FIG. 35A. Therefore, the way prediction logic according to the invention on a pipelined read predicts to the way of the previous cycle (operation A). This is accomplished by the circuitry of FIGS. 6A–7G. As can be seen, one input to COE0 and COE1 are PIP_PRED_COE0 and PIP_PRED_COE1, respectively. Referring to FIGS. 7A–7G, it is seen that these have as inputs a clocked value of SYNC_COE0 and SYNC_COE1, respectively. These will only be true, however, on the second burst of a pipelined read. Through this circuitry, COE0 and COE1 are forced to their previous state on a pipelined read operation in a two-bank two-way cache. This provides the most effective method of way prediction on pipelined reads in a two-bank two-way cache.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of improving the performance of cache allocate operations on cache write misses in a cache memory system in a computer system that executes write operations to memory, where the cache memory system includes tag memory logic for determining whether a write operation is a hit or a miss to the cache memory system, includes allocation logic for allocating a line of cache memory from a system memory, and cache line modified bits for tracking whether a line of the cache memory has been modified by a write operation, and where the cache memory system allocates a line of cache memory in response to a write operation miss before performing the write operation that caused the write operation miss, the method comprising the steps of:

determining that a write operation is a cache miss;

allocating a line of the cache in response to said determining that a write operation is a cache miss before performing the write operation, wherein said allocating step includes the step of setting the modified bits for said allocated line to true during said allocating operation; and performing the write operation after said allocating step.

2. The method of claim 1, further comprising the steps of:

blocking said write operation in response to said determining step determining a cache miss;

unblocking said write operation after said allocating step; and performing said write operation leaving the modified bits unchanged.

3. A computer system with a cache memory system with improved performance during cache allocate operations on cache write misses, comprising:

system memory;

a processor for executing write operations to said system memory;

a cache controller for caching write operations to said system memory from said processor, said cache controller including tag memory logic for determining whether a write operation is a hit or a miss to the cache memory system;

allocation logic for allocating a line of cache memory from system memory;

cache line modified bits for tracking whether a line of the cache memory has been modified by a write operation;

means for allocating a line of cache memory in response to a write operation miss before performing the write operation that caused the write operation miss;

means for determining that a write operation is a cache miss; and means for allocating a line of the cache in response to said means for determining that a write operation is a cache miss, said means including means for setting the modified bits for said allocated line to true during said allocating operation.

4. A computer system with a cache memory system with improved performance during cache allocate operations on cache write misses, comprising:

system memory;

a processor for executing write operations to said system memory;

a hard disk drive connector coupled to said system memory and said processor for connecting to a hard disk drive storage device;

a keyboard/mouse controller coupled to said processor for receiving data from a keyboard connector and a mouse connector and providing the data to said processor;

a cache controller for caching write operations to said system memory from said processor, said cache controller including tag memory logic for determining whether a write operation is a hit or a miss to the cache memory system;

allocation logic for allocating a line of cache memory from system memory;

cache line modified bits for tracking whether a line of the cache memory has been modified by a write operation;

means for allocating a line of cache memory in response to a write operation miss before performing the write operation that caused the write operation miss;

means for determining that a write operation is a cache miss; and means for allocating a line of the cache in response to said means for determining that a write operation is a cache miss, said means including means for setting the modified bits for said allocated line to true during said allocating operation.

5. The system of claim 4, said means for allocating before performing the write operation further including:

means for blocking the write operation in response to said means for determining that a write operation is a cache miss;

means for unblocking the write operation after said allocating step; and means for performing the write operation leaving the modified bits unchanged.

6. The system of claim 3, said means for allocating before performing the write operation further including:

means for blocking the write operation in response to said means for determining that a write operation is a cache miss;

means for unblocking the write operation after said allocating step; and means for performing the write operation leaving the modified bits unchanged.

7. A cache controller with improved performance during cache allocate operations on cache write misses for use with a system memory, a processor for executing write operations to the system memory, said cache controller comprising:

tag memory logic for determining whether a write operation is a hit or a miss to the cache memory system;

allocation logic for allocating a line of cache memory from system memory;

cache line modified bits for tracking whether a line of the cache memory has been modified by a write operation;

means for allocating a line of cache memory in response to a write operation miss before performing the write operation that caused the write operation miss;

means for determining that a write operation is a cache miss; and means for allocating a line of the cache in response to said means for determining that a write operation is a cache miss, said means including means for setting the modified bits for said allocated line to true during said allocating operation.

8. The cache controller of claim 7, said means for allocating before performing the write operation further including:

means for blocking the write operation in response to said means for determining that a write operation is a cache miss;

means for unblocking the write operation after said allocating step; and means for performing the write operation leaving the modified bits unchanged.

* * * * *